(12) United States Patent
Kim

(10) Patent No.: US 8,793,606 B2
(45) Date of Patent: Jul. 29, 2014

(54) MOBILE TERMINAL AND ICON COLLISION CONTROLLING METHOD THEREOF

(75) Inventor: Jonghwan Kim, Inchon (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 12/837,180

(22) Filed: Jul. 15, 2010

(65) Prior Publication Data

US 2011/0035691 A1 Feb. 10, 2011

(30) Foreign Application Priority Data

Aug. 4, 2009 (KR) .................. 10-2009-0071797

(51) Int. Cl.
G06F 3/033 (2013.01)
G06F 3/048 (2013.01)
G06F 3/041 (2006.01)

(52) U.S. Cl.
USPC ........... 715/769; 715/863; 715/810; 715/840; 715/848; 345/173

(58) Field of Classification Search
CPC ....... G06F 3/017; G06F 3/045; G06F 3/0481; G06F 3/04817; G06F 3/0482; G06F 3/0486; G06F 3/0488; G06F 3/04883; G06F 3/04886; G06F 9/4443; G06F 2200/1634; G06F 2203/04103; G06F 2203/04104; G06F 2203/04106
USPC ......... 715/765, 810, 833, 835, 863, 740, 761, 715/781, 963; 345/173, 158
See application file for complete search history.

(56) References Cited

U.S. PATENT DOCUMENTS

| 5,491,626 | A | * | 2/1996 | Williams et al. ............. 705/7.24 |
| 2001/0028369 | A1 | * | 10/2001 | Gallo et al. .................. 345/848 |
| 2003/0001895 | A1 | | 1/2003 | Celik ............................ 345/769 |
| 2004/0119750 | A1 | | 6/2004 | Harrison |
| 2004/0150664 | A1 | * | 8/2004 | Baudisch ...................... 345/740 |
| 2005/0246721 | A1 | | 11/2005 | Scholz |
| 2007/0028184 | A1 | | 2/2007 | Jang ............................. 715/769 |
| 2007/0050726 | A1 | * | 3/2007 | Wakai et al. .................. 715/769 |
| 2007/0150834 | A1 | | 6/2007 | Muller et al. ................. 715/810 |
| 2007/0226652 | A1 | | 9/2007 | Kikuchi et al. |
| 2008/0295012 | A1 | * | 11/2008 | Sloo et al. .................... 715/769 |
| 2009/0006991 | A1 | | 1/2009 | Lindberg et al. |
| 2009/0183113 | A1 | * | 7/2009 | Smith et al. .................. 715/810 |

(Continued)

FOREIGN PATENT DOCUMENTS

| CN | 1855021 | 11/2006 |
| CN | 1920762 | 2/2007 |

(Continued)

OTHER PUBLICATIONS

European Search Report dated Mar. 4, 2011 for Application 10171811.2.

(Continued)

Primary Examiner — Alvin Tan
Assistant Examiner — Rinna Yi
(74) Attorney, Agent, or Firm — KED & Associates LLP

(57) ABSTRACT

A mobile terminal may include a display to display at least one icon, a memory to store information related to icons, and a controller to perform, when a first icon collides with a second icon, a control operation associated with the collided icons according to a type and/or an attribute of the first and second icons.

23 Claims, 50 Drawing Sheets

(56) References Cited

U.S. PATENT DOCUMENTS

| | | |
|---|---|---|
| 2009/0187842 A1 | 7/2009 | Collins et al. |
| 2010/0001967 A1* | 1/2010 | Yoo ............................... 345/173 |
| 2010/0066698 A1* | 3/2010 | Seo ............................... 345/173 |

FOREIGN PATENT DOCUMENTS

| | | |
|---|---|---|
| CN | 1991750 | 7/2007 |
| CN | 101017498 | 8/2007 |
| CN | 101223496 | 7/2008 |
| CN | 101308443 | 11/2008 |
| CN | 101436113 | 5/2009 |
| WO | WO 02/27459 | 4/2002 |
| WO | WO 2007/133206 | 11/2007 |

OTHER PUBLICATIONS

European Search Report dated Dec. 1, 2010 for Application No. 10171811.2.

Chinese Office Action dated Nov. 26, 2013 for Application 201010245793.5.

* cited by examiner

PROXIMITY TOUCH

SCROLLING/
FLICKING

CONSECUTIVELY ENTER 1,3 KEYS

EXECUTE MP3(BACKGROUND)+
EXECUTE ALVUM(FOREGROUND)

EXECUTE RADIO(BACKGROUND)+EXECUTE
MESSAGE TRANSMISSION(FOREGROUND)

EXECUTE TV(BACKGROUND)+
EXECUTE CALENDAR(FOREGROUND)

EXECUTE VOICE MEMO(BACKGROUND)+
EXECUTE MESSAGE TRANSMISSION
(FOREGROUND)

TOUCH & DRAG

FUNCTION DIFFERENT TYPES OF FUNCTIONS

ASSOCIATED APPLICATION

[LOGICAL DIVISION]

[PHYSICAL DIVISION]

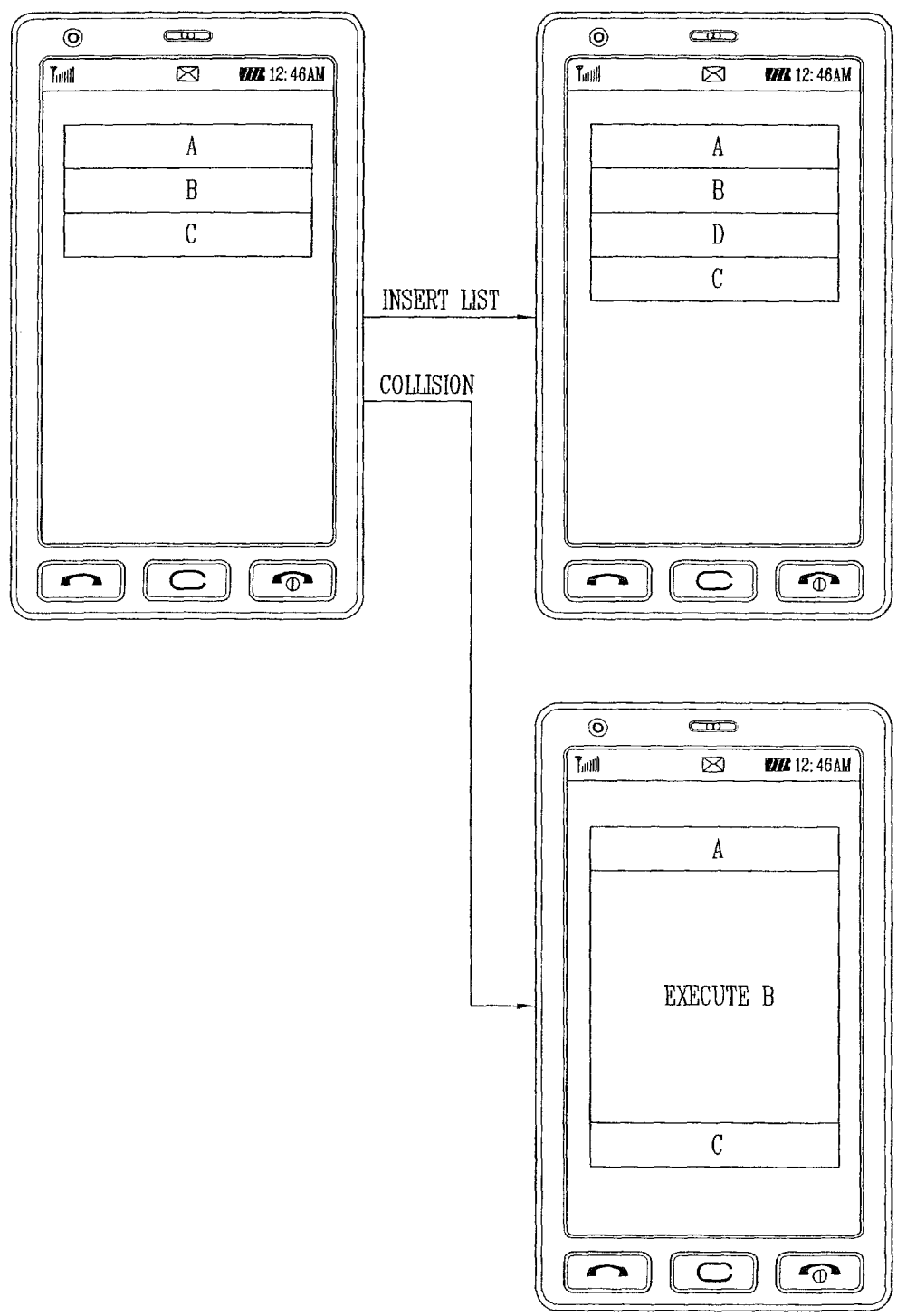

MOBILE TERMINAL AND ICON COLLISION CONTROLLING METHOD THEREOF

CROSS-REFERENCE TO RELATED APPLICATIONS

This application claims priority benefit from Korean Application No. 10-2009-0071797, filed Aug. 4, 2009, the subject matter of which is hereby incorporated by reference.

BACKGROUND

1. Field

Embodiments of the present invention may relate to a mobile terminal capable of controlling collision between icons displayed on a screen, and an icon collision controlling method thereof.

2. Background

Mobile terminals may perform various functions, for example, data and voice communication, capturing images or video, storing voice, reproducing music files via a speaker system, displaying images or video and/or the like. Mobile terminals may include an additional function of playing games. Mobile terminals may also be implemented as multimedia players. Mobile terminals may receive broadcast and/or multicast signals to allow viewing of video or television programs.

Efforts may be undergoing to support and/or enhance various functions of mobile terminals. Such efforts may include not only changes and improvement of structural components implementing a mobile terminal, but also software and/or hardware improvement.

A touch function of the mobile terminal may be designed for a user unfamiliar to button/key input using a touch screen to conveniently execute operations of the mobile terminal. The touch function may be an important function of the mobile terminal along with a user interface (UI) in addition to a simple input function.

An "icon", which may be used as a 'shortcut' for executing a program or content, may exist on an idle screen (or in an idle mode) and/or a task bar region of the mobile terminal. The icon may be generated by an icon generation function provided in the mobile terminal and/or may be selectively removed from the idle screen and/or task bar region.

If the number of icons displayed on the idle screen or task bar region increases, an appearance of the mobile terminal may be spoiled and it may be difficult to execute a desired icon. Accordingly, it may be desirable to reduce the number of displayed icons.

A user may suffer from some burdens, such as undergoing many steps during menu selection. For example, in order for the user to execute a desired function in the mobile terminal, the user may select a corresponding menu and then select a desired execution item from the selected menu.

BRIEF DESCRIPTION OF THE DRAWINGS

Arrangements and embodiments may be described in detail with reference to the following drawings in which like reference numerals refer to like elements and wherein:

FIG. 37 is a view illustrating a control operation upon an addition of a new icon to a specific icon list or an icon collision.

DETAILED DESCRIPTION

Figure 1:
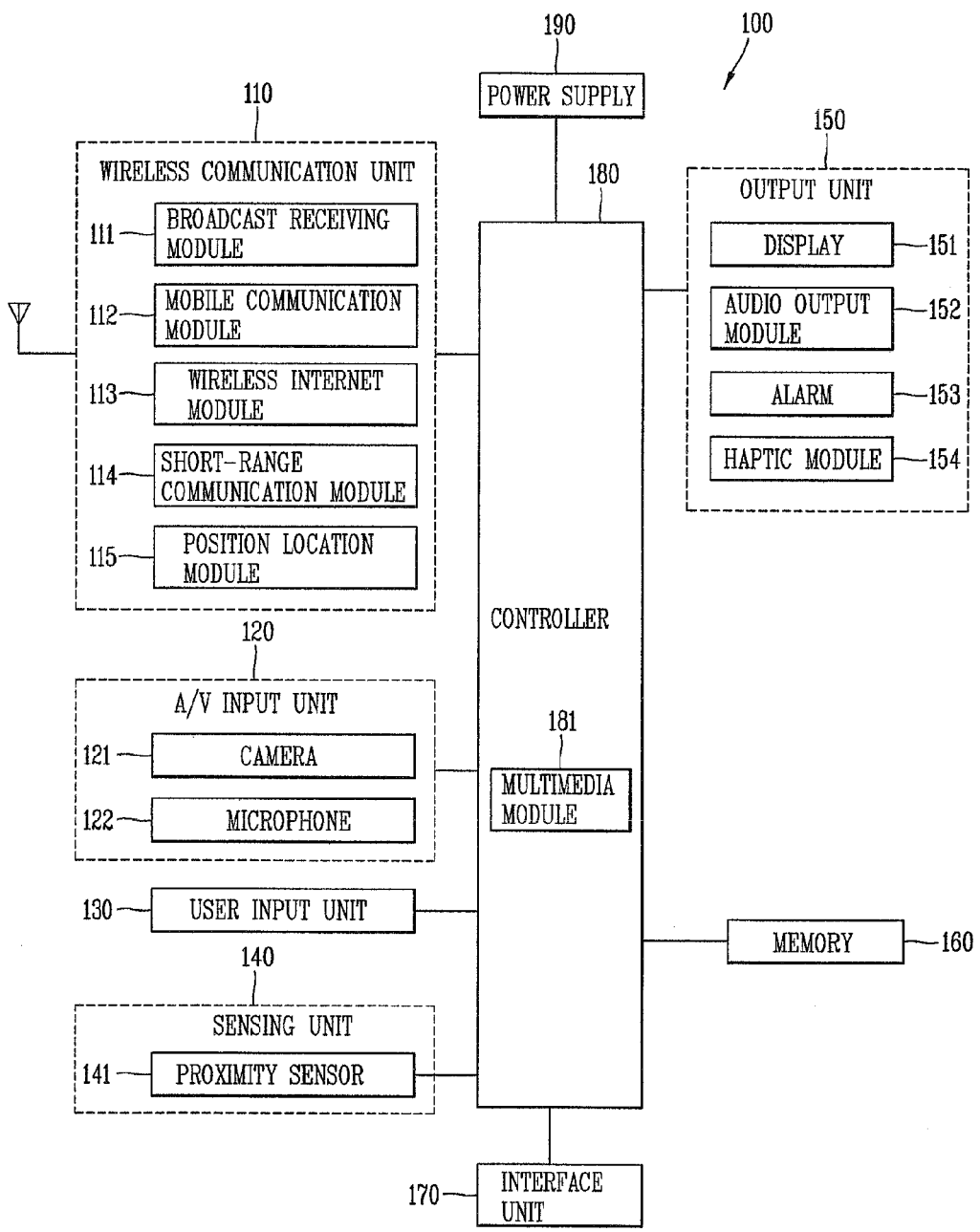
FIG. 1 is a block diagram of a mobile terminal in accordance with an embodiment of the present invention.

Embodiments of the present invention may provide a mobile terminal capable of executing a content and a program by virtue of collision control between icons displayed on a screen, and an icon collision controlling method thereof.

Embodiments of the present invention may provide a mobile terminal that allows cooperation between content and a program and an execution of an additional function through an icon control, and an icon collision controlling method thereof.

A mobile terminal may include a display configured to display at least one icon, a memory configured to store information related to the displayed icon, and a controller configured to perform a control operation associated with collided icons according to a type and an attribute of the corresponding icons when a first icon collides with a second icon.

The at least one icon may include a function icon and/or a contents icon. The different types of icon collisions may include a collision between function icons, a collision between a function icon and a contents icon and a collision between contents icons.

When the first and second icons are function icons, the controller may search and display a most frequently used and/or a recent item list of the first function icon items.

When the first and second icons are function icons, the controller may divide (or separate) a screen to display the first function icon item and the second icon item corresponding to the first function icon item.

When the first and second icons are function icons, the controller may execute corresponding functions according to layer level values, wherein a function with a high layer level may be executed (or provided) as a foreground and a function with a low layer level may be executed (or provided) as a background.

When the first and second icons are function icons and belong to a same attribute group, the controller may display the two function icons in a combined state. When the first icon is a contents icon and the second icon is a function icon, the controller may execute a specific function of the corresponding content.

When the first icon is a contents icon and the second icon is a function icon, the controller may display an execution screen of the corresponding contents and a second function icon input screen on divided screens, respectively.

When the first icon is a plurality of contents icons and the second icon is a function icon, the controller may execute a control operation by determining whether the first contents icons are a same type. When the first contents icons are the same type, the controller may simultaneously display the content icon items on divided screens while executing the first function icon item. On the other hand, when the first contents icons are different types, the controller may display contents icon items on divided screens, respectively.

When the first icon is the same type of a plurality of contents icons and the second icon is a function icon, the controller may simultaneously execute the plurality of contents using the function of the second icon.

When the first and second icons are contents icons, the controller may perform a control operation according to whether the corresponding contents icons are the same type of contents. When the first and second icons are contents icons and the corresponding contents icons are the same type of contents, the controller may display two contents icon items on divided screens, respectively, along with executing the corresponding contents. When the first and second icons are contents icons and the corresponding contents icons are different types of contents, the controller may execute a function combined with the corresponding contents and displayed divided information, respectively.

An icon collision controlling method may include displaying a plurality of icons on a screen, detecting a collision between the displayed icons, and executing a control operation associated with the corresponding icons based on a type of the icon collision and/or the attribute.

The at least one icon may include function icons and contents icons. The different types of icon collisions may include a collision between function icons, a collision between a function icon and a contents icon and a collision between contents icons.

When the first and second icons are function icons, a most frequently used and/or a recent item list may be searched from the first function icon items and may be displayed.

When the first and second icons are function icons, a screen may be divided (or separated) to display the first function icon item and the second icon item corresponding to the first function icon item.

Executing of the control operation may include determining layer level values when the first and second icons are function icons, and executing the corresponding functions based on the determined layer level values. A function with a high layer level may be executed (or provided) as a foreground and a function with a low layer level may be executed (or provided) as a background.

When the first and second icons are function icons and the second icon has a time attribute, the first icon item may be searched and displayed according to the time attribute value of the second icon and/or may be automatically executed after the time attribute value of the second icon.

When the first and second icons are function icons and belong to the same attribute group, the function icons may be displayed in a combined state, and when the first icon is a contents icon and the second icon is a function icon, a specific function of the corresponding content may be executed.

When the first icon is a contents icon and the second icon is a function icon, an execution screen of the corresponding content and a second function icon input screen may be displayed on divided screens, respectively.

When the first icon is a plurality of contents icons and the second icon is a function icon, a control operation may be executed based on types of the first contents icons.

When the first contents icons are the same type, the content icon items may be displayed on divided screens, respectively, along with executing the second function icon item, and when the first contents icons are different types then each content icon item may be divisionally displayed.

When the first icon is the same type of a plurality of contents icon and the second icon is a function icon, the plurality of contents may simultaneously be executed using the function of the second icon.

The method may further include executing a control operation according to types of corresponding contents icons when the first and second icons are contents icons. This may include displaying two content icon items along with executing the corresponding contents when the first and second icons are contents icons in the same type, and executing a function combined with the corresponding contents and display divided information, respectively, when the first and second icons are contents icons of different types.

When at least one function icon or content icon collides with (or onto) a specific surface of a cubic icon, the corresponding icon may be executed on the corresponding surface.

When at least one function icon or contents icon collides with (or onto) a surface of the cubic icon, the corresponding icon may be executed on each collided surface.

A description may now be provided in detail of configurations of mobile terminals according to example embodiments with reference to the accompanying drawings. Hereinafter, suffixes "module" and "unit or portion" for components used herein in description may be merely provided only for facilitation of preparing this specification, and thus may not granted a specific meaning or function. It should be noticed that "module" and "unit" or "portion" may be used together.

A mobile terminal may be implemented using a variety of different types of terminals. Examples of terminals may include mobile terminals, such as mobile phones, smart phones, notebook computers, digital broadcast terminals, Personal Digital Assistants (PDA), Portable Multimedia Players (PMP), navigators and/or the like, and stationary terminals such as digital TVs, desktop computers and/or the like.

FIG. 1 is a block diagram of a mobile terminal in accordance with an embodiment of the present invention. Other embodiments and configurations may also be provided.

The mobile terminal 100 may include components such as a wireless communication unit 110, an Audio/Video (NV) input unit 120, a user input unit 130, a sensing unit 140, an output unit 150, a memory 160, an interface unit 170, a controller 180, a power supply 190 (or power supply unit) and/or the like.

FIG. 1 shows the mobile terminal 100 having various components, although a greater number or fewer number of components may alternatively be implemented.

The wireless communication unit 110 may include one or more components that permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 (or location information module) and/or the like.

The broadcast receiving module 111 may receive a broadcast signal and/or broadcast associated information from an external broadcast managing entity via a broadcast channel.

The broadcast channel may include a satellite channel and a terrestrial channel. The broadcast managing entity may include a server that generates and transmits a broadcast signal and/or broadcast associated information or a server that receives a pre-generated broadcast signal and/or broadcast associated information and sends them to the mobile terminal. Examples of broadcast associated information may include information associated with a broadcast channel, a broadcast program, a broadcast service provider, and/or the like. The broadcast signal may be implemented as a TV broadcast signal, a radio broadcast signal, and a data broadcast signal, for example. The broadcast signal may further include a data broadcast signal combined with a TV or radio broadcast signal.

The broadcast associated information may represent information associated with broadcast channels, broadcast programs and/or broadcast service providers. The broadcast associated information may be provided via a mobile communication network, and may be received by the mobile communication module 112.

The broadcast associated information may be implemented in various formats. For example, broadcast associated information may include Electronic Program Guide (EPG) of Digital Multimedia Broadcasting (DMB), Electronic Service Guide (ESG) of Digital Video Broadcast-Handheld (DVB-H), and/or the like.

The broadcast receiving module 111 may be configured to receive digital broadcast signals transmitted from various types of broadcast systems. The broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and/or the like. The broadcast receiving module 111 may be suitable for every broadcast system transmitting broadcast signals as well as the digital broadcasting systems.

Broadcast signals and/or broadcast associated information received via the broadcast receiving module 111 may be stored in a suitable device such as a memory 160.

The mobile communication module 112 may transmit/receive wireless signals to/from at least one network entity (e.g., a base station, an external mobile terminal, a server, etc.) on a mobile communication network. The wireless signals may include an audio call signal, a video call signal, and/or various formats of data according to transmission/reception of text/multimedia messages.

The wireless internet module 113 may support wireless Internet access for the mobile terminal. The wireless internet module may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and/or the like.

The short-range communication module 114 may be a module for short-range communications. Suitable technologies for implementing this module may include BLUETOOTH, Radio Frequency IDentification (RFID), Infrared Data Association (IrDA), Ultra-WideBand (UWB), ZigBee, and/or the like.

The position location module 115 may be a module for detecting or calculating a position of a mobile terminal. An example of the position location module 115 may include a Global Position System (GPS) module.

The A/V input unit 120 may provide audio or video signal input to the mobile terminal. The A/V input unit 120 may include a camera 121 and a microphone 122. The camera 121 may receive and process image frames of still pictures or video obtained by image sensors in a video call mode or a capturing mode. The processed image frames may be displayed on a display 151 (or a display unit). For ease of description and illustration, the following description may refer to a display, rather than referring to a display unit.

The image frames processed by the camera 121 may be stored in the memory 160 or may be transmitted to the exterior via the wireless communication unit 110. Two or more cameras 121 may be provided according to configuration of the mobile terminal.

The microphone 122 may receive an external audio signal via a microphone while the mobile terminal is in a particular mode such as a phone call mode, a recording mode, a voice recognition mode, and/or the like. The audio signal may be processed into digital data. The processed digital data may be converted for output into a format transmittable to a mobile communication base station via the mobile communication module 112 in case of the phone call mode. The microphone 122 may include assorted noise removing algorithms to remove noise (or noise canceling algorithms to cancel noise) generated in the course of receiving the external audio signal.

The user input unit 130 may generate input data inputted by a user to control operations of the mobile terminal. The user input unit 130 may include a keypad, a dome switch, a touch-pad (e.g., static pressure/capacitance), a jog wheel, a jog switch and/or the like.

The sensing unit 140 may provide status measurements of various aspects of the mobile terminal. For example, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and/or the like so as to generate a sensing signal for controlling operations of the mobile terminal 100. For example, for a slide-type mobile terminal, the sensing unit 140 may sense whether a sliding portion of the mobile terminal is open or closed. Other examples may include sensing functions such as the sensing unit 140 sensing presence or absence of power provided by the power supply 190, presence or absence of a coupling and/or other connection between the interface unit 170 and an external device, and the like. The sensing unit 140 may include a proximity sensor 141 (or a proximity unit).

The output unit 150 may be configured to output an audio signal, a video signal and/or an alarm signal. The output unit 150 may include a display 151 (or a display unit), an audio output module 152, an alarm 153 (or an alarm unit), a haptic module 154 and/or the like.

The display 151 may output information processed in the mobile terminal 100. For example, when the mobile terminal is operating in a phone call mode, the display 151 may provide a User Interface (UI) or a Graphic User Interface (GUI) that includes information associated with the call. As another example, if the mobile terminal is in a video call mode or a capturing mode, the display 151 may additionally or alternatively display images captured and/or received, a UI, and/or a GUI.

As discussed above, a touch screen may be configured as the display 151 and the touchpad layered with each other to work in cooperation with each other. This configuration may permit the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, and/or the like.

The displays may be transparent such that it is possible to see the exterior therethrough. This type of display may be called transparent displays. A representative example of the transparent display may include a Transparent Organic Light Emitting Diode (TOLED), and/or the like. The rear side of the display 151 may also be transparent. By such structure, a user may view an object located at the rear side of the terminal body through a region occupied by the display 151 of the terminal body.

The display 151 may be implemented as two or more in number according to a configured aspect of the mobile terminal 100. For example, a plurality of displays 151 may be arranged on one surface to be spaced apart from or integrated with each other, and/or may be arranged on different surfaces.

If the display 151 and a touch sensitive sensor (referred to as a touch sensor) have a layered structure therebetween, then the structure may be referred to as a touch screen. In this example, the display 151 may be used as an input device rather than an output device. The touch sensor may be implemented as a touch film, a touch sheet, a touch pad, and/or the like.

The touch sensor may convert changes of a pressure applied to a specific part of the display 151, and/or a capacitance occurring from a specific part of the display 151 into electric input signals. The touch sensor may sense not only a touched position and a touched area, but also a touch pressure.

When touch inputs are sensed by the touch sensors, corresponding signals may be transmitted to a touch controller (not shown). The touch controller may process the received signals, and then transmit corresponding data to the controller 180. Accordingly, the controller 180 may sense which region of the display 151 has been touched.

The proximity sensor 141 may be provided at an inner region of the mobile terminal 100 covered by the touch screen and/or near the touch screen. The proximity sensor 141 may include a sensor to sense presence or absence of an object approaching a surface to be sensed, and/or an object provided near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and/or so on. When the touch screen is implemented as a capacitance type, a proximity of a pointer to the touch screen may be sensed by changes of an electromagnetic field. The touch screen (touch sensor) may be categorized as a proximity sensor.

For ease of explanation, a status that the pointer is positioned proximate to the touch screen without contact may be referred to as a proximity touch, whereas a status that the pointer substantially comes in contact with the touch screen may be referred to as a contact touch. The position corresponding to the proximity touch of the pointer on the touch screen may indicate a position where the pointer faces perpendicular to the touch screen upon the proximity touch of the pointer.

The proximity sensor 141 may sense a proximity touch and proximity touch patterns (e.g., distance, direction, speed, time, position, moving status, etc.). Information relating to the sensed proximity touch and the sensed proximity touch patterns may be output to the touch screen.

The audio output module 152 may output audio data received from the wireless communication unit 110 and/or stored in the memory 160, in a call-receiving mode, a call-placing mode, a recording mode, a voice recognition mode, a broadcast reception mode, and/or so on. The audio output module 152 may output audio signals relating to functions performed in the mobile terminal 100 (e.g., a sound alarming a call received or a message received, and so on). The audio output module 152 may include a receiver, a speaker, a buzzer, and/or so on.

The alarm 153 may output signals notifying occurrence of events from the mobile terminal 100. The events occurring from the mobile terminal 100 may include a call received, a message received, a key signal input, a touch input, and/or so on. The alarm 153 may output not only video or audio signals, but also other types of signals such as signals notifying occurrence of events in a vibration manner. Since the video or audio signals can be output through the display 151 or the audio output unit 152, the display 151 and the audio output module 152 may be considered as part of the alarm 153.

The haptic module 154 may generate various tactile effects that a user can feel. A representative example of the tactile effects generated by the haptic module 154 may include a vibration. A vibration generated by the haptic module 154 may have a controllable intensity, a controllable pattern, and/or so on. For example, a different vibration may be output in a synthesized manner and/or in a sequential manner.

The haptic module 154 may generate various haptic effects including not only vibration, but also arrangement of pins vertically moving with respect to a skin being touched (contacted), air injection force and/or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and/or the like.

The haptic module 154 may transmit tactile effects (signals) through a user's direct contact, and/or a user's muscular sense using a finger or a hand. The haptic module 154 may be implemented as two or more in number according to a configuration of the mobile terminal 100.

The memory 160 may store a program for processing and control of the controller 180. The memory 160 may also temporarily store input/output data (e.g., phonebook data, messages, still images, video and/or the like). The memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and/or the like. The mobile terminal 100 may operate a web storage that performs a storage function of the memory 160 on the Internet.

The interface unit 170 may interface the mobile terminal with external devices. The interface unit 170 may allow a data reception from an external device, a power delivery to each component in the mobile terminal 100, and/or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and/or the like.

The identification module may be configured as a chip for storing various information required to authenticate an authority to use the mobile terminal 100 that may include a User Identity Module (UIM), a Subscriber Identity Module (SIM), and/or the like. The device having the identification module (hereinafter referred to as an identification device) may be implemented as a type of smart card. The identification device may be coupled to the mobile terminal 100 via a port.

The interface unit 170 may be a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 may control overall operations of the mobile terminal 100. For example, the controller 180 may perform control and processing associated with telephony calls, data communications, video calls, and/or the like. The controller 180 may include a multimedia module 181 that provides multimedia playback. The multimedia module 181 may be configured as part of the controller 180 and/or as a separate component.

The controller 180 may perform a pattern recognition processing so as to recognize writing or drawing input on the touch screen as text or image.

The power supply 190 may provide power required by various components under control of the controller 180. The provided power may be internal power, external power, and/or a combination thereof.

Embodiments as described herein may be implemented in a computer-readable medium using, for example, software, hardware, and/or some combination thereof.

For a hardware implementation, embodiments as described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform functions described herein, and/or a selective combination thereof. Such embodiments may be implemented by the controller 180.

For software implementation, embodiments such as procedures and functions may be implemented together with separate software modules each of which may perform at least one of a function and an operation. The software codes may be implemented with a software application(s) written in any suitable programming language. The software codes may be stored in the memory 160 and may be executed by the controller 180.

Figure 2A:
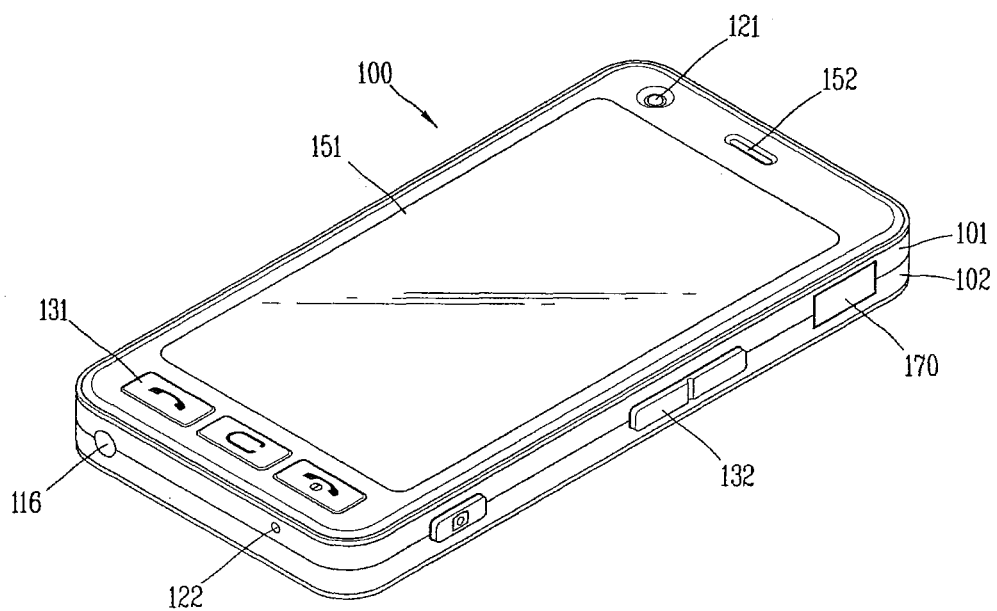
FIG. 2A is a front perspective view of a mobile terminal in accordance with an embodiment of the present invention.

FIG. 2A is a front perspective view of a mobile terminal in accordance with an embodiment of the present invention. Other embodiments and configurations may also be provided.

The mobile terminal 100 as described herein may be a bar type body. However, embodiments of the present invention are not limited to the bar type body, and may also be applicable to various configurations having two or more bodies to be relatively movable to each other, such as a slide type, a folder type, a swing type, a swivel type and/or the like.

A case (casing, housing, cover, etc.) may form an outer appearance of a terminal body. The case may include a front case 101 and a rear case 102. A space formed by the front case 101 and the rear case 102 may accommodate various components therein. At least one intermediate case may further be provided between the front case 101 and the rear case 102.

Such cases may be formed of injection-molded synthetic resin, and/or may be formed using a metallic material such as stainless steel (STS) or titanium (Ti).

The terminal body, and more specifically, the front case 101 may be shown as having the display 151, the audio output module 152, the camera 121, the user input unit 130 (e.g., 131, 132), the microphone 122, the interface unit 170 and/or the like.

The display 151 may occupy most of a main surface of the front case 101. The audio output module 152 and the camera 121 may be provided at a region adjacent to one of both end portions of the display 151, and the user input unit 131 and the microphone 122 may be provided at a region adjacent to another end portion thereof. The user input unit 132, the interface unit 170 and the like may be provided at side surfaces of the front case 101 and the rear case 102.

The user input unit 130 may receive a command input for controlling operation of the mobile terminal 100, and the user input unit 130 may include first and second manipulation units 131 and 132. The first and second manipulation units 131 and 132 may be referred to as a manipulating portion. The manipulating portion may be operated by a user in any tactile manner.

Content input by the first and second manipulation units 131 and 132 may be variously set. For example, the first manipulation unit 131 may be configured to input commands such as START, END, SCROLL and/or the like, and the second manipulation unit 132 may input a command such as adjusting an audio sound, a conversion of the display 151 into a touch-sensitive mode and/or the like.

Figure 2B:
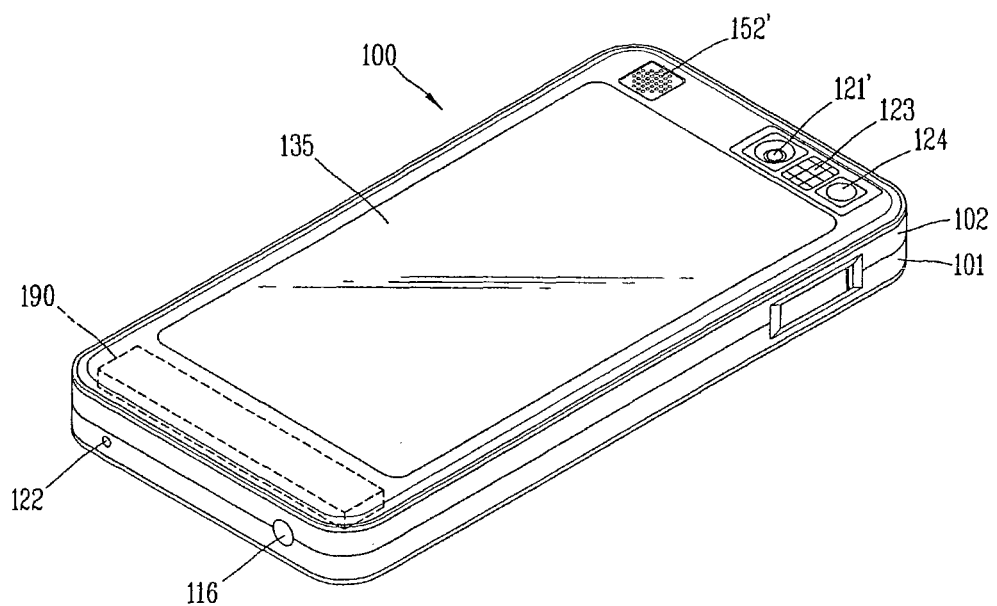
FIG. 2B is a rear perspective view of a mobile terminal in accordance with an embodiment of the present invention.

FIG. 2B is a rear perspective view of the mobile terminal shown in FIG. 2A. Other embodiments and configurations may also be provided.

As shown in FIG. 2B, a rear surface of the terminal body, and more specifically the rear case 102, may be further provided with a camera 121'. The camera 121' may face a direction that is opposite to a direction faced by the camera 121, and may have different pixels from the camera 121.

For example, the camera 121 may operate with relatively lower pixels (lower resolution). The camera 121 may be useful when a user can capture his face and send it to another party during a video call and/or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be provided adjacent to the camera 121'. The flash 123 may operate in conjunction with the camera 121' when taking a picture using the camera 121'. The mirror 124 may cooperate with the camera 121' to allow a user to photograph himself in a self-portrait mode.

An audio output module 152' may further be provided at a rear surface of the terminal body. The audio output module 152' may cooperate with the audio output module 152 (see FIG. 2A) to provide stereo output. The audio output module 152' may be configured to operate as a speakerphone.

A broadcast signal receiving antenna 116 may be provided at a side surface of the terminal body in addition to an antenna for communications. The antenna 116 may be configured as part of the broadcast receiving module 111 and may be retractable into the terminal body.

The power supply 190 for supplying power to the mobile terminal 100 may be mounted (or provided) to the terminal body. The power supply 190 may be internally provided at the terminal body and/or may be detachably provided outside the terminal body.

A touch pad 135 for detecting a touch input may be provided at the rear case 102. The touch pad 135 may also be transparent, similar to the display 151. If the display 151 is configured to output visible information on both surfaces, such visible information may be identified via the touch pad 135. Information output on both surfaces may all be controlled by the touch pad 135. A display may be provided on the touch pad 135 to provide a touch screen even at the rear case 102.

The touch pad 135 may operate in cooperation with the display 151 of the front case 101. The touch pad 135 may be provided at the rear side of the display 151 in parallel. The touch pad 135 may be the same as or smaller than the display 151.

Figure 3A:
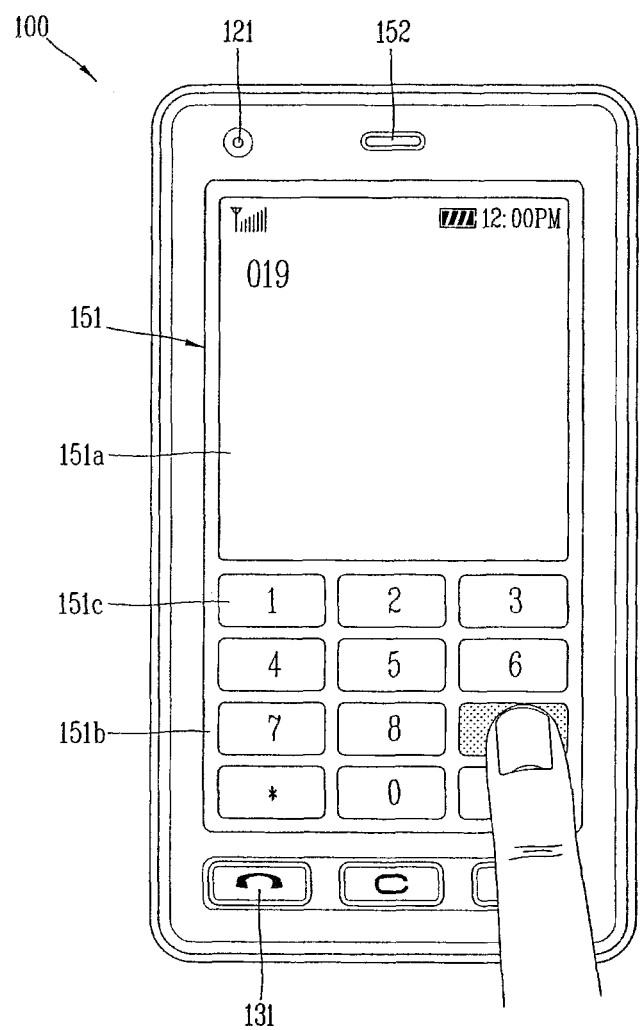
FIGS. 3A and 3B are front views of a mobile terminal each illustrating an operation state of a mobile terminal.
Figure 3B:
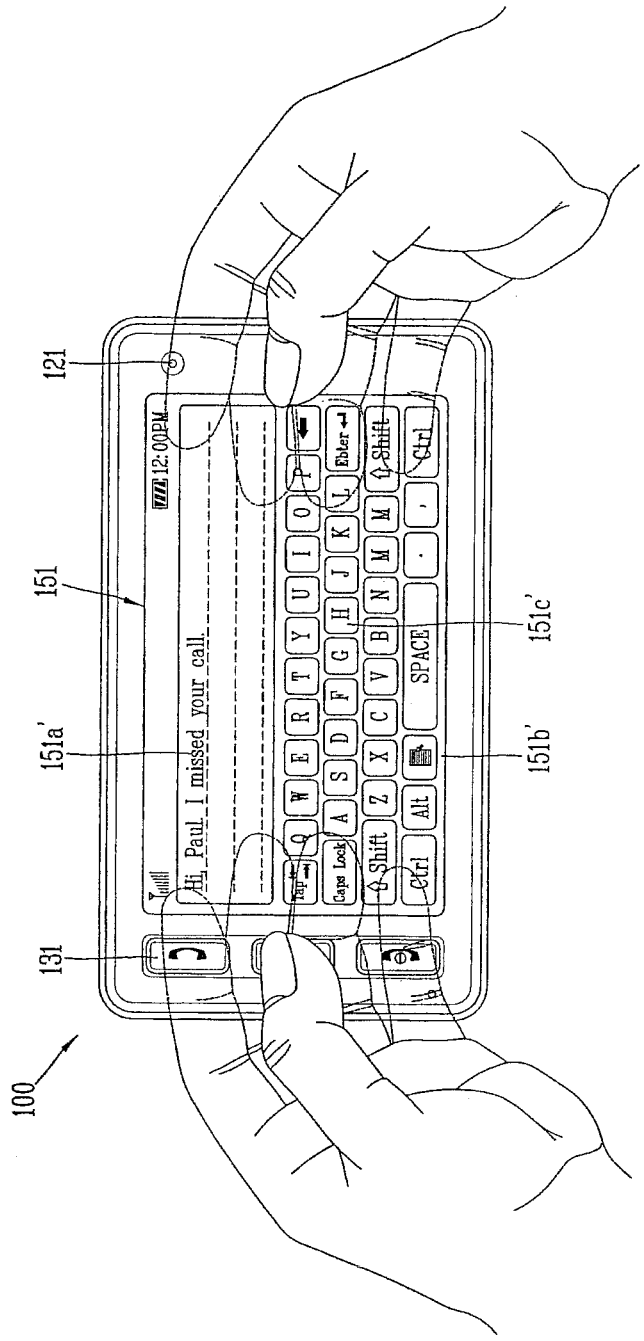

A description may now be provided of a cooperative operating mechanism between the display 151 and the touch pad 135 with reference to FIGS. 3A-3B.

FIGS. 3A and 3B are front views of a mobile terminal each illustrating an operation state of a mobile terminal.

Various types of visible information may be displayed on the display 151. Such information may be displayed in different forms such as character, number, symbol, graphic, icon and/or the like.

For input of the information, at least one of characters, numbers, graphics and/or icons may be arranged and displayed in a preset configuration, thus being implemented in the form of a keypad. The keypad may include soft keys.

FIG. 3A illustrates a touch input applied onto a soft key through a front surface of the terminal body.

The display 151 may operate as a single entire region and/or by being divided (or separated) into a plurality of regions. The plurality of regions may cooperate with one another.

For example, an output window 151a and an input window 151b may be displayed at upper and lower portions of the display 151, respectively. Soft keys 151c representing numbers for inputting telephone numbers and/or the like may be output on the input window 151b. When a soft key 151c is touched, a number and/or the like corresponding to the touched soft key 151c may be output on the output window 151a. Upon manipulating the first manipulation unit 131, a call connection for a telephone number displayed on the output window 151a may be attempted.

FIG. 3B illustrates a touch input applied to a soft key through a rear surface of the terminal body. FIG. 3A shows the terminal body in a portrait direction, whereas FIG. 3B shows the terminal body in a landscape direction. The terminal may be allowed to change an output screen displayed on the display 151 based on the placed direction of the terminal body.

FIG. 3B illustrates an operation of the mobile terminal in a text input mode. The display 151 may display an output window 151a' and an input window 151b'. The input window 151b' may have soft keys 151c' representing characters, symbols and/or numbers arranged in a plurality of rows. The soft keys 151c' may alternatively be arranged in a QWERTY configuration.

Upon touching the soft key 151c' via the touch pad, a character, a number and/or a symbol corresponding to the touched soft key 151c' may be displayed on the output window 151a'. As compared to the touch input via the display 151, the touch input via the touch pad may have an advantage in that the soft key 151c' may be prevented from being obscured by a finger. Even when the display 151 and the touch pad are transparent, fingers located at the rear surface of the terminal body are visible, which may allow a more accurate touch input.

In addition to the input manner shown in embodiments, the display 151 or the touch pad may be scrolled to receive a touch input. A user may scroll the display 151 or the touch pad to move a cursor or a pointer positioned on an object (or subject), e.g., an icon or the like, displayed on the display 151. Additionally, in case of moving a finger on the display 151 or the touch pad, a path of the finger being moved may be visibly displayed on the display 151, which may be useful upon editing an image displayed on the display 151.

One function of the mobile terminal may be executed in correspondence with an example where the display 151 (or the touch screen) and the touch pad are touched together (or simultaneously) within a preset amount time. An example of being touched together may include clamping a terminal body with the user's thumb and index finger. The one function, for example, may be activating or deactivating of the display 151 or the touch pad.

The proximity sensor 141 may be described in more detail with reference to FIG. 4.

Figure 4:
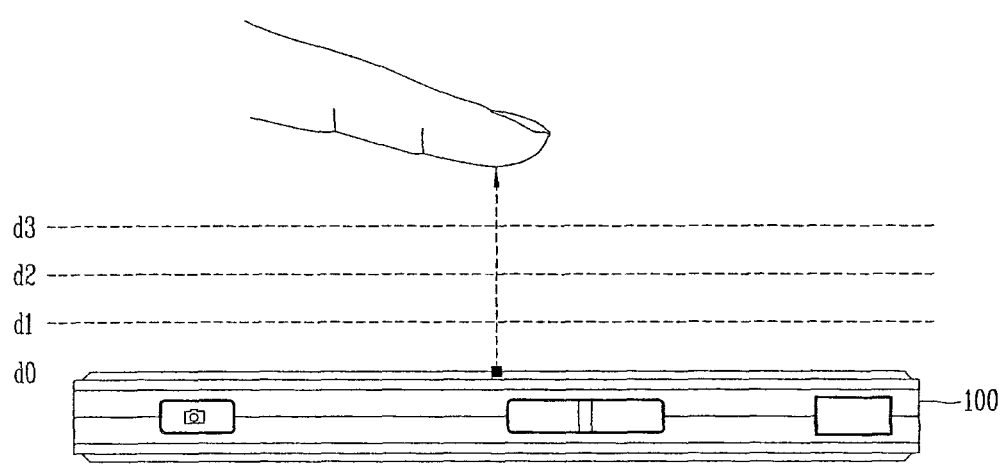
FIG. 4 illustrates a proximity depth of a proximity sensor.

FIG. 4 shows a proximity depth of a proximity sensor.

The proximity sensor 141 may output different proximity signals depending on a distance between the approached pointer and the touch screen (hereafter referred to as a proximity depth).

FIG. 4 shows a section of the touch screen having the proximity sensor that can detect three proximity depths, for example. However, a proximity sensor that can detect less than three proximity depths or four or more proximity depths may also be provided.

If the pointer completely contacts the touch screen ($d_0$), the contact may be recognized as a contact touch. If the pointer is spaced apart from the touch screen by less than a distance $d_1$, it may be recognized as a proximity touch with a first proximity depth. If the pointer is positioned above the touch screen between the distance $d_1$ and a distance $d_2$, it may be recognized as a proximity touch with a second proximity depth. If the pointer is spaced apart from the touch screen by more than the distance $d_2$ and less than a distance $d_3$, it may be recognized as a proximity touch with a third proximity depth. If the pointer is positioned above the touch screen farther than the distance $d_3$, it may be recognized as the proximity touch being released.

The controller 180 may recognize the proximity touches as various input signals according to proximity depths and proximity positions of the pointer so as to control various operations.

Figure 5:
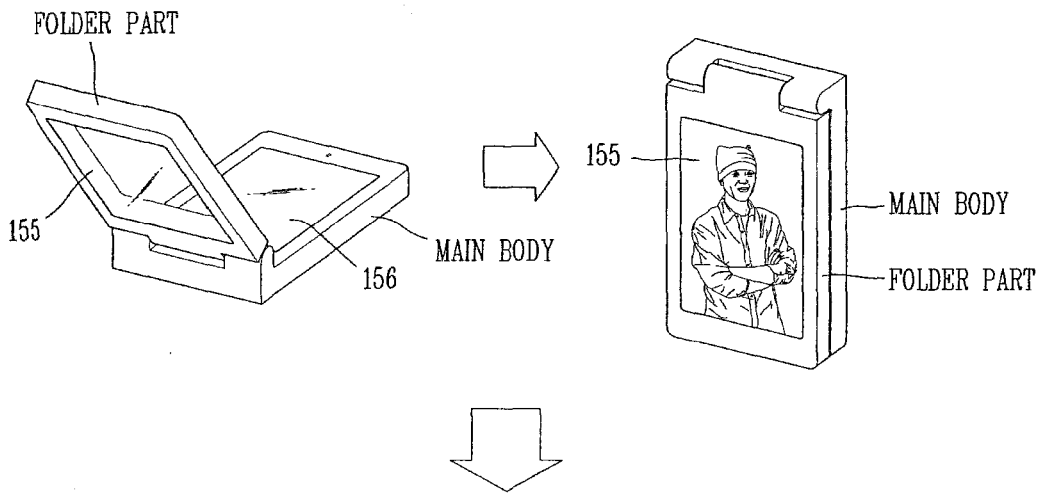
FIG. 5 illustrates a method for controlling a touching operation in an overlapped state between a pair of displays.
Figure 5:
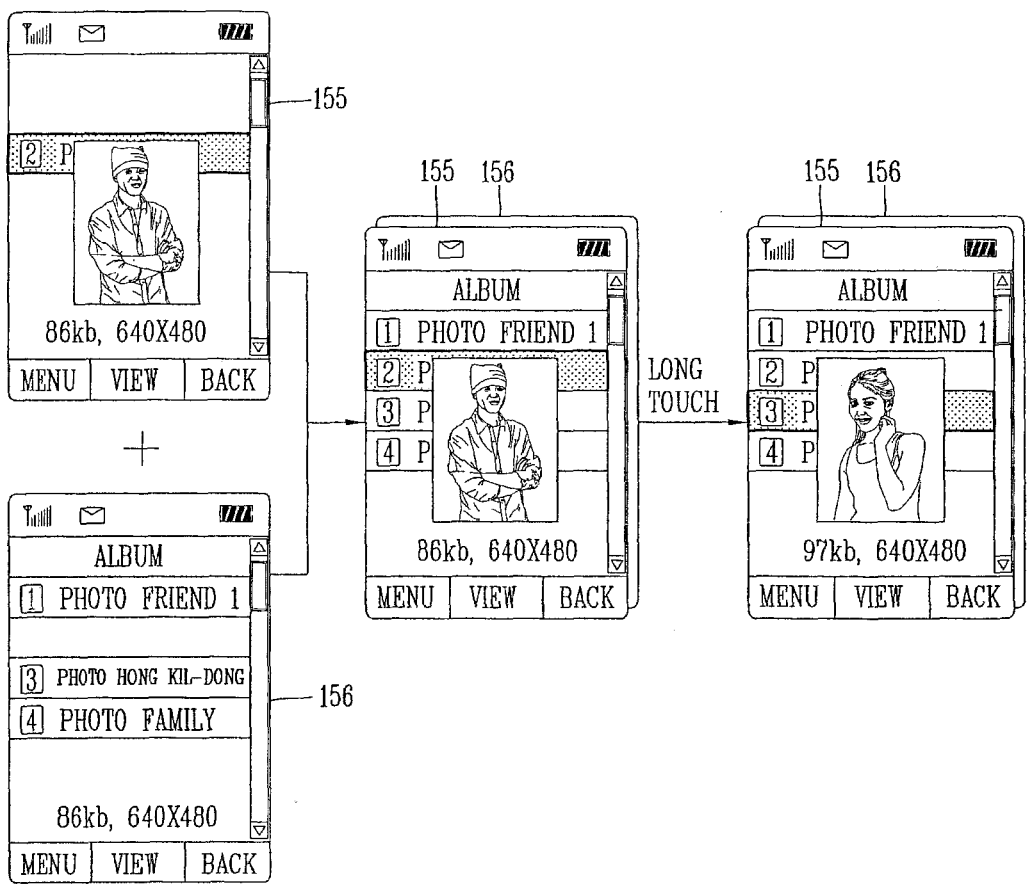

FIG. 5 illustrates a method for controlling a touching operation in an overlapped state between a pair of displays, namely a first display 155 and a second display 156.

A terminal shown in FIG. 5 is a folder type terminal having a folder portion folderably coupled to a main body. The first display 155 mounted to the folder portion may be a light-transmittable or transparent type of display such as TOLED; however, the second display 156 mounted to the main body may be a non-transparent type such as an LCD. Each of the first and second displays 155 and 156 may be implemented as a touch screen supporting a touch input.

For example, if a touch (i.e., a contact touch or a proximity touch) is detected on the first display 155 (or TOLED), the controller 180 may operate such that at least one image may be selected from an image list displayed on the first display 155 (or TOLED) or the at least image may be displayed (or run) according to a touch type or a touch time.

A description may be provided of a control of information displayed on another display or the second display 156 (or LCD) upon a touch input on the first display 155 (or TOLED) externally exposed in an overlapped configuration based on several input algorithms divided into touch, long touch, long touch and/or drag and the like.

In the overlapped state (i.e., a closed state of the mobile terminal), the first display 155 (or TOLED) may be overlaid on an upper side of the second display 156 (or LCD). In this state, if another type of touch, e.g., a long touch (for example, a touch lasting for 2 or 3 seconds), which is different from a previous touch for controlling an image displayed on the first display 155 (or TOLED), is detected, the controller 180 may operate such that at least one image is selected from an image list displayed on the second display 156 (or LCD) based on the detected touch input. The result from execution of the selected image may be output on the first display 155 (or TOLED).

The long touch may also be input upon selectively moving a desired object or objects displayed on the second display 156 (or LCD) to the first display 155 (or TOLED) (without an execution of the desired object). That is, when a user inputs a long touch on one region of the first display 155 (or TOLED) corresponding to a specific object of the second display 156 (or LCD), the controller 180 may operate such that the corresponding object is shifted onto the first display 155 (or TOLED) to be displayed thereon. Objects displayed on the first display 155 (or TOLED) may also be shifted to the second display 156 (or LCD) for displaying responsive to a predetermined touch input, for example, flicking, swirling and the like applied to the first display 155 (or TOLED). FIG. 5 exemplarily shows an example where the second menu displayed on the second display 156 (or LCD) is shifted to the first display 155 (or TOLED) for displaying.

If another input, for example, a drag is detected together with the long touch, the controller 180 may operate such that a function associated with the selected image by the long touch is executed, for example, a preview screen for the selected image is output on the first display 155 (or TOLED). FIG. 5 exemplarily shows an example of displaying a preview (e.g., a man's photo) associated with the second menu (e.g., an image file) is executed.

In the output state of the preview screen, if dragging toward another image on the first display 155 (or TOLED) is further executed along with maintaining the long touch, the controller 180 may move a select cursor (or a select bar) of the second display 156 (or the LCD) and may display an image selected by the select cursor on a preview screen (e.g., a woman's photo). Upon completion of the touch (i.e., a long touch and a drag), then the controller 180 may display the previous image selected by the long touch.

The touch operation (e.g., a long touch and a drag) may be equally applied to an example where a sliding (an operation of a proximity touch corresponding to the drag) is detected together with a long proximity touch (i.e., a proximity touch that lasts for at least two or three seconds) to the first display 155 (or TOLED).

If a touch excluding the above described touch inputs is detected, the controller 180 may operate as equal as controlling typical touch inputs.

The method for controlling a touch operation in the overlapped configuration may be applicable to any type of terminal having a single display. The method may be applied to other types of terminals as well as a folder type terminal having a dual display.

FIGS. 6A to 6C and 7A to 7B illustrate proximity touch recognition regions in which a proximity signal is detected and a haptic (tactile) region in which a tactile effect is generated.

Figures 6A, 6B, 6C:
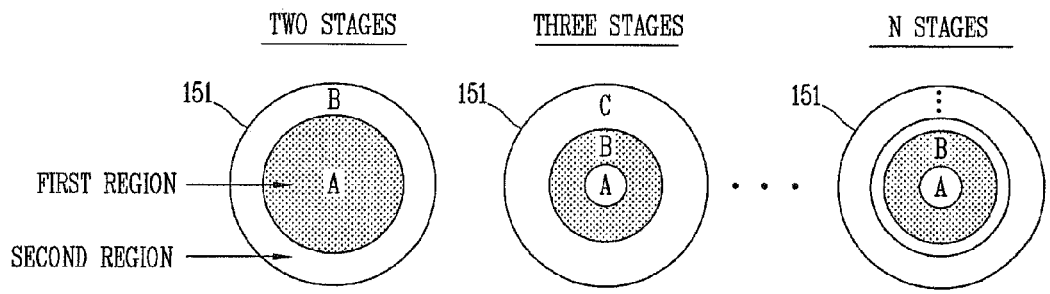
FIGS. 6A to 6C and 7A to 7B illustrate proximity touch recognition regions in which a proximity signal is detected and a haptic region in which a tactile effect is generated.

FIGS. 6A to 6C represent objects such as icons, menu items and/or the like in a circular form for ease of explanation. A region of the display 151 on which an object is displayed may be divided into a first region A at a center and a second region B surrounding the first region A, as shown in FIG. 6A. The first and second regions A and B may generate tactile effects having different strengths and/or patterns from each other. For example, such regions may generate a two-step tactile effect that a first vibration is output when the second region B is touched, and a second vibration stronger than the first vibration is output when the first region A is touched.

If a proximity touch recognition region and a haptic region should simultaneously be set up at the object-displayed region, the haptic region for generating a tactile effect and the proximity touch recognition region for detecting a proximity signal may be set up differently. That is, the haptic region may be set up to be narrower than the proximity touch recognition region and/or wider than the proximity touch recognition region. For example, in FIG. 6A, a region including the first and second regions A and B may be set to the proximity touch recognition region, and the first region A may be set to the haptic region.

The object-displayed region may be divided into three regions A, B and C as shown in FIG. 6B, or into N(N>4) regions as shown in FIG. 6C. Each divided region may generate a tactile effect with a different strength or pattern. Even in case where a region having one object displayed thereon is divided (or separated) into three or more regions, the haptic region and the proximity touch recognition region may be set up differently depending on usage environments.

Figures 7A, 7B:
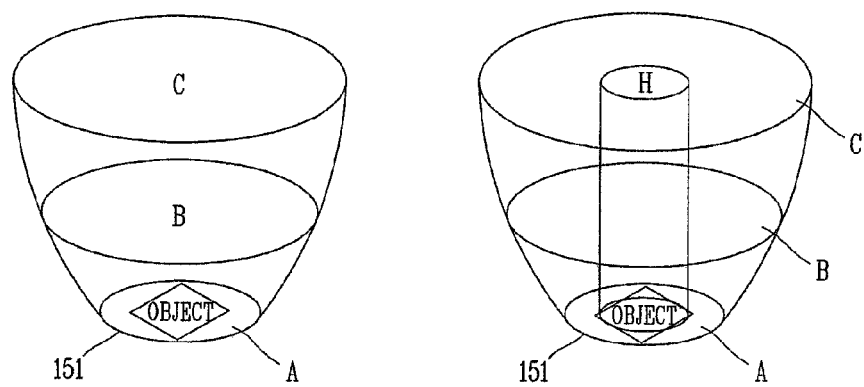

The proximity touch recognition region may have a different size depending on a proximity depth with respect to the display 151. That is, as shown in FIG. 7A, depending on the proximity depths with respect to the display 151, the corresponding proximity touch recognition regions may gradually become smaller in size in an order of 'C', 'B' and 'A'. On the other hand, the proximity touch recognition regions may gradually become greater in size. Even in these cases, the haptic region as indicated with 'H' region of FIG. 7B, may be set to have a constant size irrespective of the proximity depth with respect to the display 151.

Upon dividing (or separating) the object-displayed region for setting the haptic region and the proximity touch recognition region, a horizontal or vertical division, a radial division and/or a combination thereof may also be applied as well as a division in the circular form as shown in FIGS. 6A to 6C.

The display 151 may display at least one icon (e.g., a widget) related to a particular function of the mobile terminal on an idle screen (or mode) or on the task bar region.

The idle screen may be an initially displayed screen when a user manipulates the mobile terminal 100, and/or the task bar region may be a work station.

The icons may include function icons and contents icons of the mobile terminal. The function icons may include icons for executing operations of the mobile terminal such as calling, messaging, contact, alarm, camera, radio, scheduling, TV, MP3, game, internet and/or the like. The function icon may also be referred to as an application icon.

The contents icons may include icons such as phonebook, message, call, photo, video, MP3, document and/or the like associated with operations that are actually used by a user on the function icons.

The function icons and contents icons displayed on the display 151 may have any shape and/or may be arranged in any configuration. The icons may be arranged in various configurations such as pile icons, grid icons, fisheye icons, compression browser icons, fan-out icons, leafer icons, messy icons, cubic icons, tree icons and/or the like. The icons may independently be arranged and/or may be overlaid with respect to at least one icon.

The displayed function icons and contents icons may be received through a network and/or may be pre-stored in the mobile terminal 100.

The icons displayed on the display 151 may have a chance of collision due to a user's key manipulation or touch operation (i.e., an actual touch and/or a proximity touch). That is, an icon collision may be conducted by a consecutive input of keys corresponding to the corresponding icons, a consecutive touch, a touch & drag (or a proximity touch & drag), a multi-touch (or a multi-proximity touch) and/or a secondary click A (or B).

The different types of icon collision may include a collision between function icons, a collision between a function icon and a contents icon, and/or a collision between contents icons. That is, the icon collision may include a collision between a same type of icons and/or between different types of icons. The icon collision may include any operation for performing the same operation as an actual collision even when two icons do not meet such as a touch gesture (e.g., an input+a preset gesture), a collision between different types of input devices (e.g., a finger mouse+a touch or a touch+a voice) and/or the like.

The user input unit 140 may receive at least one signal that is sent by a user to specify an icon in order to generate (or provide) an icon collision. The at least one signal may include a key input (e.g. various key inputs, finger mouse), a touch input (e.g. consecutive touch, touch & drag, multi-touch, touch gesture), and/or a voice input, all associated with the corresponding icon.

The memory 160 may store information generated due to the icon collision as well as information relating to types of icons and/or icon arrangement(s). The information generated due to the icon collision may include information related to specific functions belonging to function icons and/or contents icons, and information related to changes (e.g., combination, synthesis, edition, etc.) in function icons and/or contents icons due to the icon collision.

The controller 180 may perform a control operation based on a type of the icon collision. The controller 180 may not only execute an icon combination generated due to the icon collision but may also display various information (e.g., combination, synthesis, lock/unlock, screen division, etc.) related to the icon combination.

The wireless communication unit 110 may receive information relating to icons through a network, and may send contents and/or applications generated due to the icon collision to another terminal or a network server.

Embodiments of the present invention may provide a method for executing a desired operation of a mobile terminal without menu selection as well as user providing interfaces for functions and contents by virtue of a concept (behavior) called a collision of a plurality of icons on a graphic UI (GUI).

Figure 8:
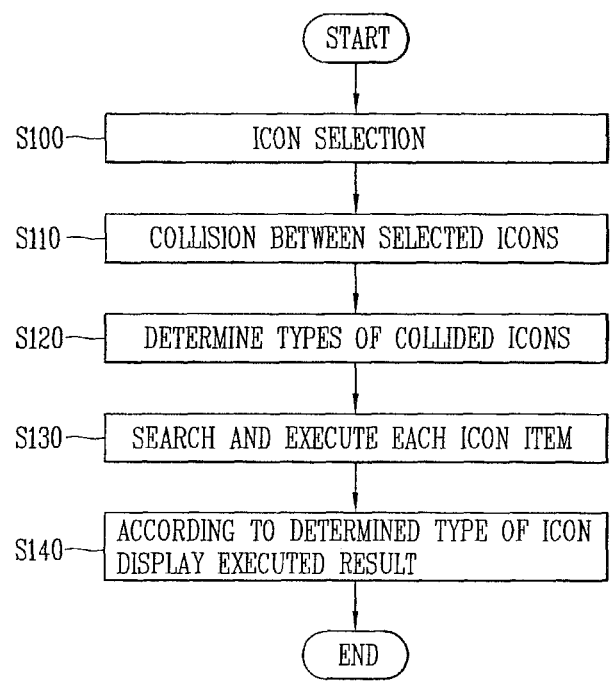
FIG. 8 is a flowchart illustrating an icon collision controlling method of a mobile terminal in accordance with an embodiment of the present invention.

FIG. 8 is a flowchart illustrating an icon collision controlling method of a mobile terminal in accordance with an embodiment of the present invention. Other operations, orders of operations and embodiments may also be provided.

As shown in FIG. 8, an icon collision may include selecting an icon (e.g. a contents icon or a function icon) to collide (operation S100).

Figure 9:
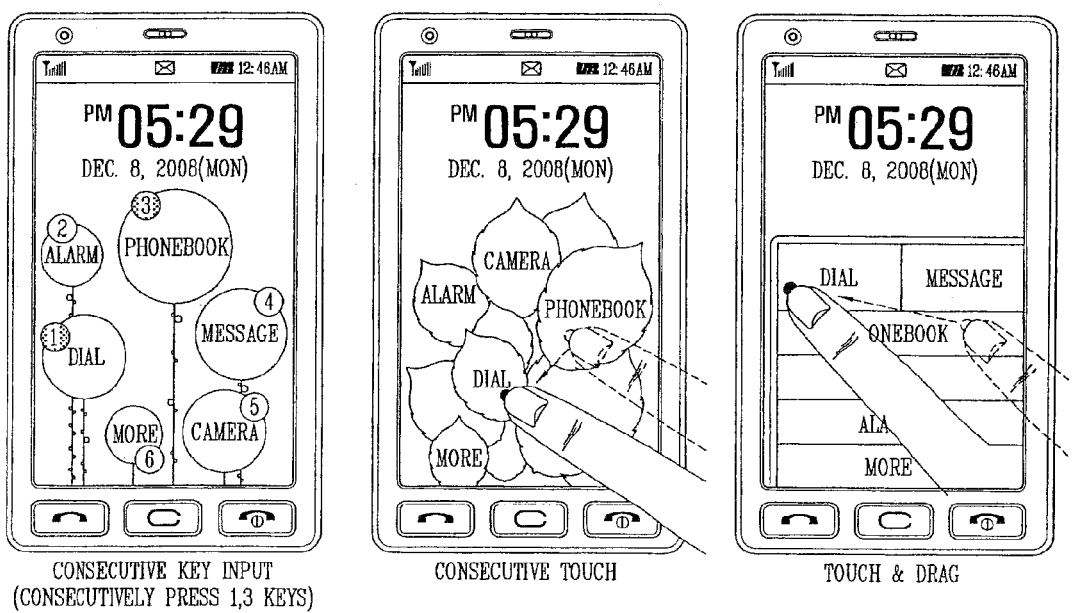
FIG. 9 is a view illustrating at least one function icon (e.g., an application icon) and a contents icon displayed on a screen.
Figure 9:
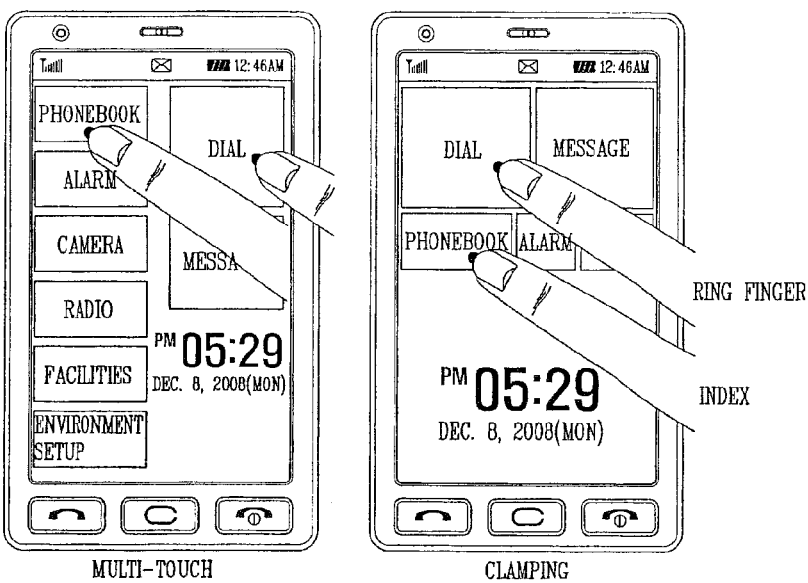

FIG. 9 illustrates at least one function icon (or an application icon) and contents icon displayed on an idle screen or a work station. A user may select desired icons from the displayed icons to execute specific terminal operations and then perform a collision for the selected icons (operation S110).

Examples of an icon collision may include a consecutive key input, a consecutive touch or multi-touch of an icon, and/or an actual movement of one icon to collide with another icon (i.e., a touch & drag). That is, the icon collision may include the following examples:

1) A consecutive input of a key for a corresponding icon;
2) A consecutive touch of an icon;
3) An actual touch & drag (or a proximity touch & drag);
4) A multi-touch (or a multi-proximity touch);
5) Clamping (secondary click A or B);
6) A gesture;
7) A touch+voice recognition; and
8) A touch+input device (finger mouse, joystick).

Embodiments of the present invention may use both a real touch and a proximity touch for implementing an icon collision with respect to at least one icon displayed on a screen. That is, a variety of icon collisions may be generated by a real touch (e.g., a consecutive touch, a multi-touch and/or a touch & drag) on a target to collide, a proximity touch (e.g., a consecutive touch, a multi-touch and/or a touch & drag), a rotation, a size variation and/or a location shift of the target to collide responsive to the proximity touch, and/or other operations. The proximity touch and the collision using the same may now be described.

FIGS. 10A to 10E are views illustrating icon size variation and icon movement in response to a proximity touch according to an embodiment.

Figure 10A:
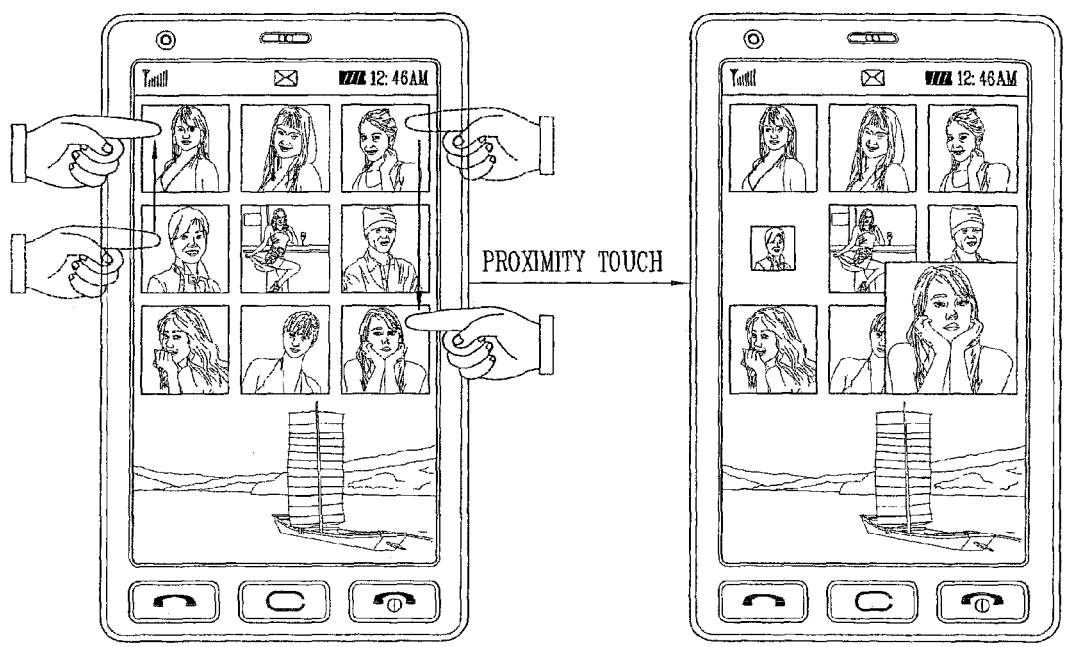
FIGS. 10A to 10E are views illustrating icon size variation and icon movement in response to a proximity touch according to an embodiment.

As an example of the proximity touch, a size of an icon may change according to a proximity distance. That is, as shown in FIG. 10A, after moving one or more fingers close within a predetermined distance, an icon with a closer proximity distance may enlarge in size and an icon with a farther proximity distance may reduce in size. Consequently, a user may drag a specific icon to the right while maintaining the proximate state of the finger to move to another icon, thereby generating a collision between icons.

Figure 10B:
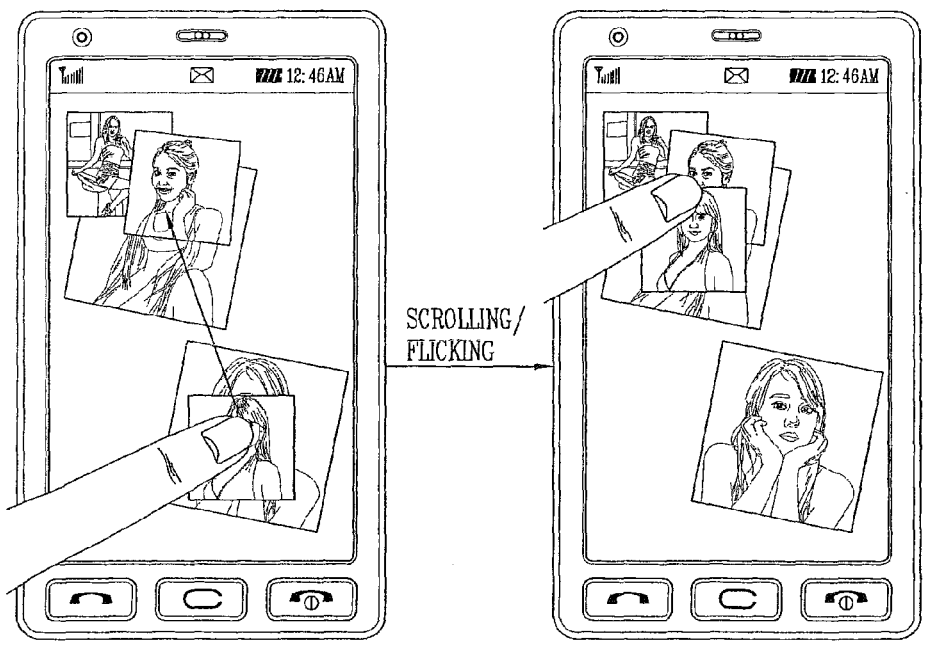

When various icons are present on a screen in an overlapped state, a desired icon may first be selected to generate a collision by a proximity touch. Even in this example, as shown in FIG. 10B, the user may move one or more fingers proximate to the screen within a predetermined distance and shake the fingers like sweeping with a broomstick in all directions so as to move the icons (for facilitating selection). Afterwards, the user may perform a proximity touch & drag for the moved specific icons, thereby generating the icon collision.

Figure 10C:
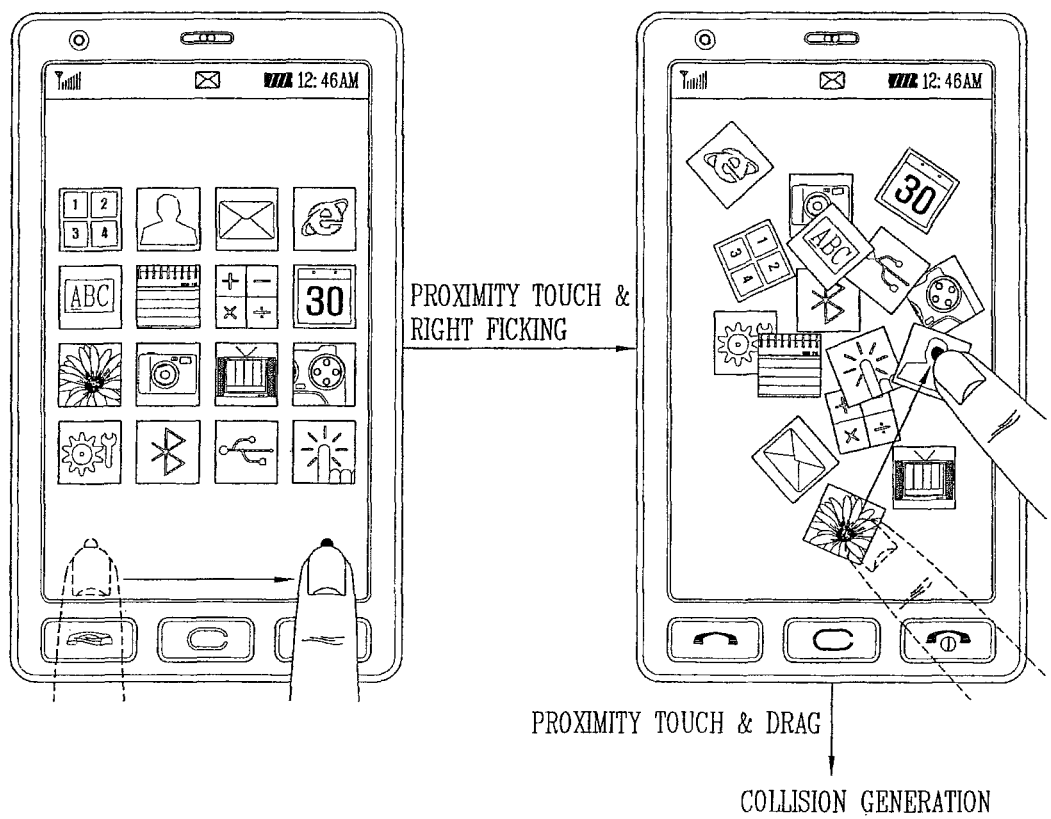

FIG. 10C illustrates an example in which a proximity touch & flick is performed to render icons lean toward the right side, for example, by sweeping the icons, and then a proximity touch & drag may be performed for the moved specific icons so as to generate the icon collision. This manner may represent an example of bringing about a user's interest.

Figure 10D:
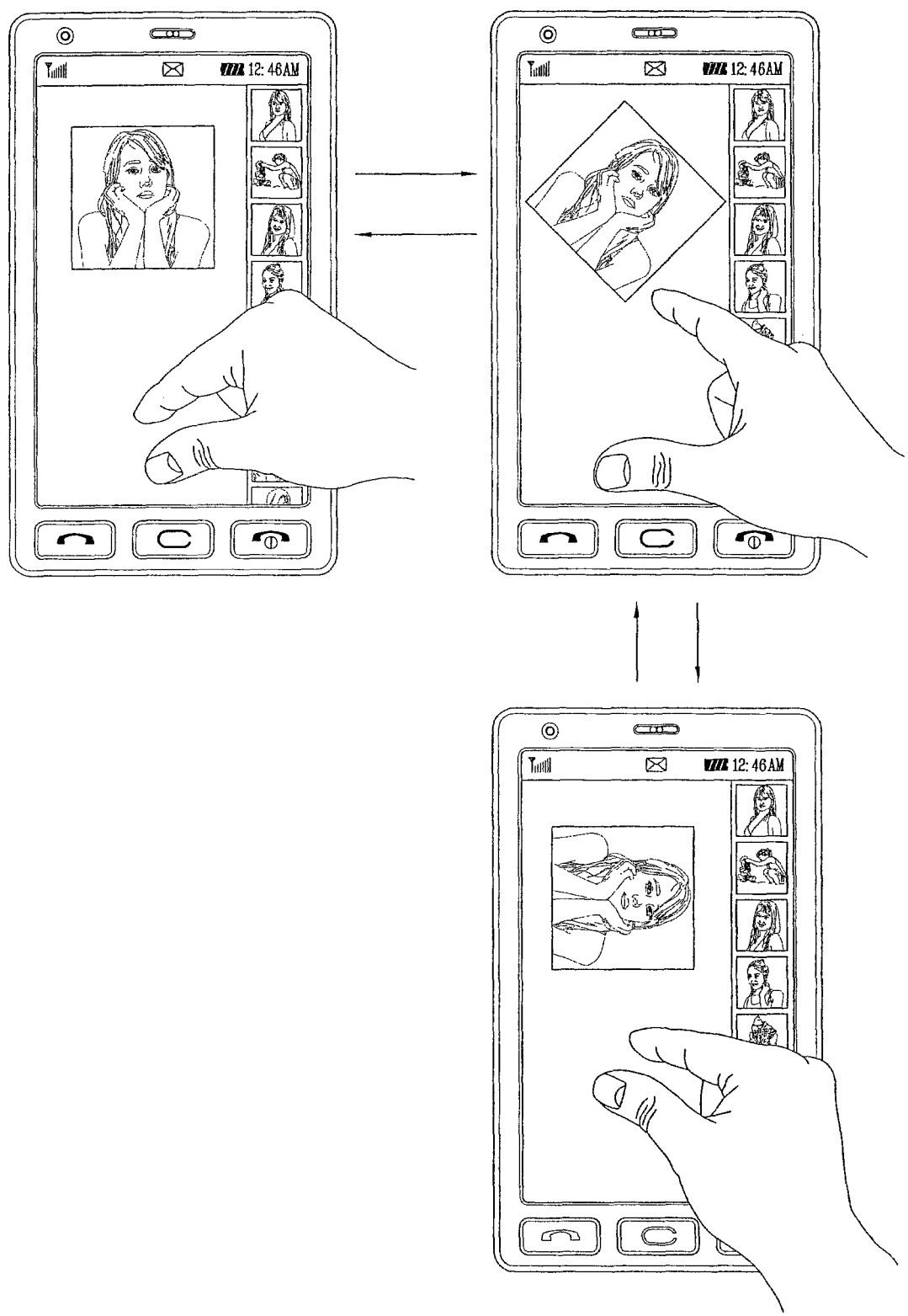

FIG. 10D illustrates an example in which one or more fingers may move proximate to an icon displayed on a screen within a predetermined distance and rotate clockwise or counterclockwise to rotate the icon, thereby performing an icon movement and/or an icon collision.

Figure 10E:
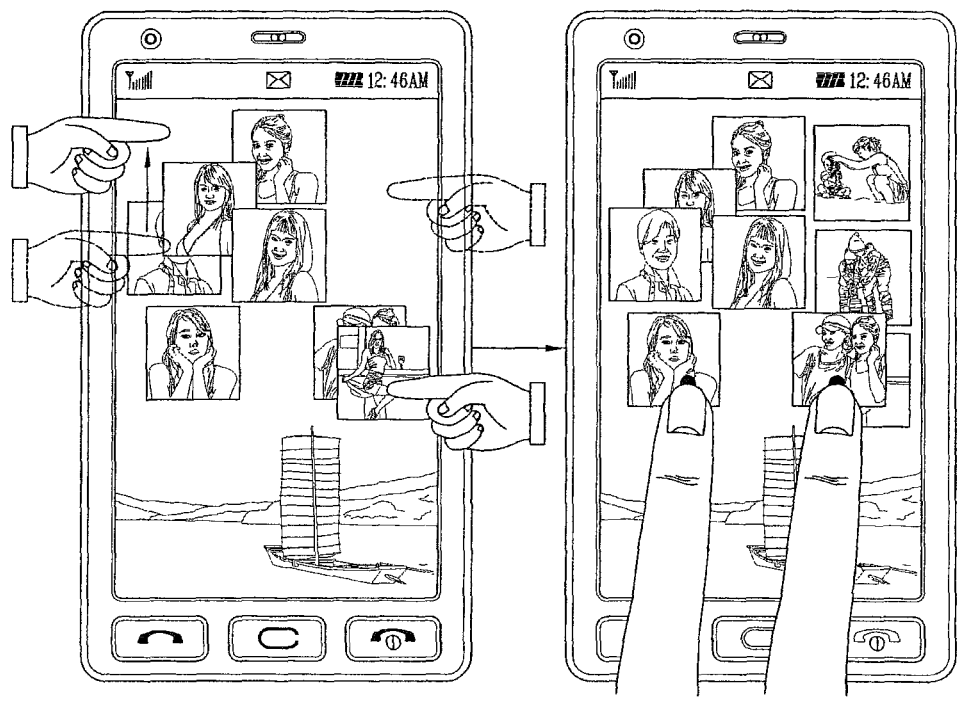

FIG. 10E illustrates an example in which when several icons are present on a screen in an overlapped state, then desired icons may be selected to generate a collision. As shown in FIG. 10E, when one or more fingers may move proximate to the screen within a predetermine distance, the controller 180 may control such that a layer of icons with a closer proximity distance may be displayed forward (other icons) and a layer of icons with a farther proximity distance may be displayed behind (other icons). Accordingly, the user may perform the proximity touch & drag for the displayed icons so as to generate an icon collision.

Figure 11A:
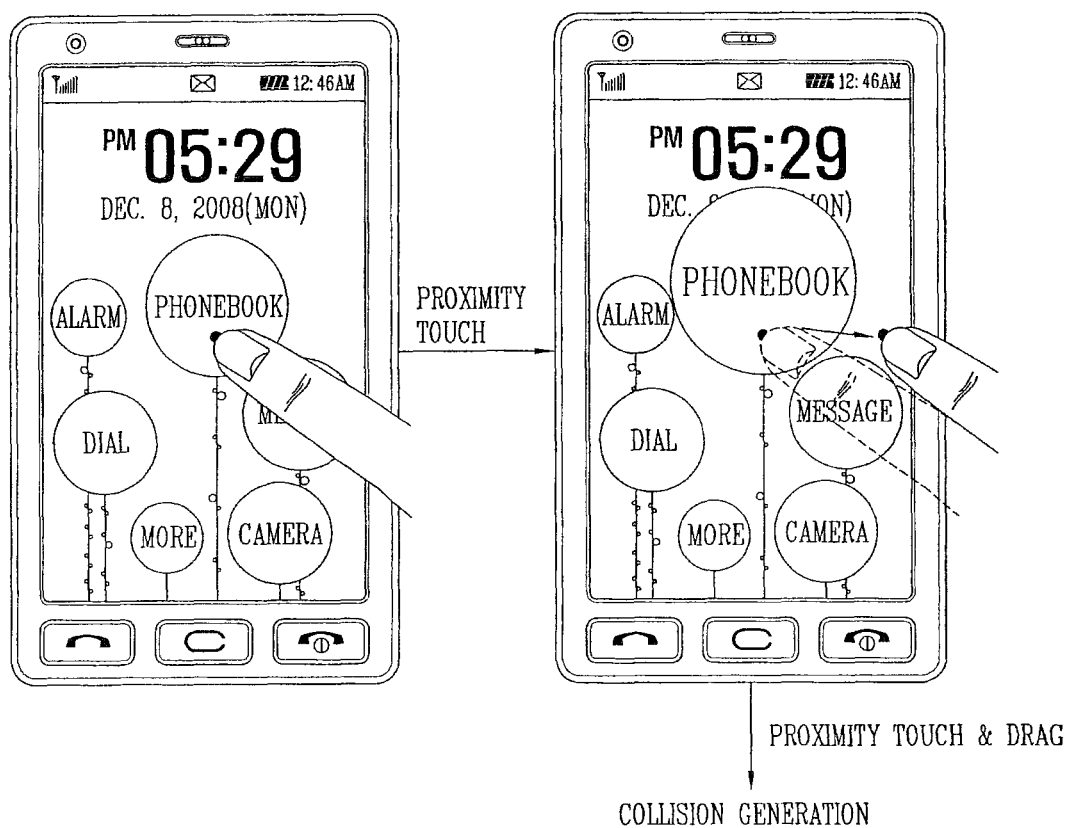
FIGS. 11A and 11B are views illustrating generating an icon collision in response to a proximity touch according to an embodiment.
Figure 11B:
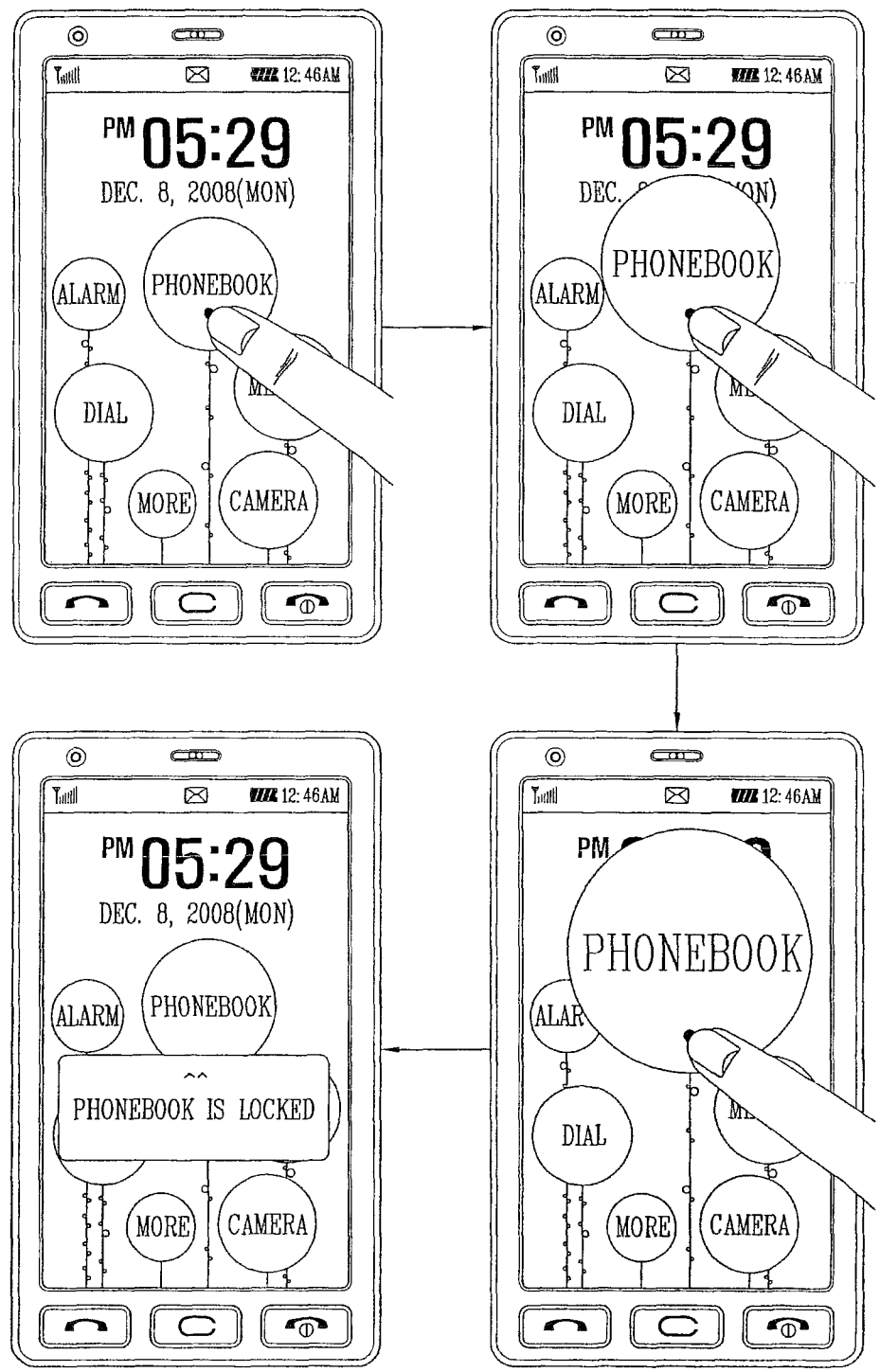

FIGS. 11A and 11B are views illustrating generating an icon collision in response to a proximity touch according to an embodiment.

As shown in FIG. 11A, a collision method using a proximity touch may be a proximity touch & drag. That is, an icon (e.g., a phonebook icon) with an enlarged size responsive to a proximity touch may be dragged to move proximate to another icon, thereby generating a collision therebetween. In addition to this method, as shown in FIG. 11B, after a user moves one or more fingers proximate to a screen within a predetermined distance, when the user holds the proximate state at a specific position for a preset time, the controller 180 may perform a lock or an unlock for a corresponding icon or screen. Upon collision onto a side portion of the enlarged icon responsive to the proximity touch, the controller 180 may perform an operation of the corresponding icon.

Therefore, an appropriate icon collision method may be selectable by a real touch, a proximity touch and/or other various input devices according to shape and/or arrangement of function icons and contents icons.

Upon generation of at least one icon collision, the controller 180 may determine types of the collided icons (operation S120), and may thereafter execute an actual operation of each function item and/or each contents item based on the determined types of icons and/or execute a function associated with two icon items (operation S130). The controller 180 may display results and information relating to each icon item executed (or converted) due to the collision (operation S140).

As one example, upon collision between two selected function icons, the controller 180 may execute an item of an icon to be collided based upon an icon to collide, and thereafter display detailed search results and/or a screen for performing an additional input (edition or additional search). In this example, when the two function icons have a same layer level, the screen may be divided (or separated) to display execution screens for the two icons, whereas when the two function icons have different layer levels, an icon with a high level may be executed on the screen and an icon with a low level may be executed as a background. Further, when the two function icons that collided are functions belonging to a same attribute group, the two function icons may be combined and displayed. As such, when the icon collision between two function icons is generated, the displayed screen and the execution screen after the collision may be displayed in various manners based on the attribute of each icon.

As another example, upon collision between a function icon and a contents icon, the controller 180 may display information on each icon item on one divided screen, and/or perform a reproduction, a shortcut function and/or a menu execution for the contents item according to whether the corresponding function supports the corresponding content.

As another example, upon collision between two contents icons, the controller 180 may perform a variation (e.g. a combination, a synthesis, an edition, etc.) of the corresponding contents. The controller 180 may display information on each content item on divided screens (or separated screens) while executing functions of the corresponding contents, and/or display information on each contents item on divided screens while executing functions combined with the corresponding contents. Operations according to the type of the icon collision may be described in more detail as follows.

Figure 12A:
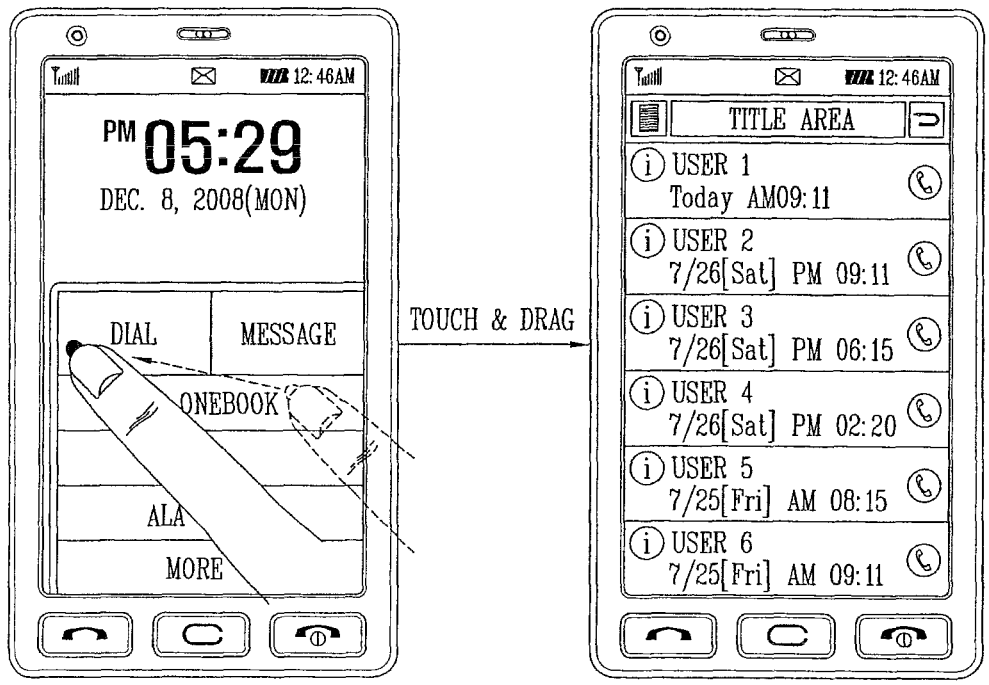
FIGS. 12A to 12D are views illustrating a control operation upon a collision between function icons.
Figure 12B:
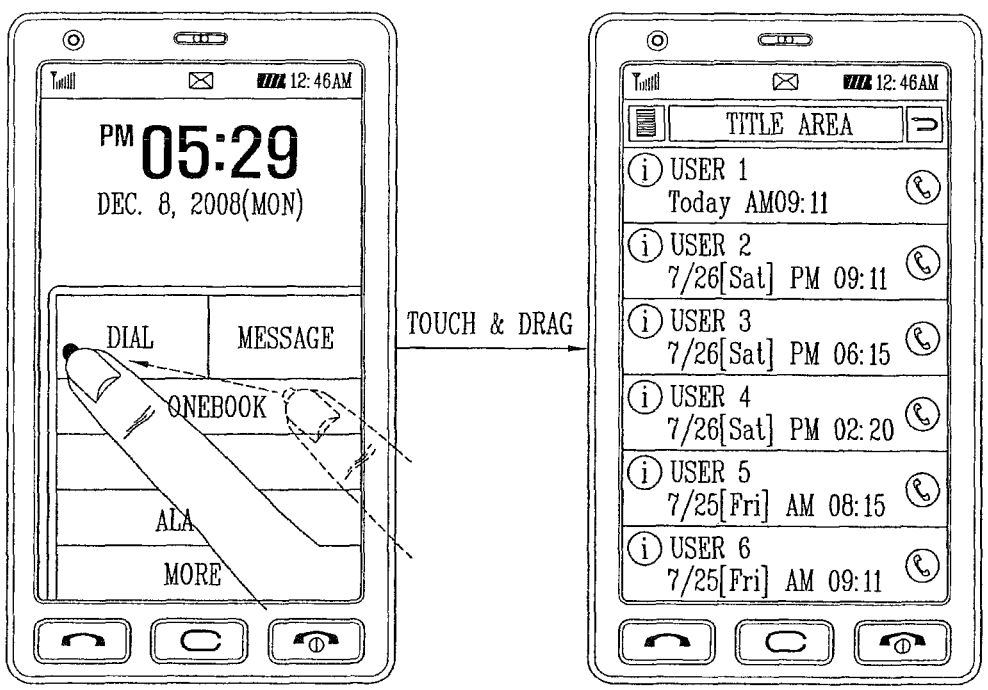

FIGS. 12A to 12D are views illustrating a control operation upon a collision between function icons according to an embodiment. FIGS. 12A and 12B illustrate examples of displaying search results by executing an item of a function icon (i.e., a call or a message) to be collided based upon a function icon (i.e., a phonebook) to collide upon collision between mutually associated function icons.

As shown in FIG. 12A, a user may select two icons to collide with each other from a plurality of function icons (or application icons). The function icons may include all types of function icons for executing operations of the mobile terminal such as call (or dialing), message, alarm, camera, radio, schedule, TV, MP3, game, internet and/or the like.

When a user selects a first function icon from the plurality of function icons by a touch & drag to collide to a second icon, the controller 180 may search for a list of frequently used (or latest) items of the first function icon and may display the searched items on the display 151. For example, as shown in FIG. 12A, when the user collides a phonebook icon with a call (or dial) icon, the controller 180 may search for only a frequent call list from a plurality of items of the phonebook icon and display the list on a screen.

When the user collides a phonebook icon with a message icon by a multi-touch, the controller 180, as shown in FIG. 12B, may search for only a list of recent messages (e.g., messages sent or received within a preset duration) from a plurality of items of the phonebook icon and display the list on the screen.

Figure 12C:
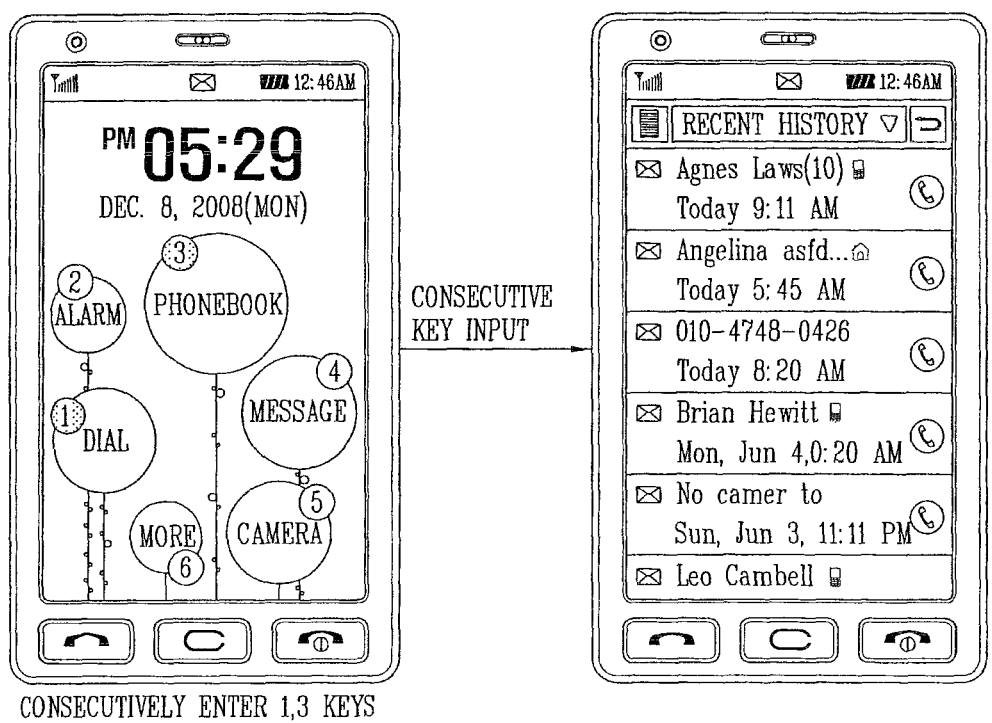
Figure 12D:
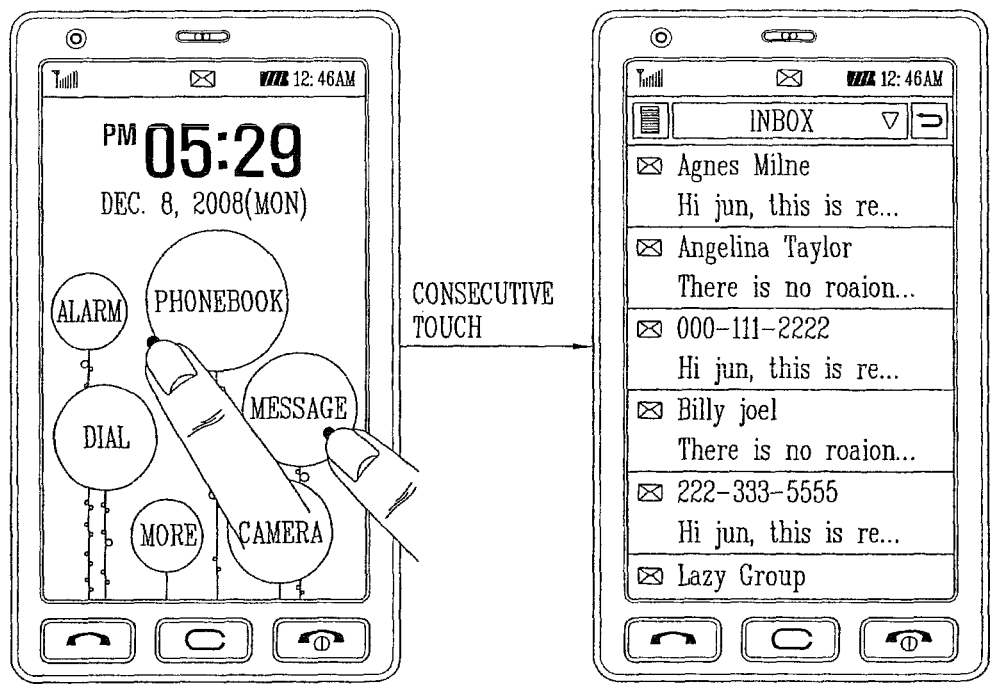

FIGS. 12C and 12D illustrate a collision between a same type of function icons, which exemplarily illustrate displaying of phone number items that exist in a phonebook upon the collision, from among a connected call list or a received message list.

As shown in FIG. 12C, when a user consecutively inputs first and third keys to collide a phonebook icon with a call icon, the controller 180 may display items, present in a phonebook, of connected calls (i.e., connected calls excluding calls from or to unregistered numbers).

As shown in FIG. 12D, when a user collides a phonebook icon with a message icon by a consecutive touch, the controller 180 may display items, present in the phonebook, from among received message items (i.e., received message items excluding messages from unregistered numbers).

In accordance with an embodiment, when a first function icon collides with (or to) a second function icon with a time attribute by a user, items matching the second function icon items may be searched from the first function icon items for displaying. That is, specific items may be searched and output based upon a time attribute value or a specific function may be allowed to be automatically executed after a time attribute value.

Figure 13A:
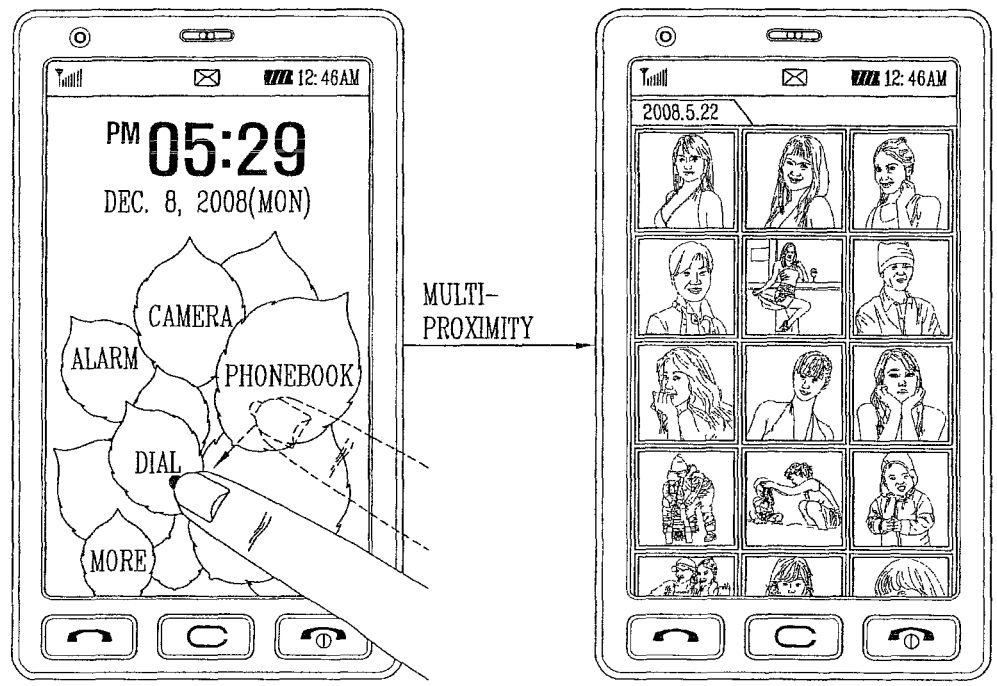
FIGS. 13A to 13C are views illustrating that upon an icon collision only an icon equal (or matching) to a second function icon item is detected from a first function icon items for displaying according to an embodiment.
Figure 13B:
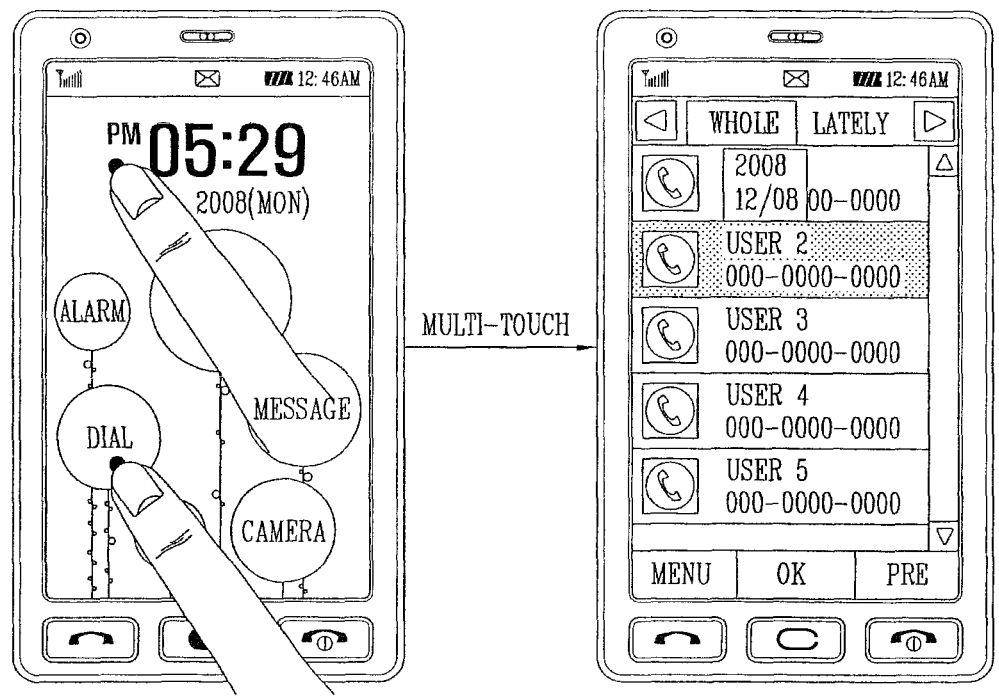
Figure 13C:
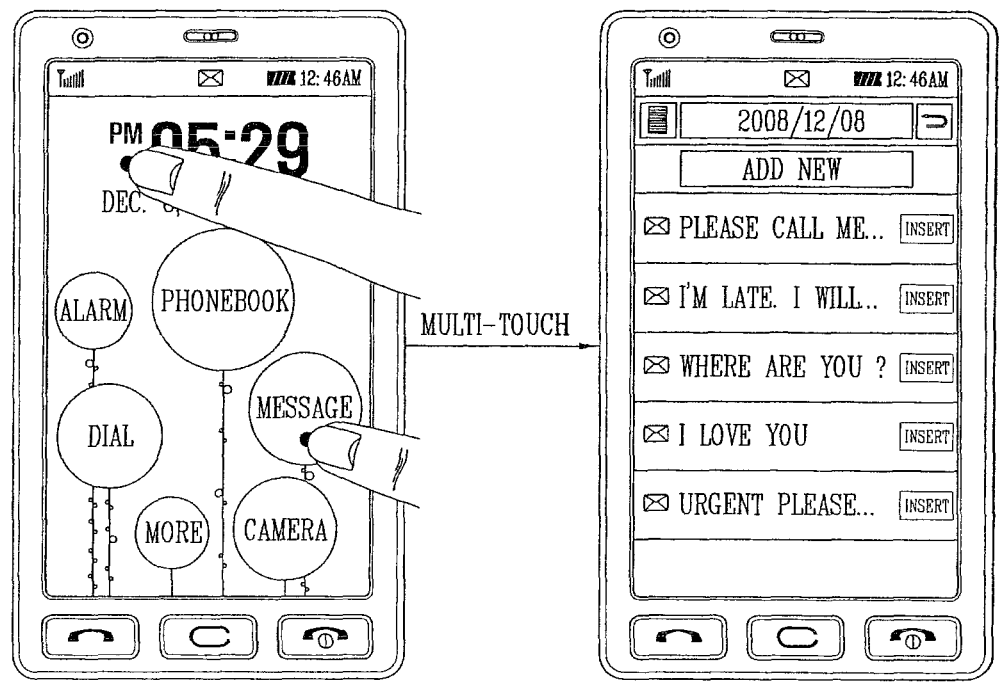

FIGS. 13A to 13C are views illustrating that upon an icon collision only icons matching second function icon items may be detected from first function icon items for displaying according to an embodiment.

As shown in FIG. 13A, when a user collides a camera icon with a schedule icon by a multi-touch (or a multi-proximity touch), the controller 180 may search and output only a list of images (photo/video) matching a selected scheduled date (e.g., May 22, 2008) from the camera items.

As shown in FIG. 13B, when a user collides a call icon with a schedule icon by a multi-touch, the controller 180 may search and output a list of connected calls matching the selected scheduled date (e.g., Dec. 8, 2008) from a connected call list.

As shown in FIG. 13C, when a user collides a message icon with a schedule icon by a multi-touch, the controller 180 may search and output only a list of received messages matching the selected scheduled date (e.g., Dec. 8, 2008) from the list of received messages.

FIGS. 14A to 14D are views illustrating a control operation upon collision between a function icon and an input icon according to an embodiment.

When a user collides first and second function icons of a plurality of function icons with each other by a predetermined touching method, the controller 180 may divide (or separate) a screen to simultaneously execute a first function item and a second function item corresponding to the first function item. The first function item may include an item that can be input and edited by the second function item.

Figure 14A:
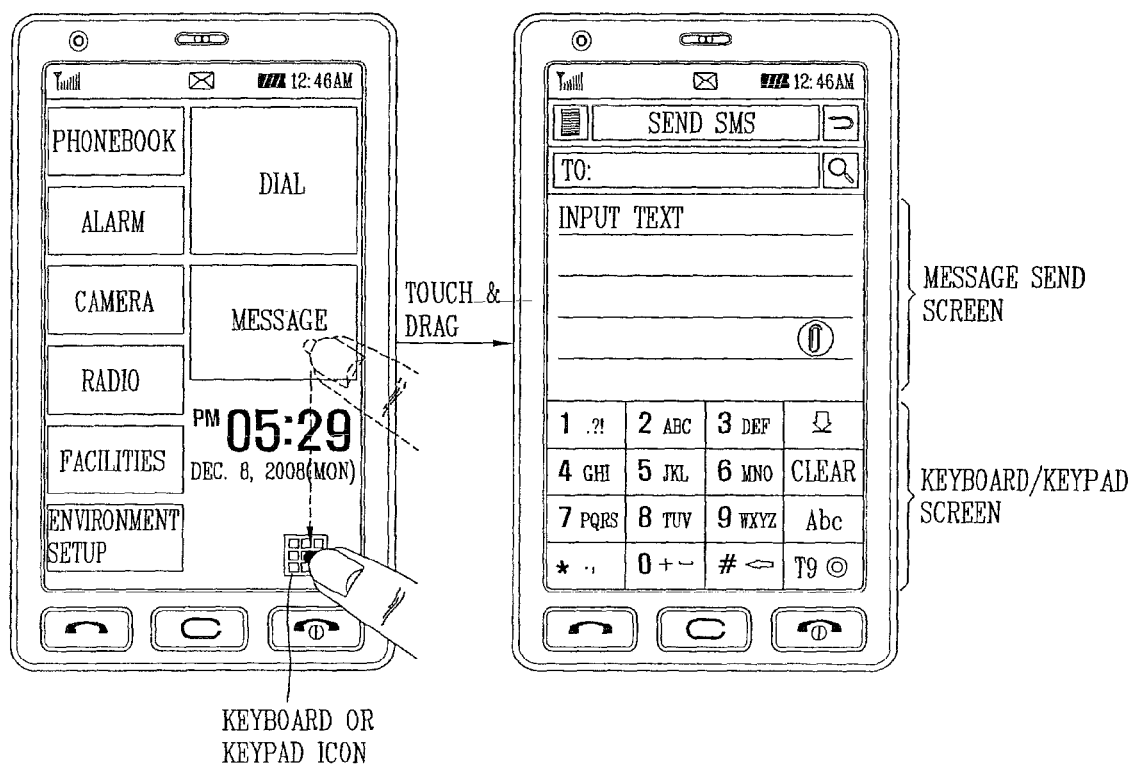
FIGS. 14A to 14D are views illustrating a control operation upon collision between a function icon and an input icon according to an embodiment.

Referring to FIG. 14A, when a message icon collides with an input icon (e.g., a keyboard or a keypad icon), the controller 180 may search for "Send message" as a messaging function item corresponding to an input icon item and may divide (or separate) the screen to simultaneously display a keyboard/keypad input screen and a message sending screen. An appropriate screen division ratio (or screen separation ratio) may be selectable.

The keyboard/keypad input screen and the message sending screen may be automatically displayed when two fingers are stretched out after inputting a multi-proximity touch to the message icon.

Figure 14B:
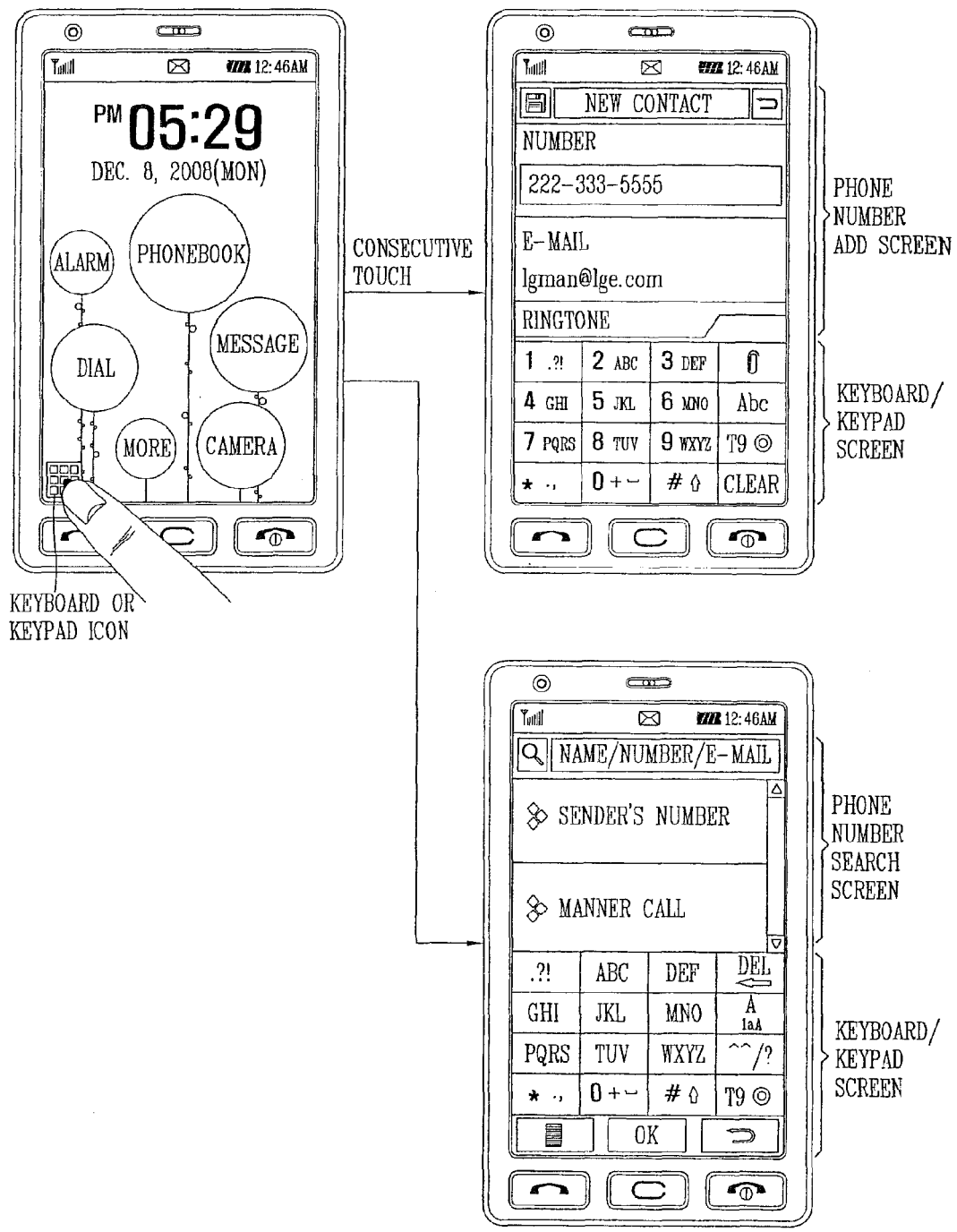

FIG. 14B illustrates an example of colliding a phonebook icon (other than the message icon of FIG. 14A) with the input icon (e.g., the keyboard or the keypad icon) so the operation is the same. As one example, when the phonebook icon collides with the keyboard or the keypad icon by a consecutive touch, the controller 180 may search and execute "Add phone number" as the phonebook function item corresponding to the keyboard or the keypad icon. During the operation, the controller 180 may divide (or separate) the screen to simultaneously execute the keyboard/keypad.

The corresponding icon screen and the keyboard/keypad screen may be simultaneously displayed when a user gives a proximity touch (or real touch) to a particular icon and then draws a preset shape (e.g., a circle, a rectangle, etc.). For example, upon drawing a rectangle after providing the proximity touch to the phonebook icon, the phone number add screen and the keyboard/keypad screen may be simultaneously displayed.

As another example, when the phonebook icon collides with the keyboard or the keypad icon by a real touch or a proximity touch, the controller 180 may search and execute "Search phone number" as a phonebook function item corresponding to the keyboard or the keypad icon, and may divide (or separate) the screen to simultaneously execute the keyboard/keypad.

Figure 14C:
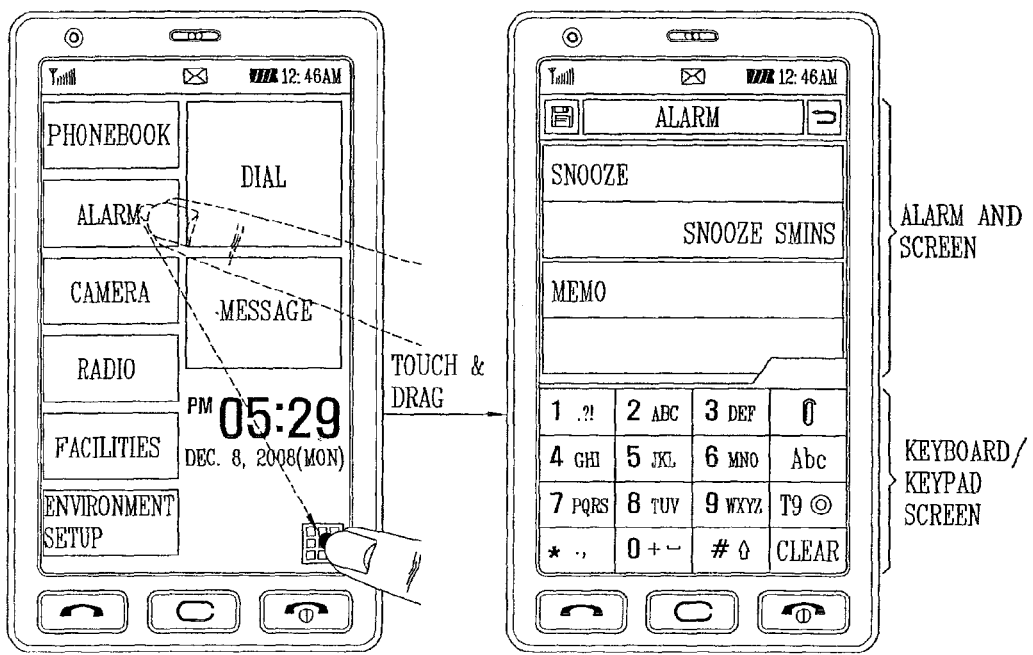
Figure 14D:
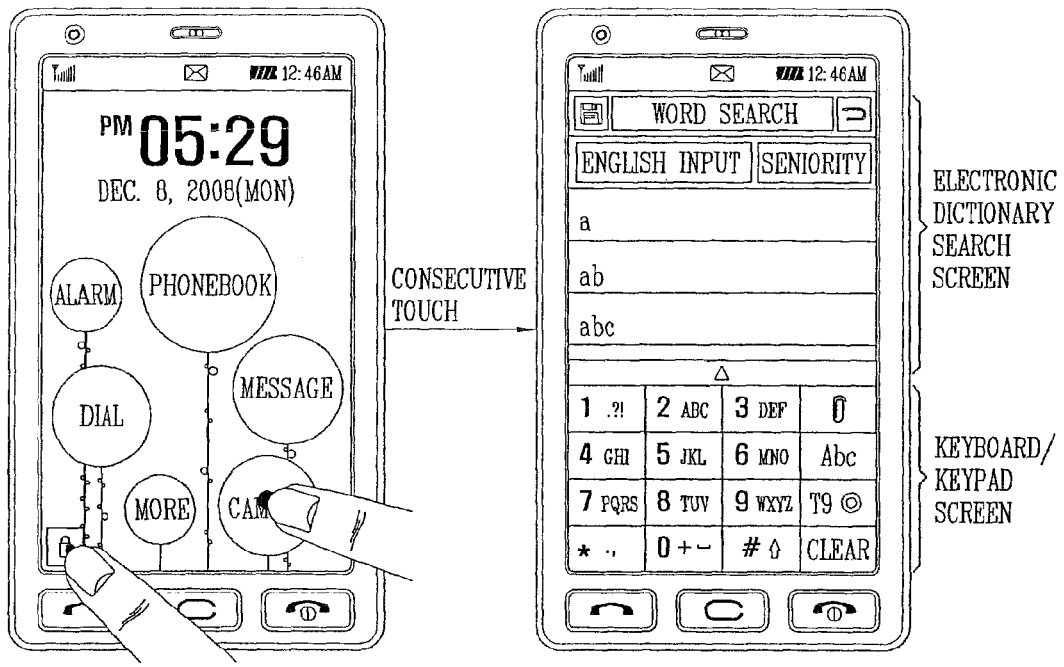

FIGS. 14C and 14D illustrate an example where an alarm icon or an electronic dictionary icon (other than the message icon of FIG. 14A) collides with the input icon (e.g., keyboard or keypad icon), the controller 180 searches and executes "Add alarm" or "Search Electronic dictionary" as an alarm function item corresponding to the keyboard or keypad icon, and divides (or separates) a screen to simultaneously execute the keyboard/keypad.

Embodiments of the present invention may be implemented such that when a schedule icon or a memo icon (other than the message icon of FIG. 14A) collides with the input icon (e.g., the keyboard or the keypad icon), the controller 180 may divide (or separate) a screen to allow a user to simultaneously display two function items.

The user may execute an edition of the phonebook, an addition of the alarm, a search for the electronic dictionary and/or the like by using the keyboard/keypad displayed on the screen.

FIGS. 14A to 14D illustrate an operation executed upon collision between mutually associated icons (i.e., the icons by which specific information can be input using the keyboard/keypad).

Figure 15A:
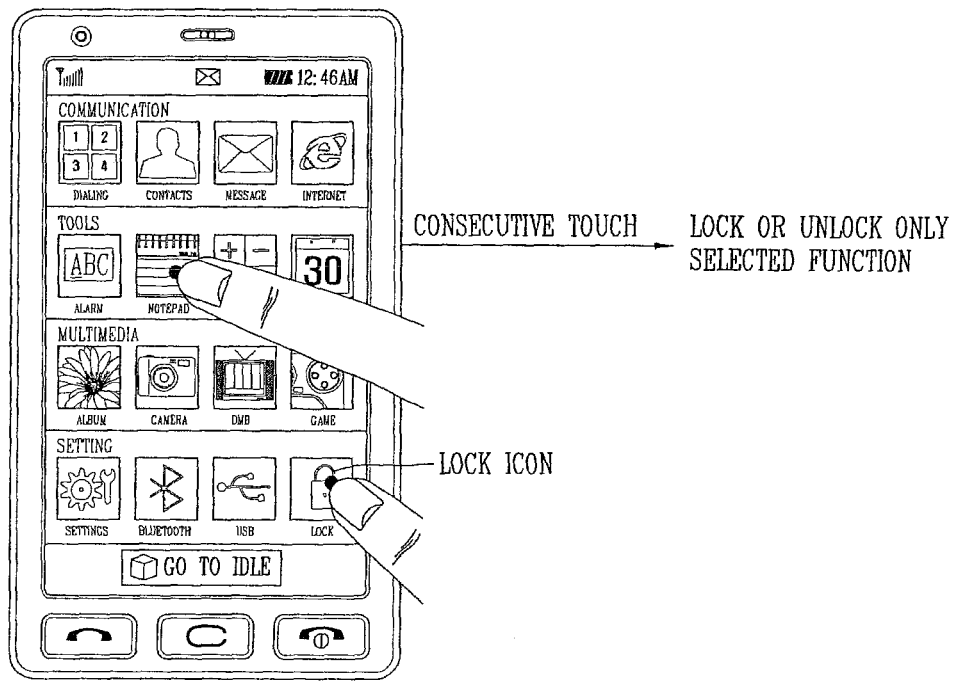
FIGS. 15A and 15B are views illustrating a control operation upon collision between a function icon and a lock icon according to an embodiment.
Figure 15B:
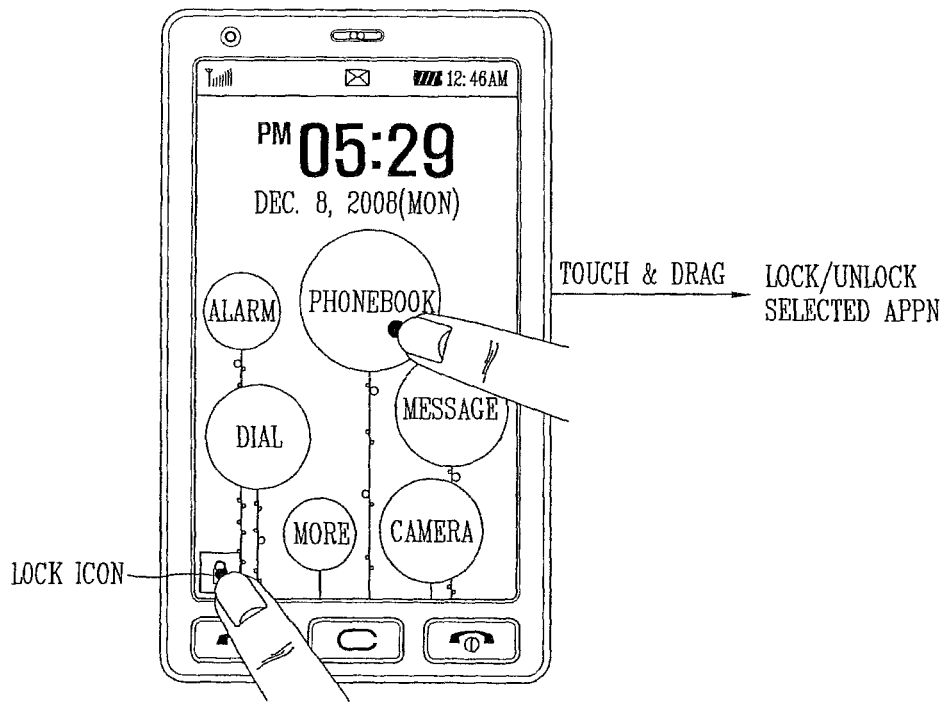

FIGS. 15A and 15B are views illustrating a control operation upon collision between a function icon and a lock icon according to an embodiment.

When a user collides first and second function icons of a plurality of function icons by using a predetermined touching method, the controller 180 may control the second icon item to be applied only to the first function icon item. The first function icon item may be at least one function icon, and the second icon item may be a lock icon. The at least one function icon may include both icons associated with a personal privacy (e.g., a phone number, a call list, a message, a schedule, things to do, a memo, an album, etc.) and icons associated with typical functions (TV, camera, game, internet, etc.).

For example, as shown in FIG. 15A, when a memo icon collides with a lock icon by a predetermined touching method, the controller 180 may perform locking or unlocking only for the memo icon item. When the memo icon item is currently in a locked state, the locked state may be first released. When the memo icon item is in an unlocked state, the memo icon item may be toggled to the locked state.

As shown in FIG. 15B, when a user collides the phonebook icon to the lock icon by a touch & drag, the controller 180 may perform locking or unlocking for a selected phonebook icon item.

Figure 16:
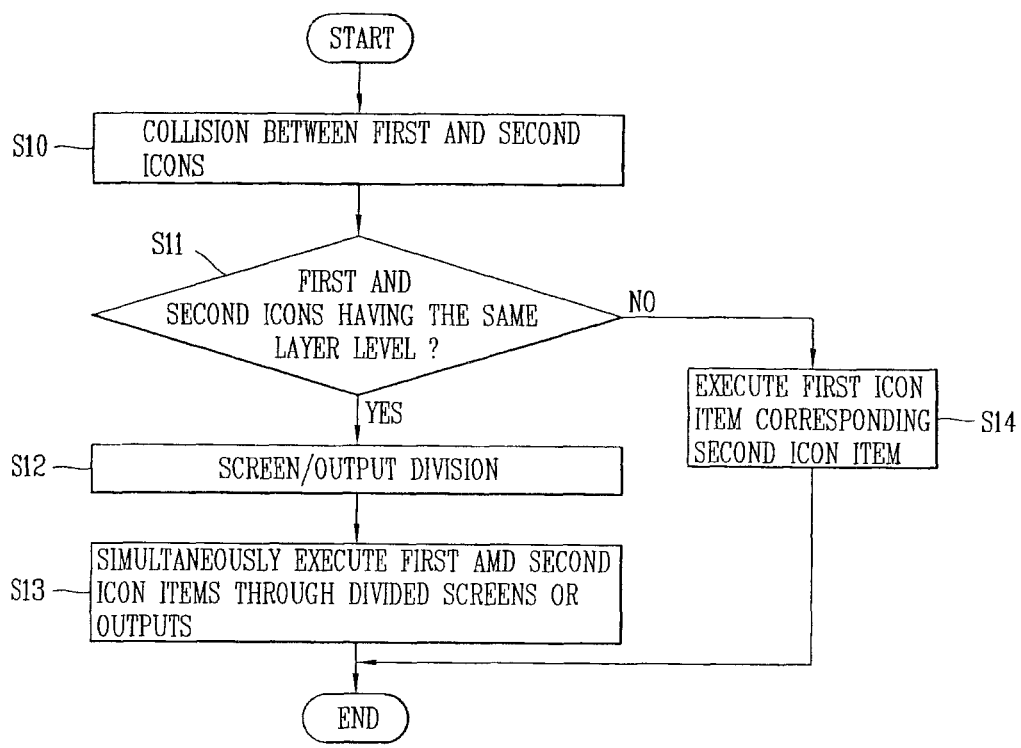
FIG. 16 is a flowchart illustrating a control method according to an icon level in an icon collision controlling method in accordance with an embodiment of the present invention.

FIG. 16 is a flowchart illustrating a control method according to an icon level in an icon collision controlling method in accordance with an embodiment of the present invention. Other operations, orders of operations and embodiments may also be provided.

As shown in FIG. 16, upon collision between first and second icons (operation S10), the controller 180 may determine layer levels of the first and second icons. The controller 180 may check (or determine) the layer level of each function from a database DB of the memory 160. When it is determined that the first and second icons have a same layer level (operation S11), the controller 180 may divide (or separate) a screen or an output device (e.g., a display and an audio output module) at a predefined ratio so as to simultaneously display or execute first and second icon items through the corresponding screens or output devices (operations S12 and S13). This method may include operations shown in FIGS. 13A to 13C.

On the other hand, when the first and second icons have different layer levels (operation S11), the controller 180 may execute the first icon item corresponding to the second icon item (operation S14). This method may include operations shown in FIGS. 12A to 12D and 13A to 13C.

FIGS. 17A to 17D are views illustrating an icon collision controlling method of a mobile terminal based upon an icon layer level based on an embodiment. FIGS. 17A to 17D illustrate when function icons colliding each other have different layer levels.

Figure 17A:
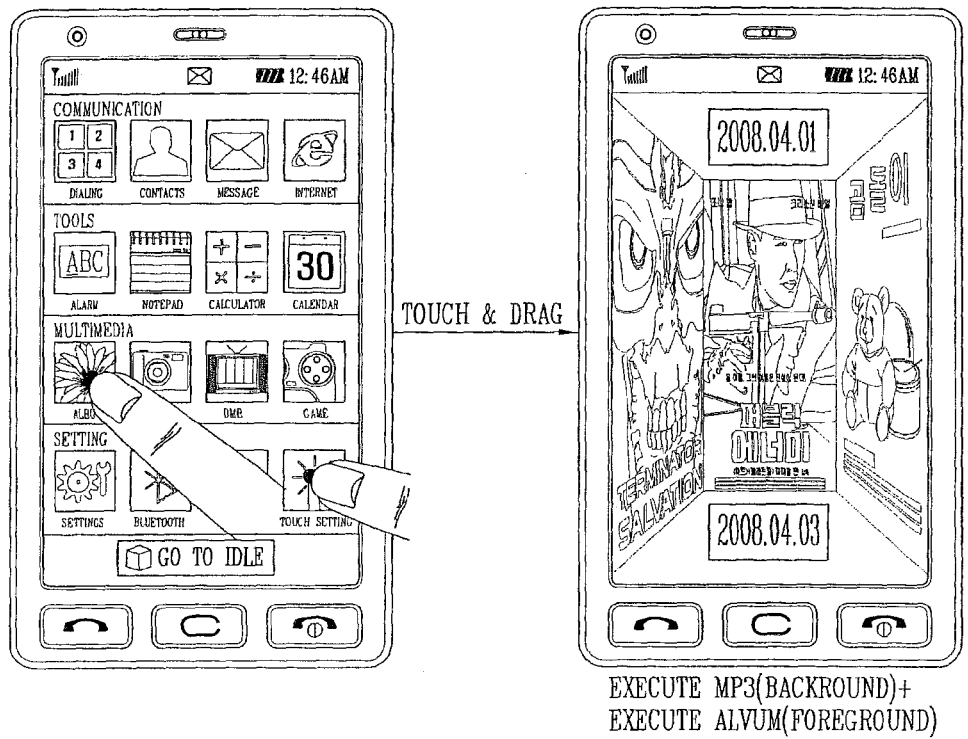
FIGS. 17A to 17D are views illustrating an icon collision controlling method of a mobile terminal based upon an icon layer level according to an embodiment.

As shown in FIG. 17A, when a user collides first and second function icons of a plurality of function icons by a predetermined touch (e.g., a consecutive touch), the controller 180 may simultaneously execute the first and second function icons as a foreground and a background, respectively, based on layer levels of the two function icons. The controller 180 may execute a function with a high layer level as the foreground and a function with a low layer level as the background.

For example, when an album icon collides with an MP3 icon by a consecutive touch, because the album layer level value is higher than the MP3 layer level value, the controller 180 may execute the MP3 as the background and the album as the foreground. The user may view photos while listening to MP3.

Figure 17B:
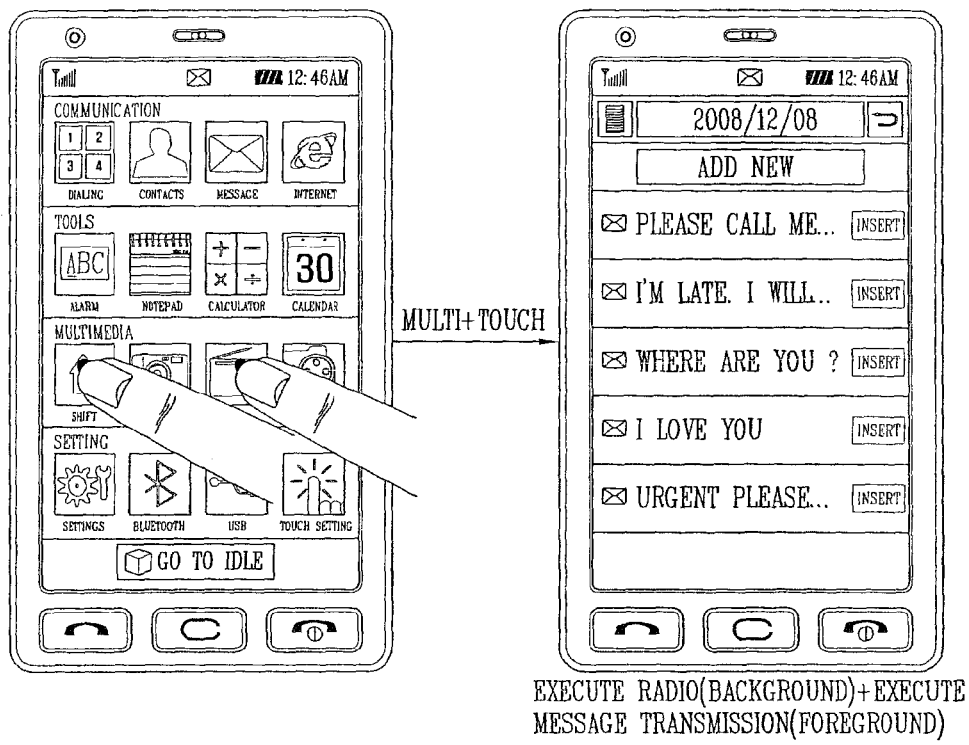

FIG. 17B illustrates an example of collision between a message icon and a radio icon with different layer levels.

When the message icon collides with the radio icon by a multi-touch, because the message layer level value is higher than the radio layer level value, the controller 180 may execute the radio as the background and the message transmission as the foreground. Consequently, the user may send a message while listening to the radio.

Figure 17C:
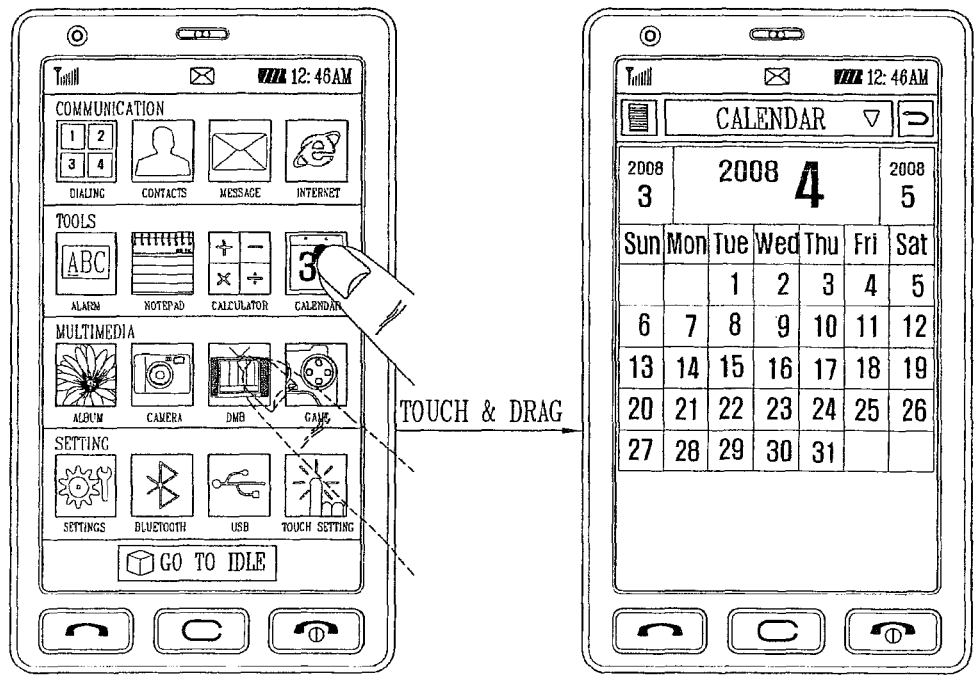

FIG. 17C illustrates an example of collision between a TV icon and a calendar icon with different layer levels.

As shown in FIG. 17C, when the TV icon collides with the calendar icon by a touch & drag, because the calendar layer level value is higher than the TV layer level value, the controller 180 may simultaneously execute the TV as the background and the calendar as the foreground. That is, the user may check (or determine) his schedule while watching the TV.

Figure 17D:
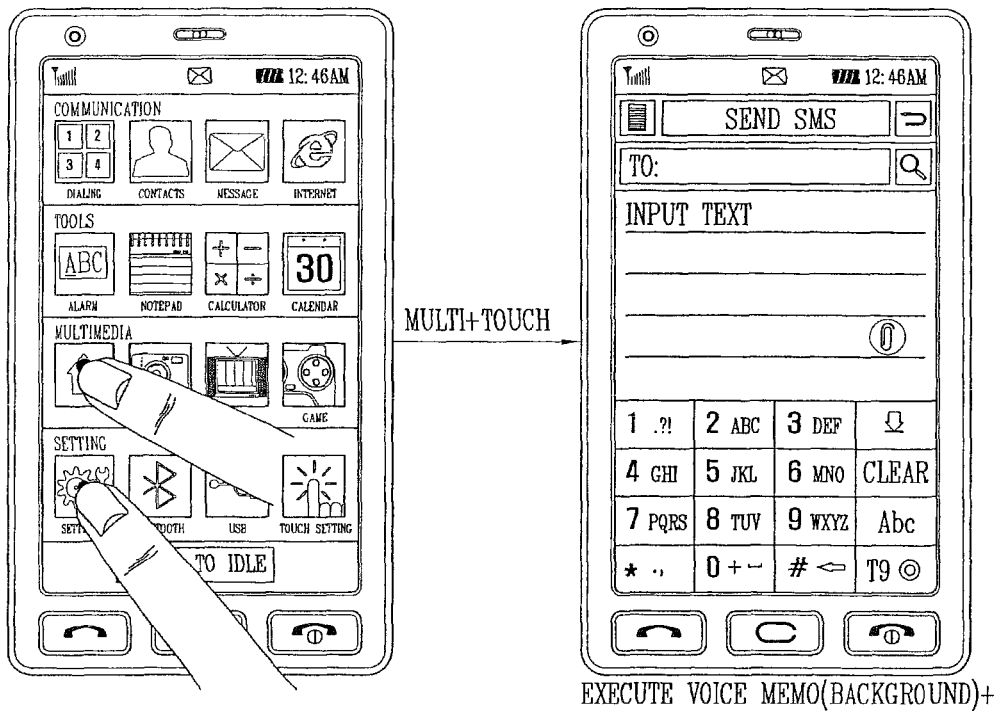

FIG. 17D illustrates an example of a collision between a message icon and a voice memo icon with different layer levels.

Upon the collision between the message icon and the voice memo icon, because the message layer level value is higher than the voice memo layer level value, the controller 180 may simultaneously execute the voice memo as the background and the message transmission as the foreground. The user may send a message while hearing a recorded voice.

FIGS. 18A to 18G are views illustrating an icon collision controlling method of a mobile terminal based upon an icon layer level according to an embodiment. FIGS. 18A to 18G illustrate an example where function icons colliding with each other have a same layer level. The one example of such collision controlling method has partially been described in FIGS. 14A to 14D.

When a user collides first and second function icons of a plurality of function icons by a predetermined touching method, the controller 180 may determine whether the first and second icon layer levels are the same with reference to layer levels stored in the DB. When it is determined that the first and second icon layer levels are the same, the controller 180 may divide (or separate) a screen to simultaneously execute first and second function icon items.

Figure 18A:
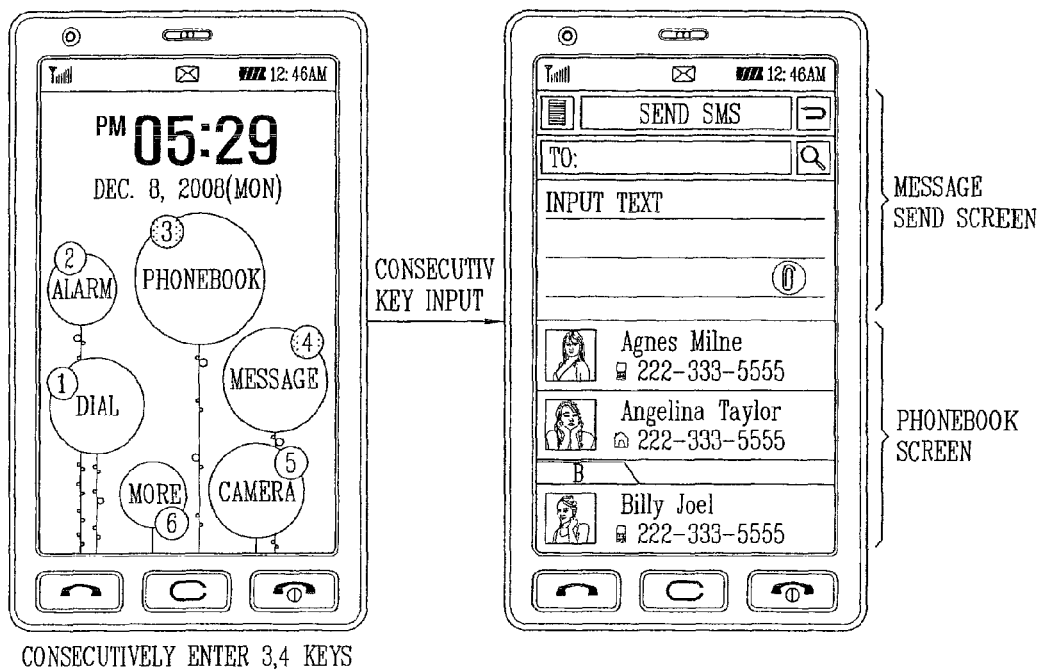
FIGS. 18A to 18G are views illustrating an icon collision controlling method of a mobile terminal based upon an icon layer level according to an embodiment.

That is, as shown in FIG. 18A, when a user collides a phonebook icon with a message icon by consecutively entering third and fourth keys, because the phonebook layer level and the message layer level are the same, the controller 180 may divide (or separate) a screen to simultaneously execute (i.e., display) a message send screen and a phonebook screen.

Figure 18B:
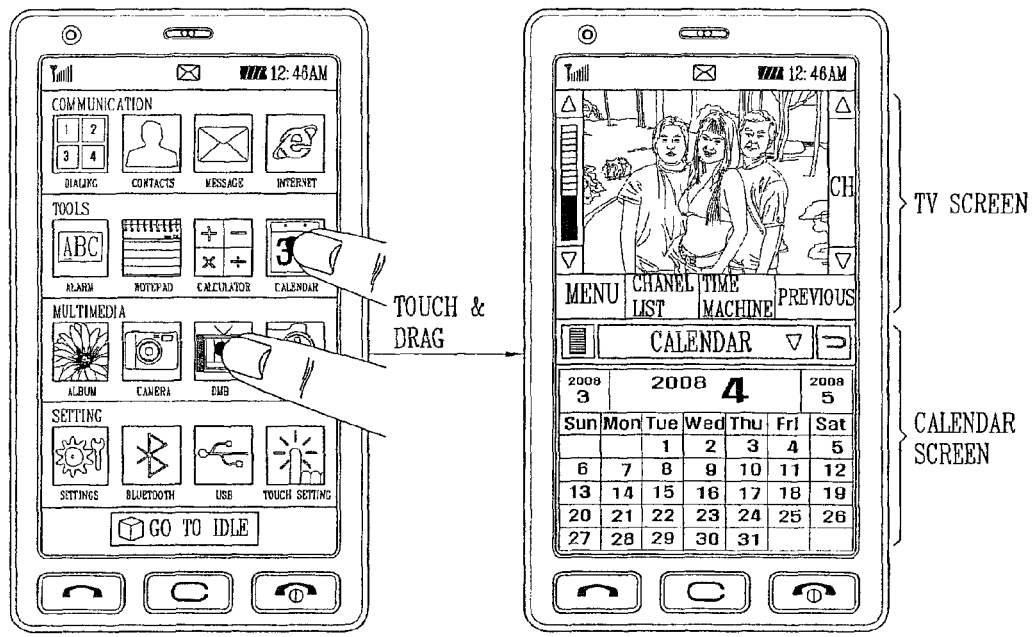

As shown in FIG. 18B, when a user collides a TV icon with a calendar icon by use of a touch & drag, since the TV layer level and the calendar layer level are the same, the controller 180 may divide (or separate) a screen to simultaneously execute (i.e., display) a TV screen and a calendar screen.

According to a same method, even in an example of a collision between the album icon and the MP3 icon, between the radio icon and the message icon, between the dial icon (or album icon) and the message icon, and/or between a MAP icon and a browser icon, the controller 180 may divide (or separate) a screen for simultaneously displaying.

Figure 18C:
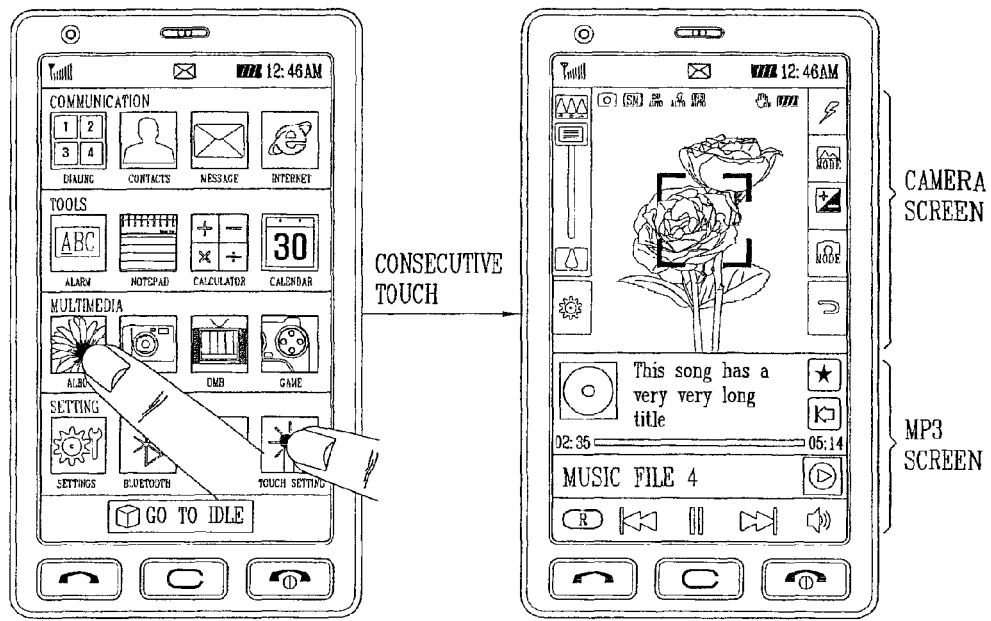
Figure 18D:
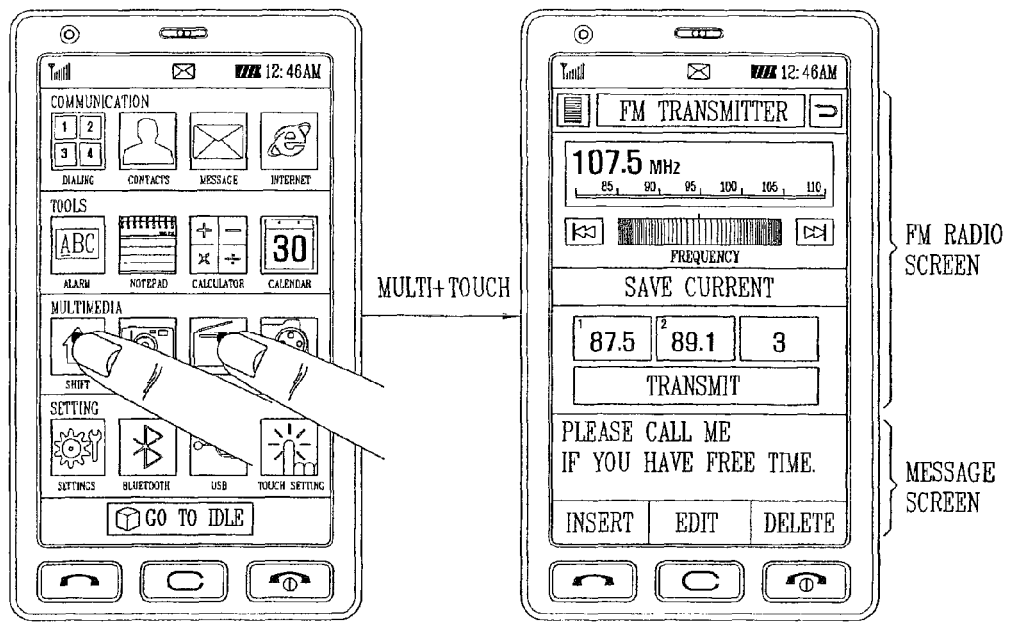

FIG. 18C illustrates an example where a user collides the album icon with the MP3 icon by using a consecutive touch. The controller 180 may divide (or separate) a screen to simultaneously display an album screen and a MP3 screen, respectively. FIG. 18D illustrates an example where a user collides the FM radio icon with the message icon by using a multi-touch. The controller 180 may divide (or separate) a screen to simultaneously display a FM radio screen and a message screen, respectively.

Figure 18E:
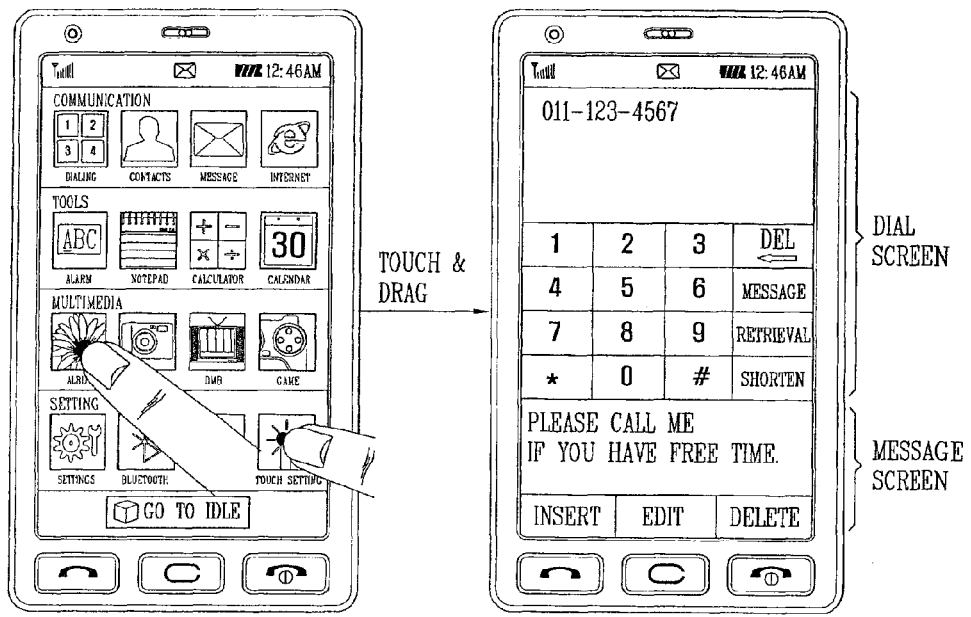
Figure 18F:
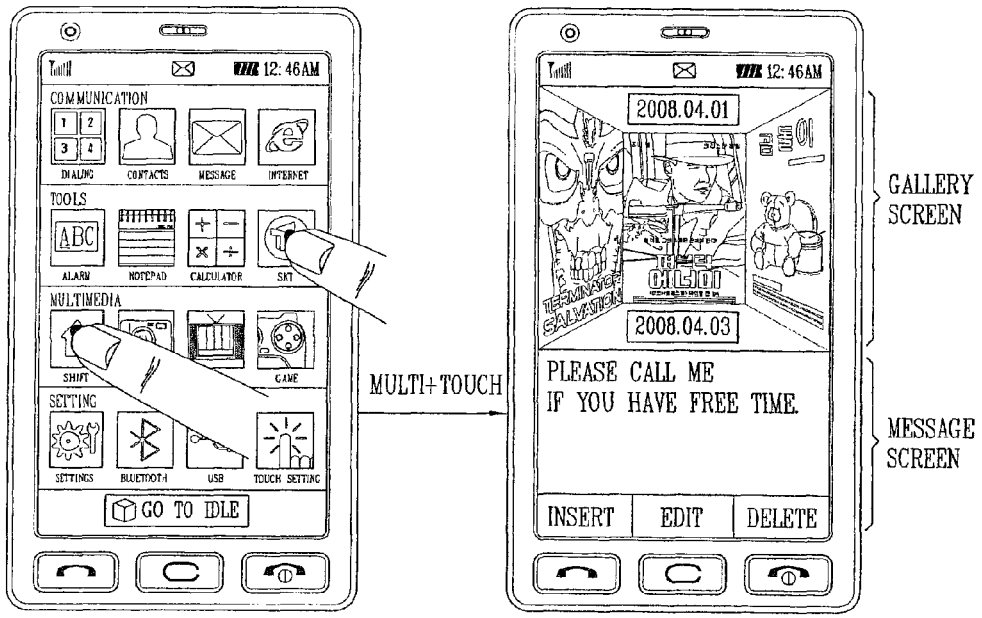
Figure 18G:
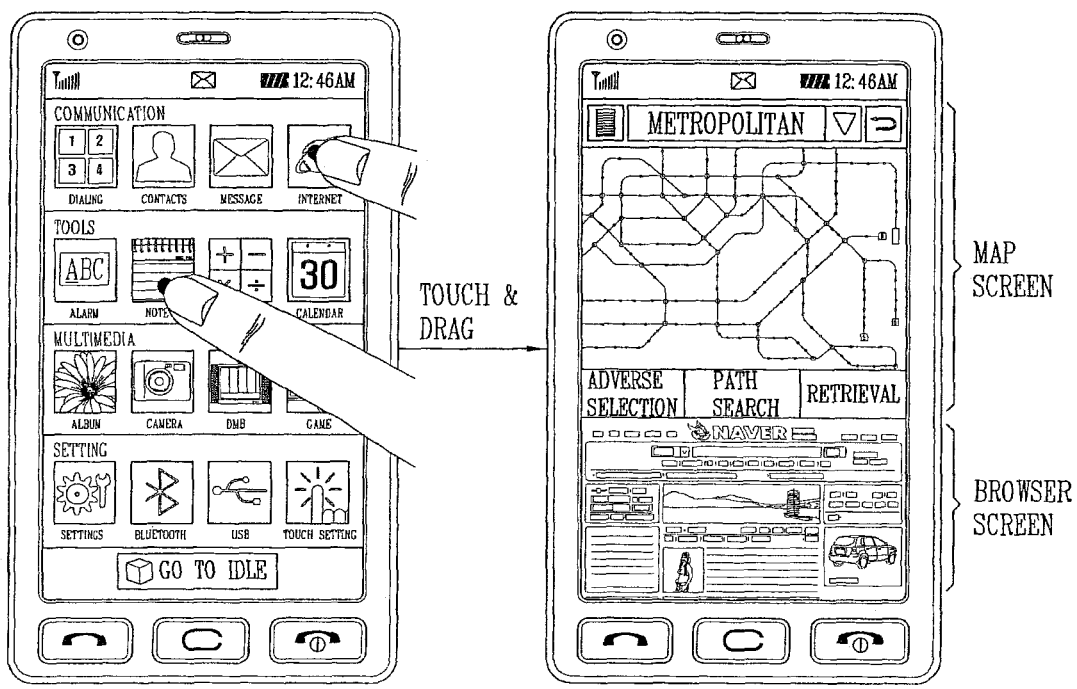

With the same method, referring to FIG. 18E, when the dial icon collides with the message icon by a touch & drag, the controller 180 may divide (or separate) a screen to simultaneously display a dial screen and a message screen. Referring to FIG. 18F, when the gallery icon collides with the message icon by a multi-touch, the controller 180 may divide (or separate) a screen to simultaneously display a gallery screen and the message screen. Referring to FIG. 18G, when the MAP icon collides with the browser icon by a touch & drag, the controller 180 may divide (or separate) a screen to simultaneously display a MAP screen and a browser screen, respectively.

Although not shown, even in an example of collisions between a call icon and a phonebook icon, between the call icon and a drawing memo icon and/or between the call icon and a calendar icon, the controller 180 may divide (or separate) a screen to simultaneously display the corresponding icon screens.

When a specific function icon collides with an icon having a time attribute, the controller 180 may search and output a specific item based on a time attribute value (e.g., a time, a time range) and/or control a specific function to be automatically executed after the time attribute value.

FIGS. 19A to 19D are views illustrating an icon collision controlling method in an example of a collision between a specific function icon and an icon having a time attribute. This collision controlling method has partially been described with respect to FIGS. 13A to 13C.

Figure 19A:
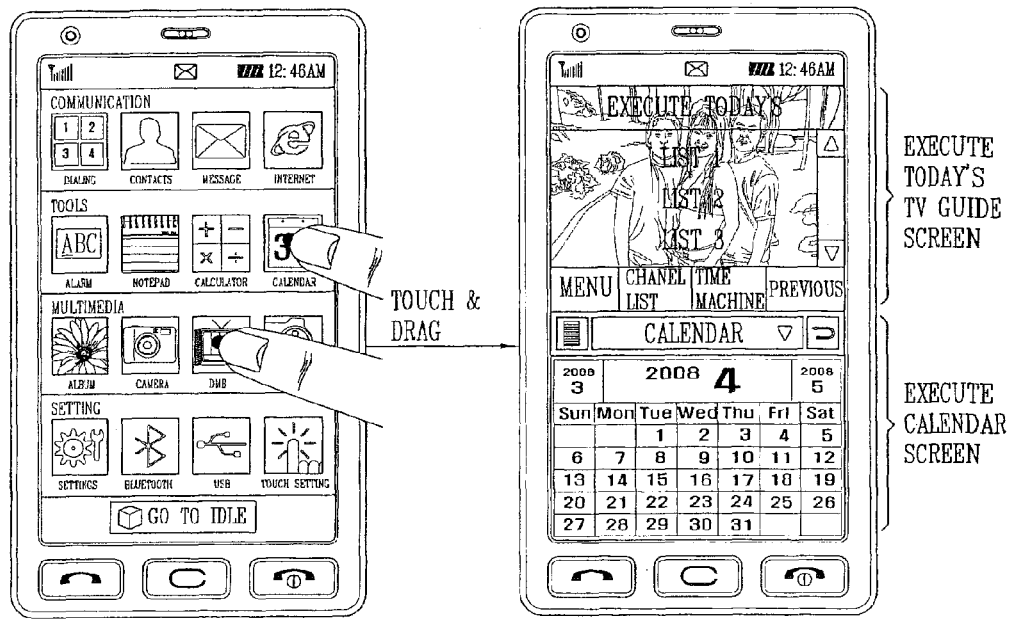
FIGS. 19A to 19D are views illustrating an icon collision controlling method in an example of a collision between a specific function icon and an icon with a time attribute.
Figure 19B:
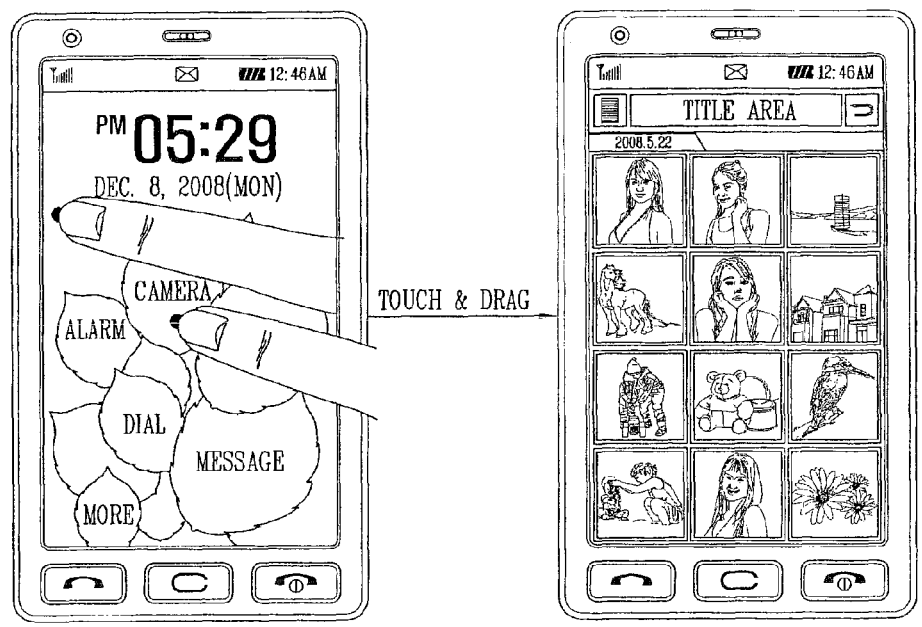

When a TV icon collides with a function icon, for example, a schedule icon, with a time attribute (e.g., today, within today to one week), the controller 180 may divide (or separate) a screen to simultaneously display a TV guide screen and a calendar screen (i.e., the same layer level) as shown in FIG. 19A. When an album icon collides with a calendar icon, the controller 180 may search and output a list of items selected from the album items that match a scheduled date (e.g., May 22, 2008), as shown in FIG. 19B.

Figure 19C:
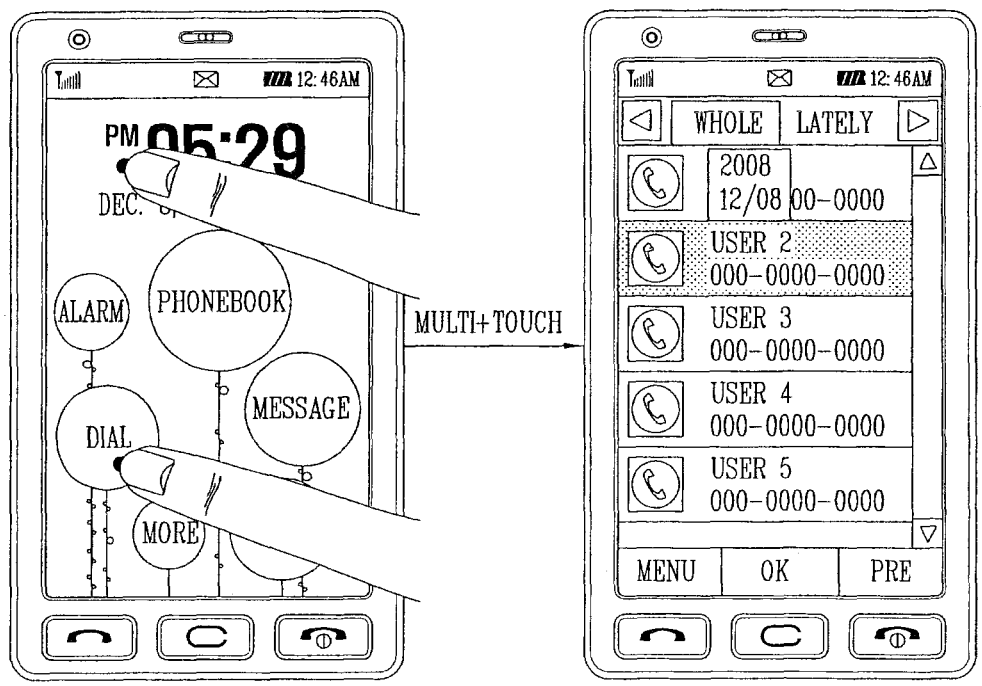
Figure 19D:
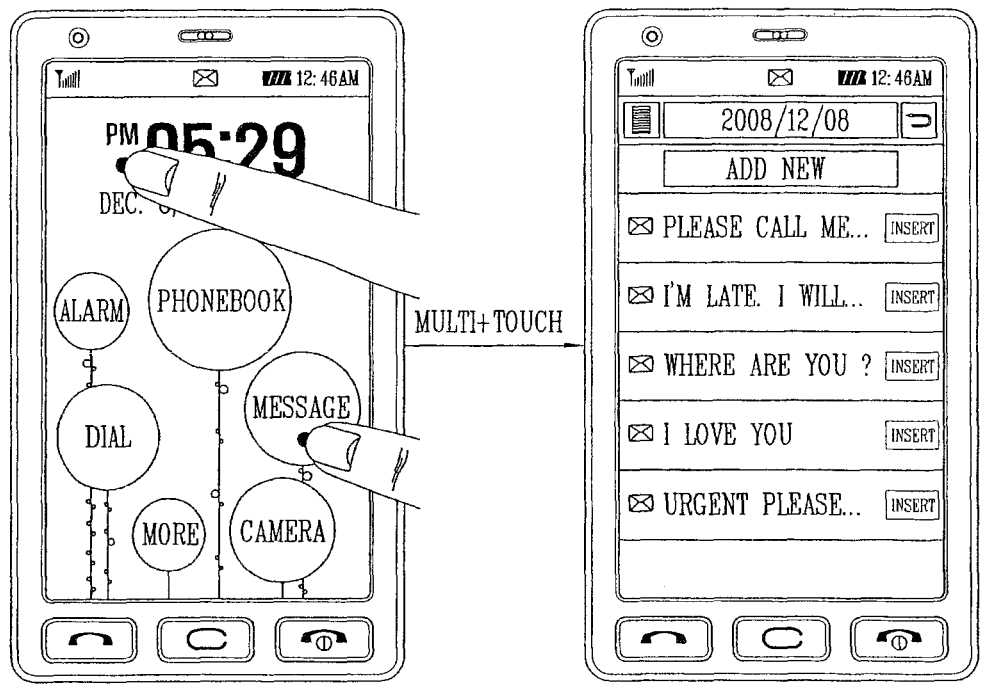

By employing a same method, when a dial icon collides with a calendar icon, the controller 180 may search and output a list of calls selected from the call list, which may match a scheduled date (e.g., Dec. 8, 2008), as shown in FIG. 19C. When a message icon collides with the calendar icon, the controller 180 may search and output received messages selected from the received message list, which may match a scheduled date (e.g., Dec. 8, 2008), as shown in FIG. 19D.

Embodiments of the present invention may use any icon with a time attribute, such as an alarm icon or a stopwatch icon, as well as the calendar icon, as a function icon with the time attribute as shown in FIGS. 19A to 19D.

For example, when a function icon (e.g., dial, message, TV, MP3, radio) collides with an alarm icon (or a stopwatch icon), the controller 180 may output an alarm or a stopwatch setup screen to set an alarm or a stopwatch time, and when the set alarming time or the stopwatch time elapses, the controller 180 renders operation of the corresponding function icon (e.g., dial, message, TV, MP3, radio) automatically executed. That is, the controller 180 may automatically execute a reserved call, a TV program reservation (e.g., automatic turn-on or turn off, automatic recording), an MP reservation and a radio program reservation (e.g., reserved running, automatic recording) when the set alarming time or the stopwatch time elapses.

Figure 20:
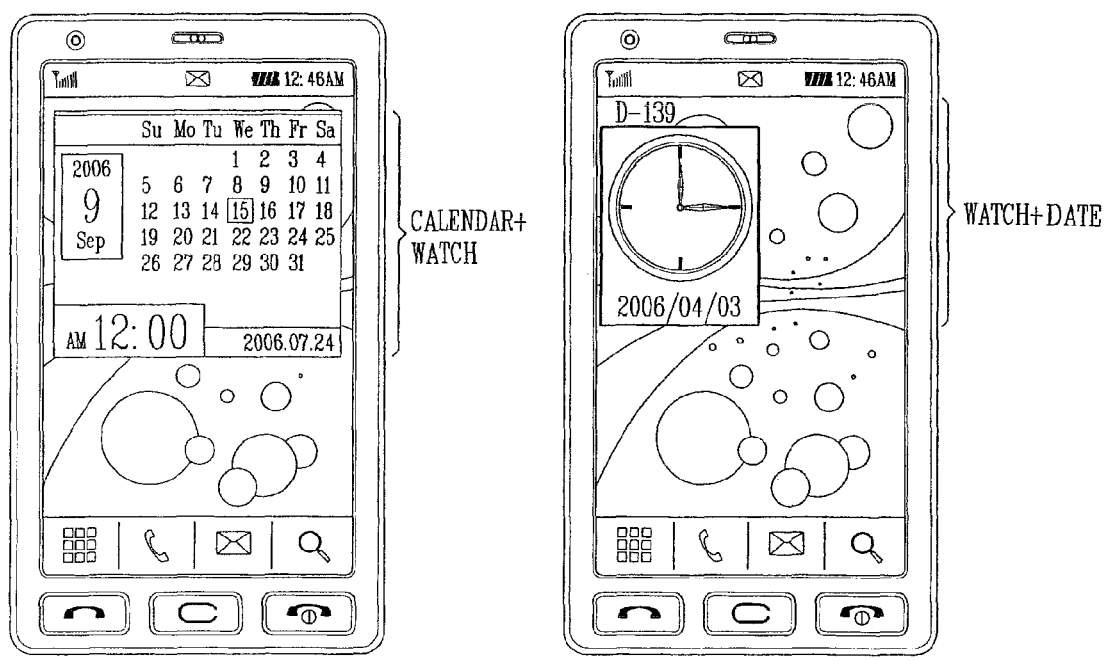
FIG. 20 is a view illustrating a collision between a same attribute group in an icon collision controlling method in accordance with an embodiment.

FIG. 20 is a view illustrating a collision between same attribute groups in an icon collision controlling method in accordance with an embodiment. The embodiment shown in FIG. 20 may be applied by combination with FIG. 16 illustrating two collided icons having same layer levels.

When collided first and second function icons have a same layer level, the controller 180 may check (or determine) whether the first and second icons belong to the same attribute group. When the first and second icons belong to the same attribute group according to the check result, the controller 180 may combine the two icon items to display on a screen. For example, as shown in FIG. 20, when a calendar icon collides with a watch icon, the calendar and the watch may be combined to be displayed on one screen, and when a date icon collides with the watch icon, the date and the watch may be combined to be displayed on one screen.

Embodiments of the present invention may be implemented such that when two function icons collide, icon items may be displayed and/or executed based on a layer level and an attribute between the collided icons.

Figure 21:
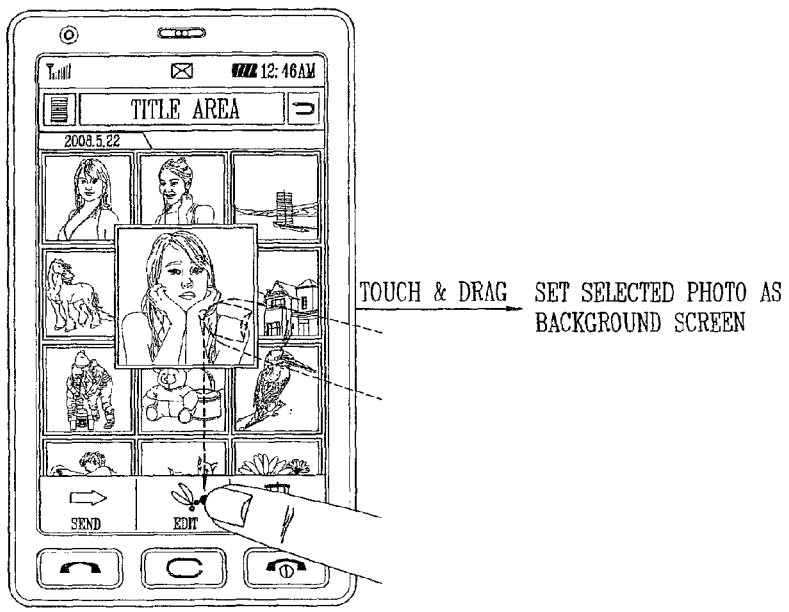
FIGS. 21 to 23 are views illustrating a control operation upon collision between a function icon and a contents icon in an icon collision controlling method in accordance with an embodiment.
Figure 22:
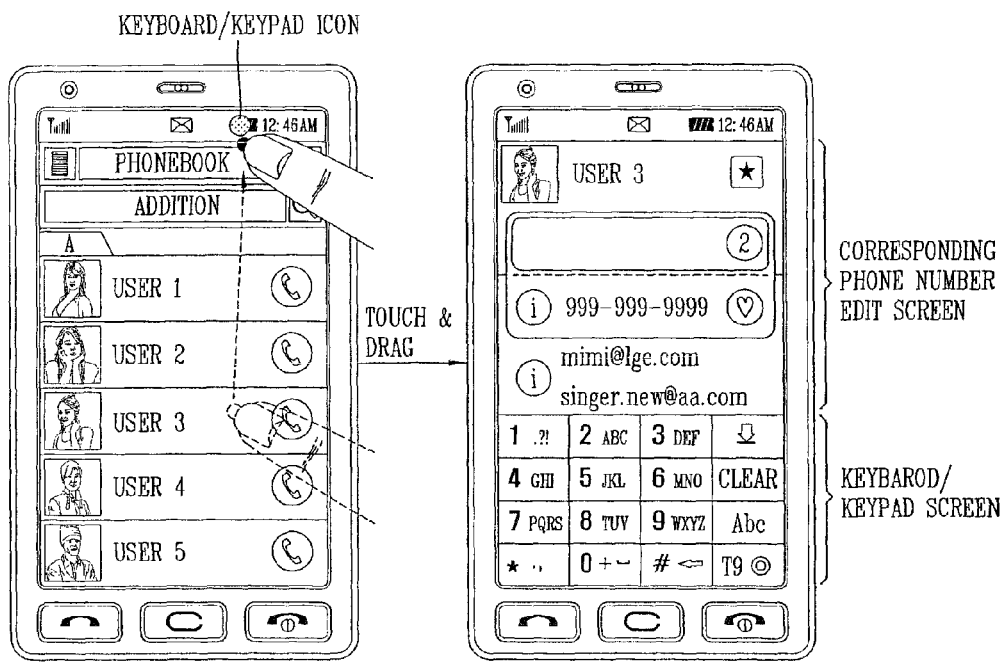
Figure 23:
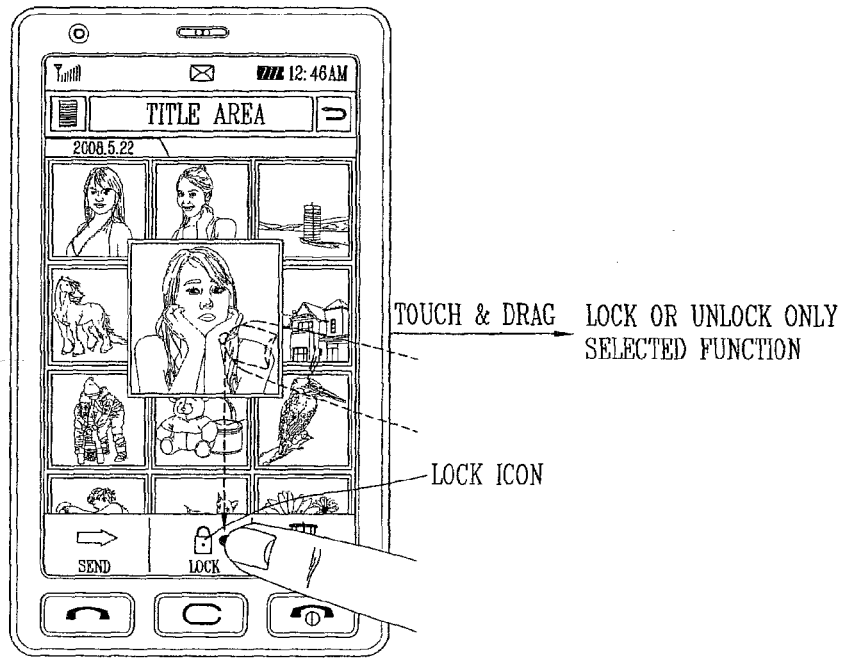

FIGS. 21 to 23 are views illustrating a control operation upon collision between a function icon and a contents icon in an icon collision controlling method in accordance with an embodiment.

FIG. 21 illustrates an example of a most frequently generated icon collision, which shows that when a specific contents icon collides with a specific function icon (or an application), then the content specific function may be executed. The content specific function may be a function provided in the terminal, examples of which may include set wallpaper, send messages, attach messages, take a picture, copy, move, paste, delete, hide, show/zoom-in, zoom-out/attach, capture, record, add, edit, view, detail view, sort, search, dial, send IrDA, send BT, and/or the like.

Referring to FIG. 21, when a user collides a specific picture contents icon with a home function icon by using a touch & drag, the controller 180 may set the corresponding picture as an idle screen to display on a screen. When a specific video contents icon collides with a message function icon, the controller 180 may send a message by attaching the corresponding video. When a specific shortcut number contents icon collides with a camera function icon, the controller 180 may store a captured image in the corresponding shortcut number.

FIG. 22 illustrates an example of a control operation upon collision between a function icon and a contents icon, which shows an example where a message icon collides with a phonebook icon.

Referring to FIG. 22, when a contents icon collides with a function icon, the controller 180 may divisionally display an execution (edition) screen and an input screen of the related contents. For example, when a user selects a specific phone number icon (i.e., the User 3 icon) from a plurality of phone number icons to collide with (or to) a keyboard/keypad icon located at an upper end portion of the screen, the controller 180 may divide (or separate) the screen at a preset ratio so as to display the phone number edit screen of User 3 on an upper screen and a real keyboard or a real keypad on a lower screen.

Even when a user collides an electronic dictionary icon with the keyboard/keypad icon, the controller 180 may divide (or separate) the screen to display the electronic dictionary search screen and the keyboard/keypad, respectively.

FIG. 23 illustrates an example of a control operation upon collision between a function icon and a contents icon, which shows an example where a particular contents icon collides with a lock icon (function icon). This control operation may be substantially the same as the operation of FIG. 15B excluding that a contents icon (other than a function icon) collides with the lock icon.

Referring to FIG. 23, when a user performs a touch & drag to select at least one contents icon from a plurality of contents icons and collides the same to the lock icon, the controller 180 may control the corresponding contents to be locked or unlocked. The at least one icon may include both icons associated with a personal privacy (e.g., phone number, call list, message, schedule, things to do, memo, album, etc.) and icons associated with typical functions (TV, camera, game, internet, etc.).

For example, when at least one icon collides with the lock icon by the touch & drag, the controller 180 may perform unlocking when such icon is in a locked state, and may toggle to locking when such an icon is in an unlocked state.

When the at least one contents icon collides with a separate "lock icon", the controller 180 may set the corresponding contents icon to a locked state, and when the corresponding icon collides to "unlock icon", the controller may release the corresponding locked icon.

Figure 24:
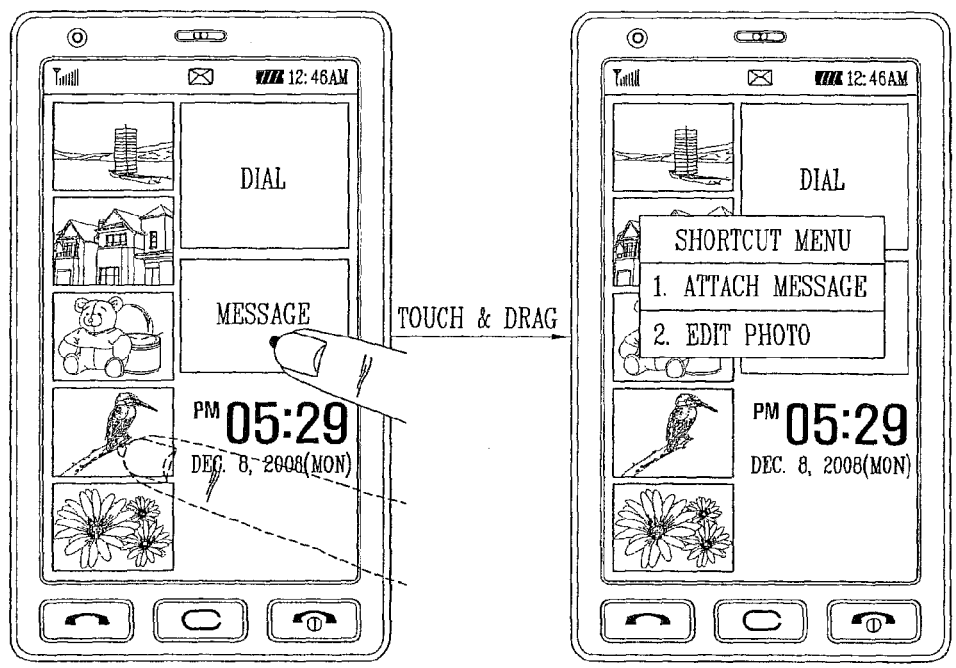
FIG. 24 is a view illustrating providing a shortcut function upon collision between a function icon and a contents icon according to an embodiment.

FIG. 24 is a view illustrating providing a shortcut function upon collision between a function icon and a contents icon according to an embodiment.

As shown in FIG. 24, when an image/video (contents) icon collides with a message (function) icon, the controller 180 may display a shortcut function/menu mapped to corresponding contents with respect to a text message on a screen. That is, the controller 180 may display "message attach item and photo attach item" for processing the image/video.

Figure 25:
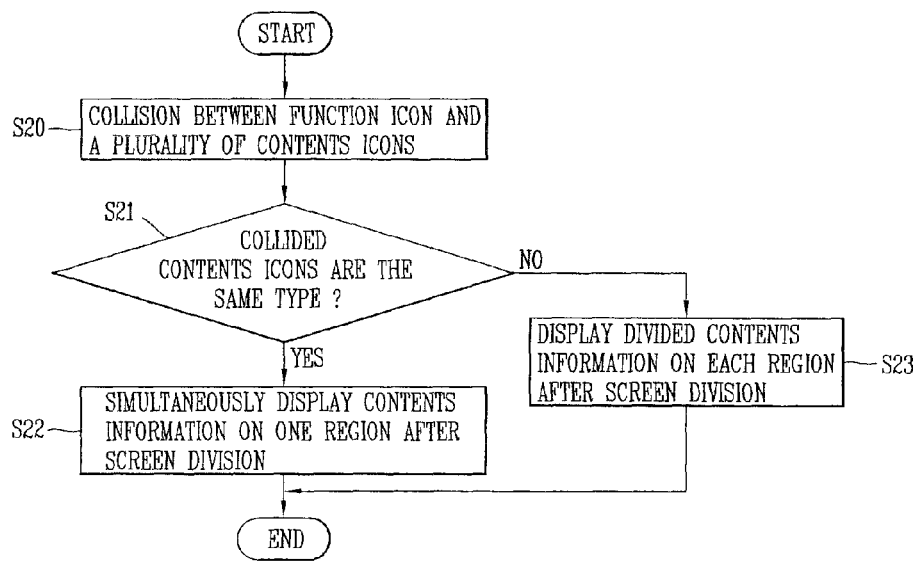
FIG. 25 is a flowchart illustrating a control operation upon a collision between a function icon and a plurality of contents icons in an icon collision controlling method in accordance with an embodiment.

FIG. 25 is a flowchart illustrating a control operation upon a collision between a function icon and a plurality of contents icons in an icon collision controlling method in accordance with an embodiment. The embodiment may illustrate a control operation upon a collision between one function icon and a plurality of contents icons. Other operations, orders of operations and embodiments may also be provided.

Referring to FIG. 25, when a plurality of contents icons collide with a specific function icon, the controller 180 may check (or determine) whether the plurality of contents icons are the same types of contents (operations S20, S21). When the plurality of contents are all the same type, the controller 180 may divide (or separate) a screen within a same function (or application) and may simultaneously display information on a same region (operation S22). When the plurality of contents are different types, the controller 180 may divide (or separate) a screen for each function and display information on each content on the divided region (operation S23).

Figure 26:
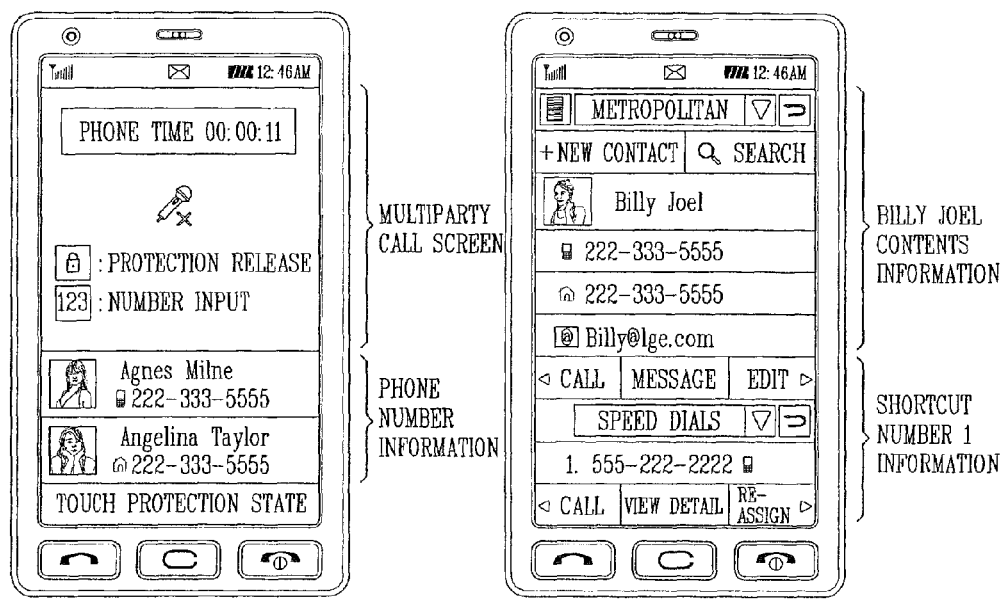
FIG. 26 is a view illustrating a control operation upon a collision between a function icon and a plurality of contents icons.

FIG. 26 is a view illustrating a control operation upon a collision between the function icon and the plurality of contents icons shown in FIG. 25. As shown in FIG. 26, when a user selects the same type of contents icons (such as Agnes Milne and Angelina Taylor) from the phonebook and collides the selected two contents icons to a call icon, the controller 180 may perform a group call (i.e., a multiparty call) while simultaneously displaying Agnes Milne contents information and Angelina Taylor contents information. That is, the controller 180 may divide a group call Appn so as to display a group call screen on one region and both Agnes Milne contents information and Angelina Taylor contents information on another region.

On the other hand, when a user selects a Billy Joel icon and a shortcut number 1 (another type of contents icon) and collides the selected contents icons to the dial icon, the controller 180 may divide (or separate) a screen so as to separately display Billy Joel contents information and shortcut number 1 information on each divided region.

Embodiments of the present invention may be implemented such that upon a collision between a function icon and a plurality of contents icons, the plurality of contents may be simultaneously executed by the corresponding function.

Figure 27:
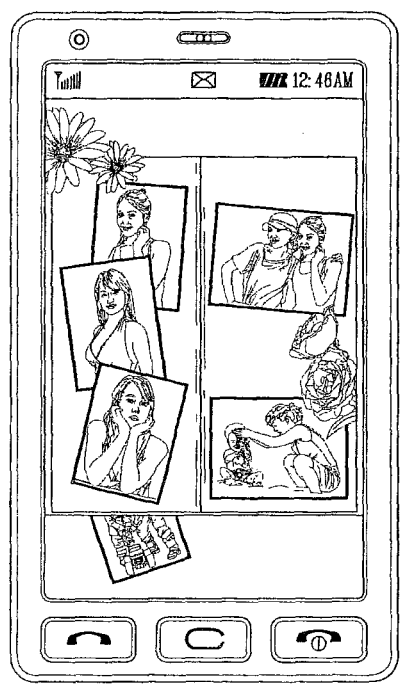
FIG. 27 is a view illustrating a digital frame background screen generated due to an icon collision.

When first and second phone number icons collide with the dial icon, the controller 180 may perform a multiparty call (or telephony call). When the first and second phone number icons collide with a message icon, the controller 180 may send the same message to the phone numbers. When first and second picture (photo) icons collide with the message icon, the controller 180 may send a message by attaching the pictures. When the first and second picture icons collide with a home icon, the controller 180 may set the first and second photos as background screens so as to display the same in a form of a slideshow or output a digital frame background screen, as shown in FIG. 27, by combining the photos into one.

Upon the collision between a contents icon and a function icon, the controller 180 may perform a control operation by checking (or determining) whether the corresponding function supports the corresponding content. When an image/video icon collides with an album icon, the controller 180 may check (or determine) whether the corresponding album function supports the corresponding image/video content. The controller 180 may run the corresponding image/video immediately, and when not may convert the corresponding image/video for running.

A control operation executed upon collision between contents icons may be described.

Upon collision between contents icons, the controller 180 may perform a contents variation. The variation may include a combination, a synthesis and/or an edition. That is, upon collision between two document icons, the controller 180 may combine the two documents to display one icon. Upon collision between two picture icons, the controller 180 may perform a picture synthesis or an edition so as to display one icon. The newly generated icon may be displayed with such synthesis or combination information.

Upon the collision between contents icons, the controller 180 may execute functions corresponding to the contents and may divide (or separate) a screen to display each content information.

Figure 28:
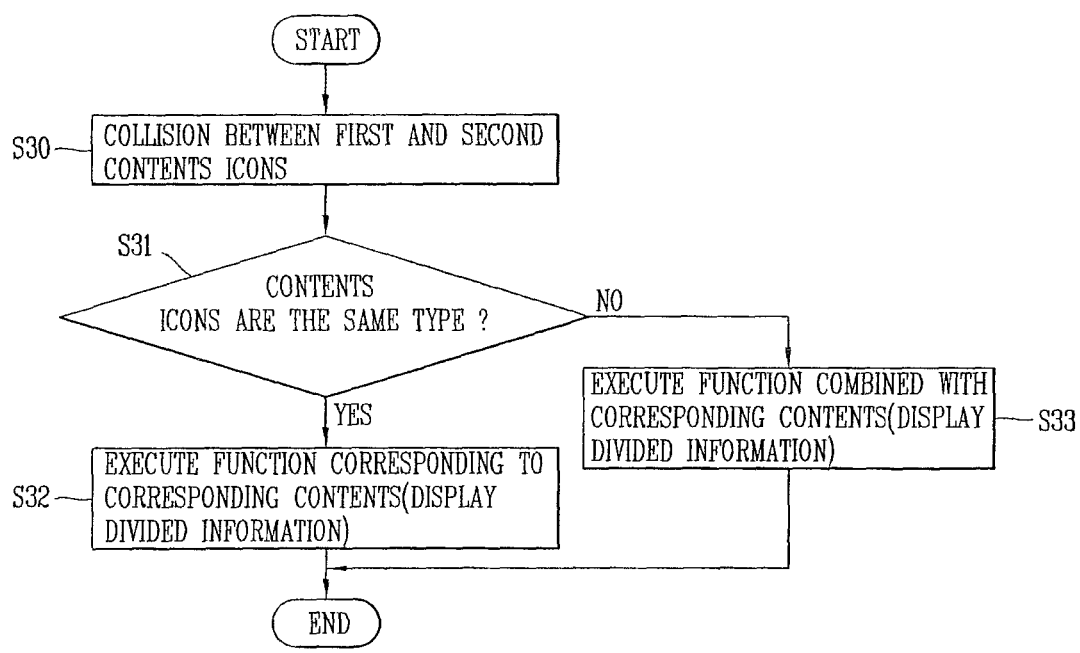
FIG. 28 is a flowchart illustrating a control operation upon a collision between contents icons in an icon collision controlling method in accordance with an embodiment.

FIG. 28 is a flowchart illustrating a control operation upon a collision between contents icons in an icon collision controlling method in accordance with an embodiment.

As shown in FIG. 28, upon collision between first and second contents icons, the controller 180 may check (or determine) whether the first and second contents icons are the same type of contents (operations S30, S31). When the two contents are the same type according to the check result, the controller 180 may execute the corresponding function and divide (or separate) a screen to display the first and second contents information, respectively (operation S32). If the two contents are different types of contents, the controller 180 may execute a function combined with the corresponding first and second contents and display information related to the first and second contents on divided screens, respectively (operation S33).

Figure 29A:
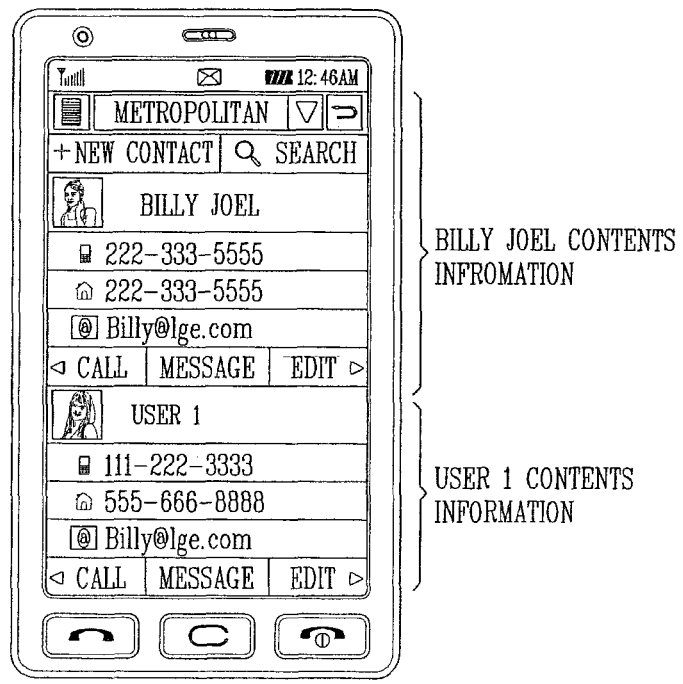
FIGS. 29A and 29B are views illustrating a control operation upon a collision between contents icons according to an embodiment.
Figure 29B:
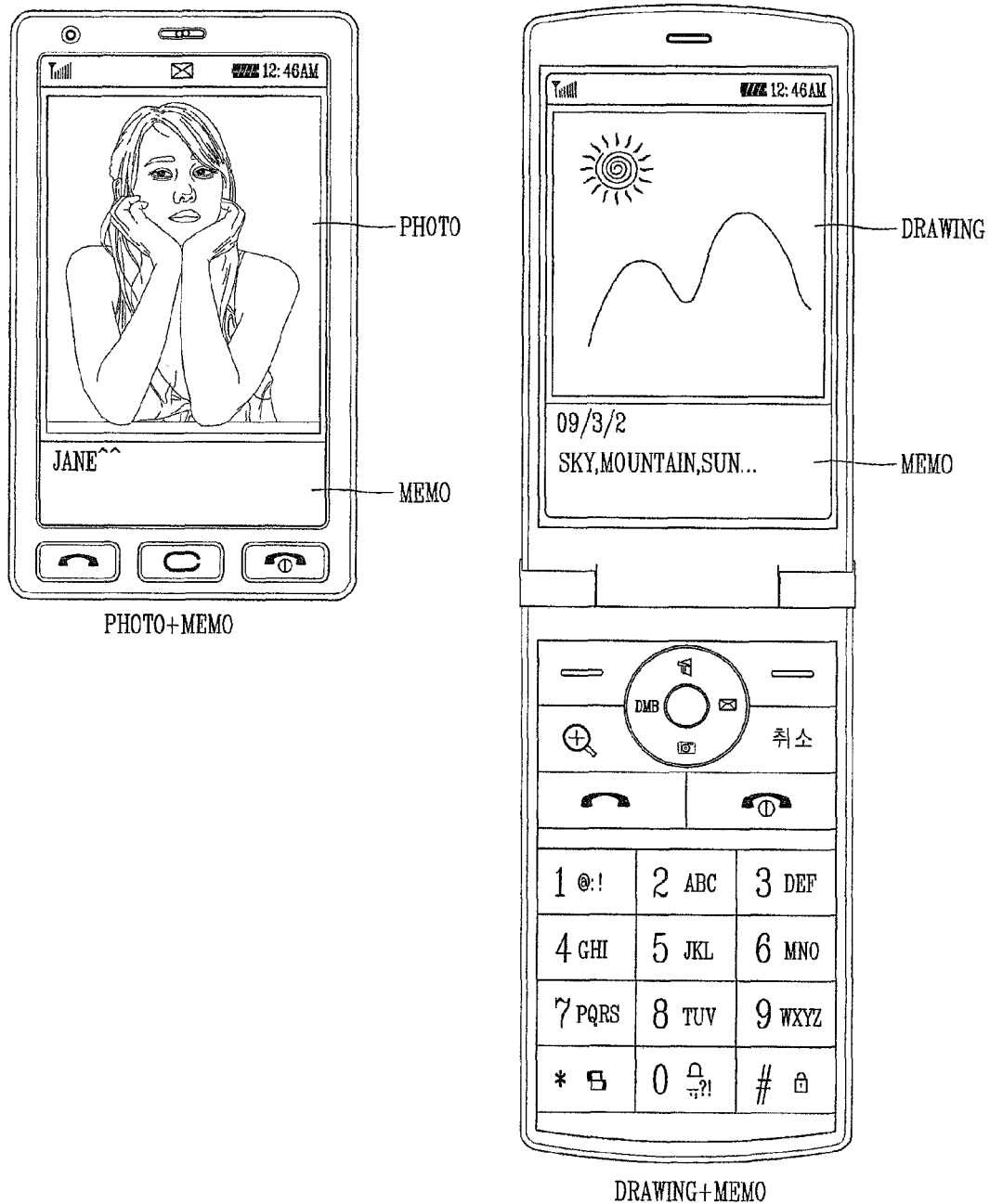

FIGS. 29A and 29B are views illustrating a control operation upon collision between contents icons according to an embodiment. FIG. 29A illustrates a collision between the same type of contents icons, and FIG. 29B illustrates a collision between different types of contents icons.

As shown in FIG. 29A, upon collision between the same type of two contents icons (e.g., phone numbers of Billy Joel and User 1), the controller 180 may execute the phone number function (application) and display contents information relating to Billy Joel and contents information relating to User 1 on divided screens (or separate screens).

As shown in FIG. 29B, upon collision between different types of two contents icons (e.g., photo+memo or drawing+ memo), the controller 180 may execute a function (application) combined with the corresponding contents and display divided information, namely, the photo and the memo (or drawing and memo).

Embodiments of the present invention may allow a combination or a separation between corresponding contents upon collision between stationary contents icons and/or between moving contents icons.

Figure 30:
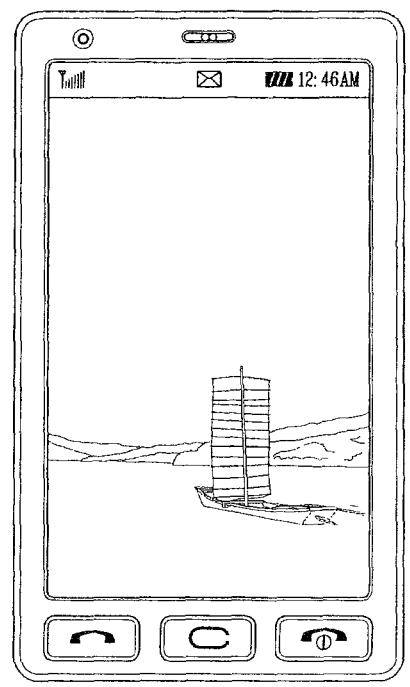
FIG. 30 is a view illustrating a control operation upon a collision between moving contents icons in an icon collision controlling method in accordance with an embodiment.

FIG. 30 is a view illustrating a control operation upon a collision between moving contents icons in an icon collision controlling method in accordance with an embodiment.

Referring to FIG. 30, an idle screen of the mobile terminal may be configured such that when at least one contents icon (e.g., butterfly) that is moving (flying) collides with a specific contents icon (e.g., a leaf), the at least one contents icon may be combined with the specific contents icon (e.g., sits on the leaf) and/or may be separated therefrom (e.g., keep flying away from the leaf).

Mobile terminals may also provide a cubic icon for searching and running a user's desired function of the terminal more conveniently. The cubic icon may collide to at least one function icon and/or contents icon located at one side of a screen.

Figure 31A:
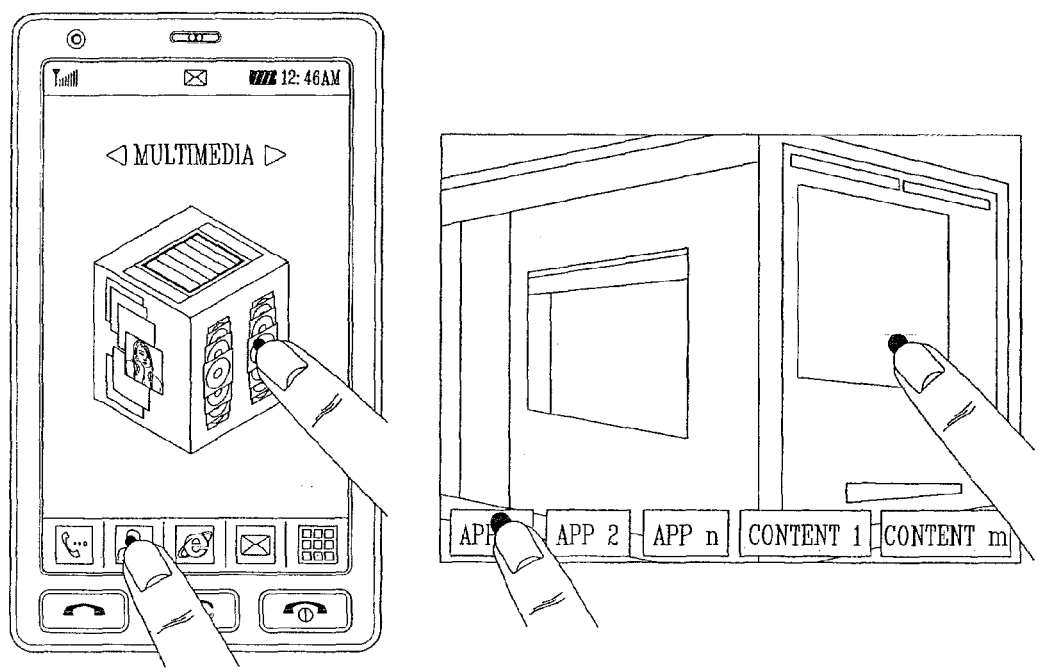
FIGS. 31A and 31B are views illustrating a control operation upon an icon collision where an icon collides to a specific surface of a cubic icon.
Figure 31B:
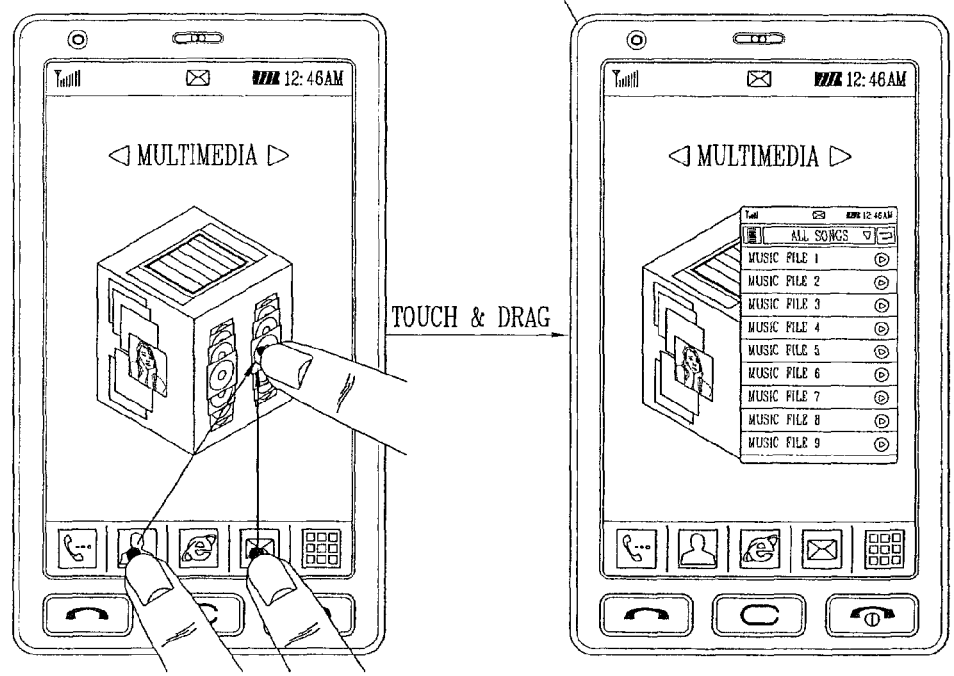

FIGS. 31A and 31B are views illustrating a control operation upon an icon collision, where an icon collides with a specific surface of a cubic icon according to an embodiment.

As shown in FIG. 31A, when a user collides a function (application) icon or a contents icon with (or to) a particular surface of the cubic icon by a touch & drag, the controller 180 may run the corresponding icon on the corresponding surface.

As shown in FIG. 31B, when a user selects a plurality of function (application) icons or contents icons by a touch & drag to collide them with a particular surface of the cubic icon, the controller 180 may repeatedly run the corresponding icons on the corresponding surface.

Figure 32A:
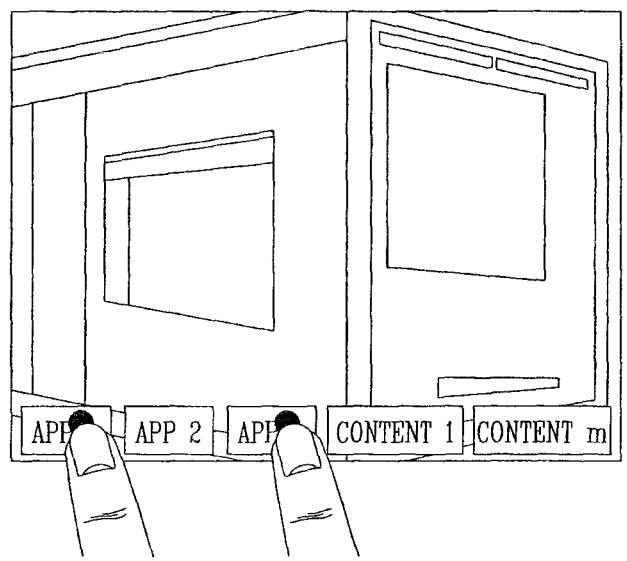
FIGS. 32A and 32B are views illustrating a control operation upon an icon collision in a cubic style.
Figure 32B:
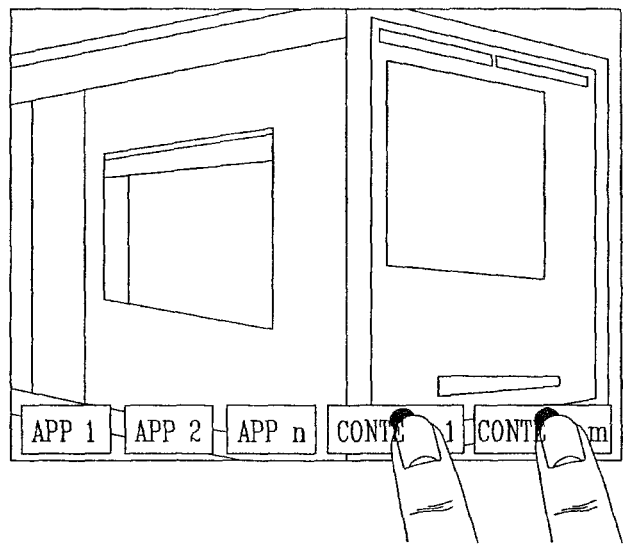

FIGS. 32A and 32B are views illustrating a control operation upon an icon collision in a cubic style. The embodiments shown in FIGS. 32A and 32B may be applied when a plurality of function icons (or application icons) or contents icons are provided in correspondence with each surface.

When a user selects a plurality of function icons or contents icons by a touch input (e.g., a real touch or a proximity touch), the controller 180 may run and display each of the corresponding icons on the corresponding surface to which the icon belongs to.

Upon completion of the combination, cooperation and execution between contents and applications due to a collision between applications (functions), between a content and an application and between contents, the controller 180 may display contents or applications whose attribute changed due to a collision on the display 151, and the entire process may be terminated.

The controller 180 may notify results from the collision on one of the collided icons. The results from the collision may be notified at a multimedia with a high layer level.

As discussed above with respect to FIG. 9, at least one function icon (application icon) and a contents icon may be displayed on an idle screen or a work station. The icons may include web-associated icons. The icons may be provided in a tap form. The icons provided in the tap form may be displayed by grouping. An indication in the tap form may be an arrangement for increasing a user's convenience that allows overcoming of spatial restriction.

Figure 33:
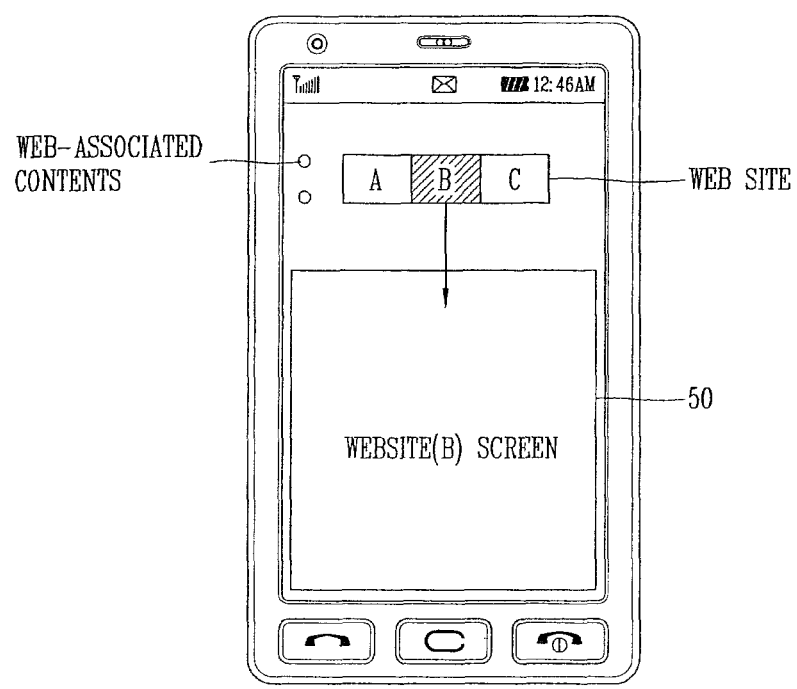
FIG. 33 is a view illustrating a function icon displayed in a tap form according to an embodiment.

FIG. 33 is a view illustrating a function icon displayed in a tap form according to an embodiment.

As shown in FIG. 33, at least one website (google, naver, daum) may be displayed in a tap form, and website associated contents may be displayed on one side of the website. One website screen 50 may be displayed below the website displayed in the tap form. The user may collide contents to the website to run his desired operation on the corresponding web.

The websites initially displayed on the website screen 50 may be determined based on priorities. The priority may be the most lately searched website or the most frequently used website by a user. The website displayed on the screen 50 may be a website registered in favorites or a website touched by a user.

Therefore, when the user selects one of the websites displayed in the tap form, the controller 180 may display the corresponding website screen on the screen.

FIGS. 34A-34D are views illustrating a function icon displayed in a tab form according to an embodiment.

Figure 34A:
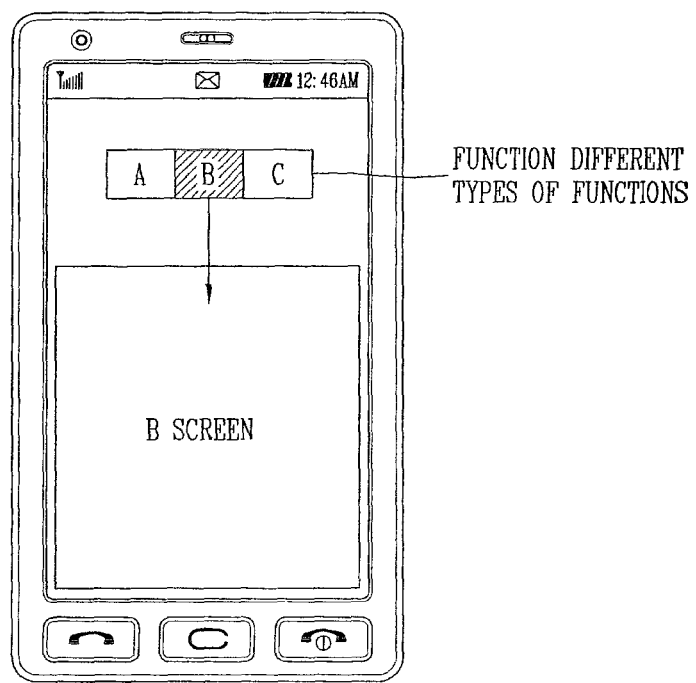
FIGS. 34A to 34D are views illustrating a function icon displayed in a tab form according to an embodiment.

As shown in FIG. 34A, at least one different type of function icon (or application icon) may be displayed on a screen in a tap form. The function icons displayed in the tap form may be displayed by grouping a plurality of function icons. When a user selects a specific function icon (e.g., B), the controller 180 may display a screen of the function icon B, for example.

Figure 34B:
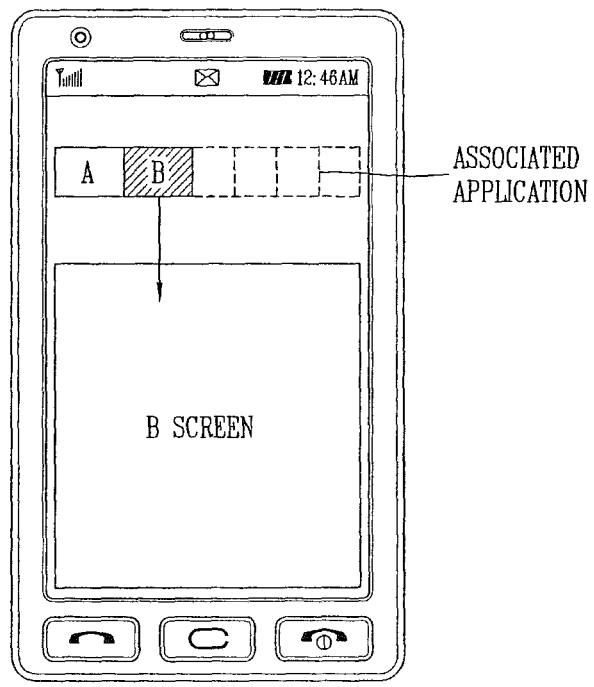

When each displayed function icon has sub information (or sub menu), as shown in FIG. 34B, the function icon and an application associated with the function icon may be separately displayed. Therefore, a user's inconvenience, which may be caused due to an example where when searching for sub information of a specific function icon, the user must first select the function icon and then select sub information relating to the selected function icon, may be reduced.

Figure 34C:
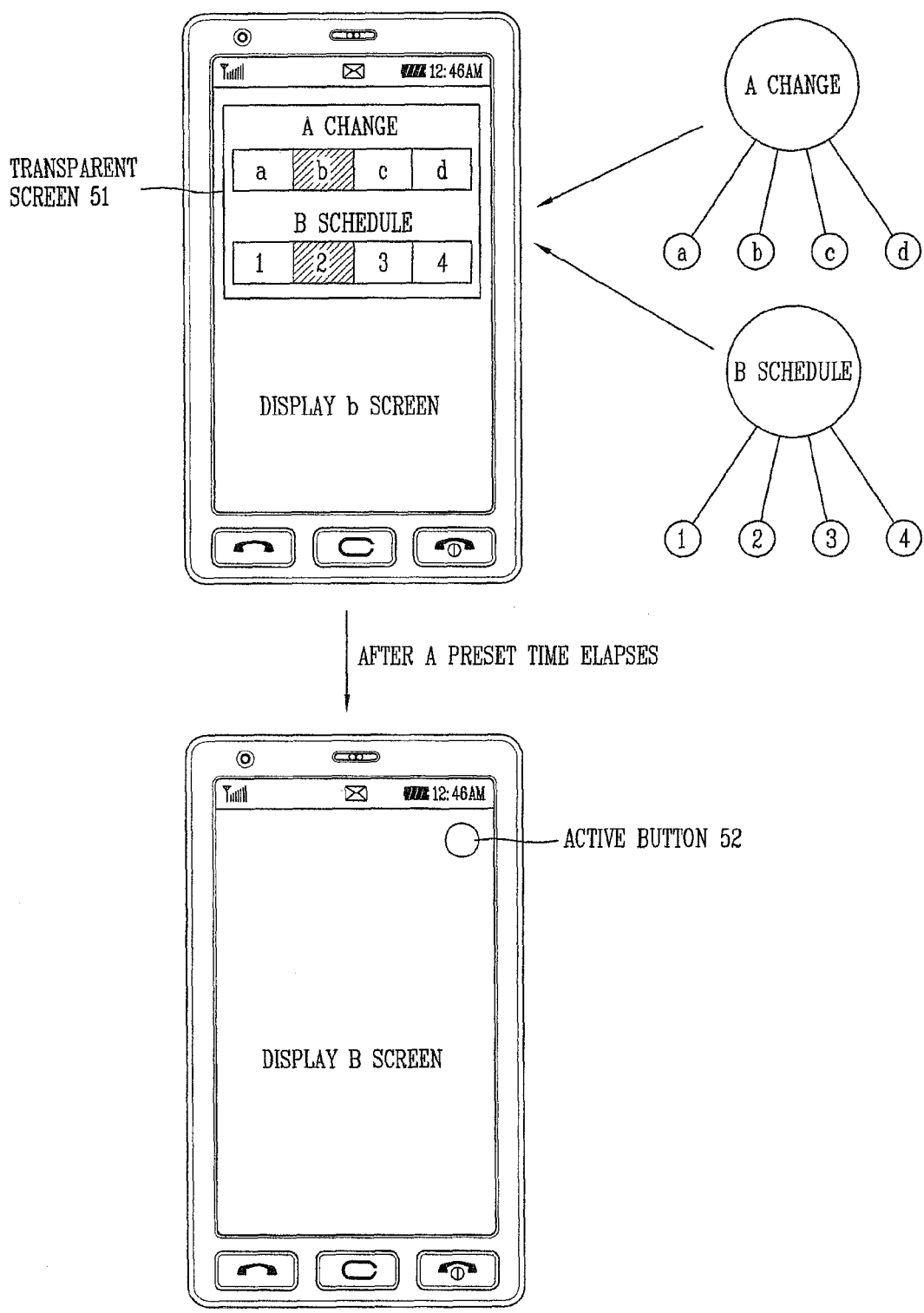

FIG. 34C illustrates an example of a displayed screen when a function icon includes a plurality of sub information.

When each function icon includes plenty of sub information as shown in FIG. 34B, the entire sub information may not be displayed on one tap. Accordingly, When each sub information is displayed in the tap form, there may be a lack of space for actually displaying function icons.

Embodiments of the present invention may provide an algorithm that sub information relating to each function icon is displayed, for each function icon, on one transparent screen and then disappears after a preset time. The disappeared transparent screen may re-appear by manipulation of a button provided at one side of a screen.

That is, as shown in FIG. 34C, it is assumed that a dial icon A includes four sub items (or sub menus) a, b, c and d, and a calendar icon B includes four sub items 1, 2, 3 and 4. A sub item b of a selected function icon, for example, the phone icon A, may be displayed on the screen, and another transparent screen 51 may be displayed on the screen of the sub item b. The transparent screen 51 may display the four sub items of the phone icon A in the tap form, and the four sub items of the schedule icon B in the tap form below the phone icon A. The transparent screen 51 may be displayed at the center; however, such position may be appropriately adjustable. The transparent screen 51 may disappear after a preset time, and may re-display by manipulating an active button 52 located at one side of the screen (e.g., a right upper end in the drawing) on which the sub item b is currently displayed. When each sub item is displayed on the transparent screen 51, the currently selected sub item may be displayed on the center of each tap.

Each sub item displayed in the tap form may be individually transparently displayed, other than displayed on the separate transparent screen 51.

Figure 34D:
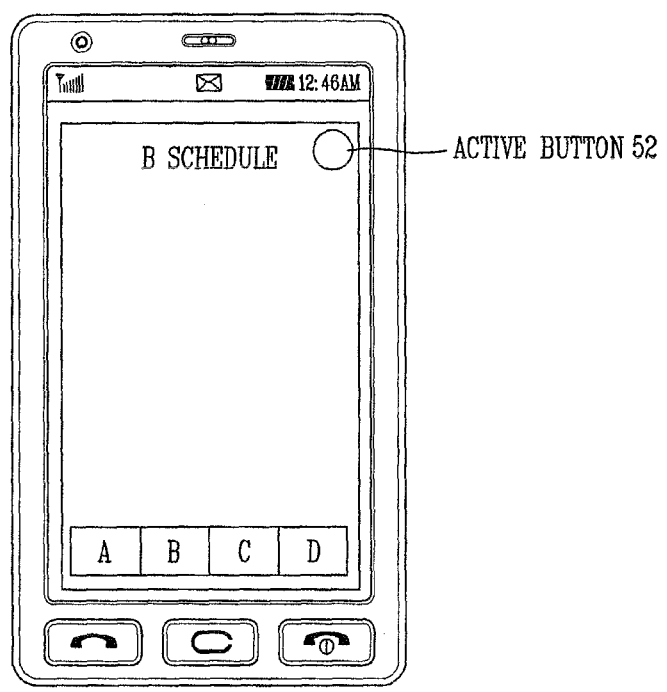

FIG. 34D illustrates an example of a displayed screen where a function icon does not have sub information. The embodiment shows that a plurality of icons, for example, a dial icon A and a calendar icon B may be displayed in the tap form for a user to execute a multitasking. That is, while the calendar icon is selected from the tap to perform the corresponding function, the dial icon A may be selected from the tap to perform the corresponding function. Similar to FIG. 34C, the tap having the dial icon A and the calendar icon B may disappear after a preset time, and then may re-display upon pressing the active button 52.

An icon selected from a plurality of icons displayed in the tap form, namely an activated icon, may be represented to be distinguished from non-selected icons, and selected icons may have different visual effects (e.g., color, glittering, shape) such that the user may easily identify each icon.

The above described embodiments show that an icon collision may be generated due to a real collision between two icons. However, the icon collision may be implemented by a touch gesture, an input device recognition and a voice recognition in addition to the real collision between two icons.

FIGS. 35A to 35D are views illustrating executing a control operation relating to an icon collision even when two icons do not actually meet according to an embodiment. These embodiments illustrate different concepts of the icon collision; however, control operations after the icon collision in this embodiment may be substantially the same as the example where two icons actually meet together.

Figure 35A:
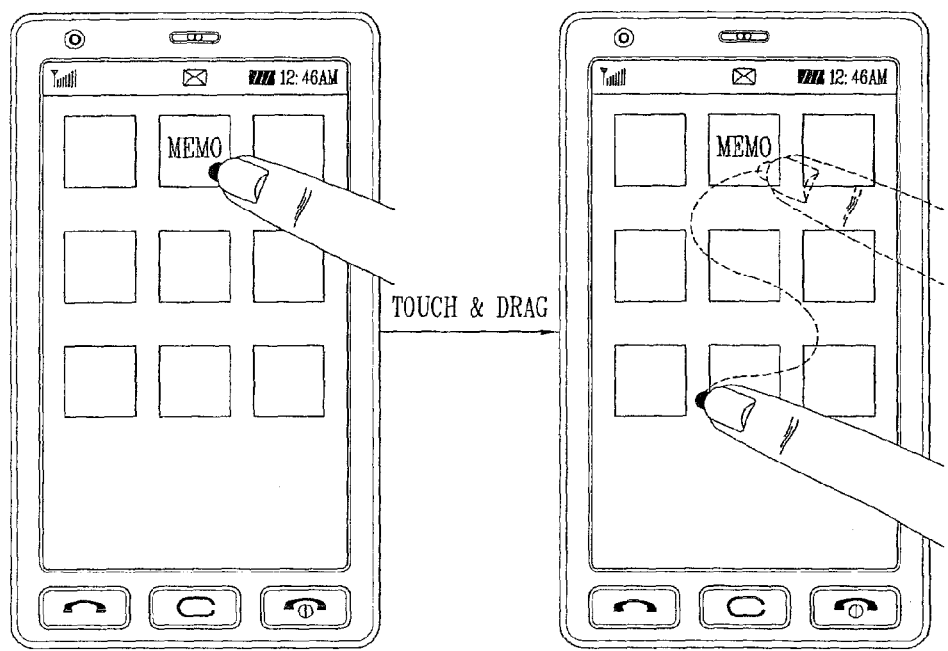
FIGS. 35A to 35D are views illustrating executing a control operation relating to an icon collision even if two icons do not actually meet according to an embodiment.

FIG. 35A illustrates an example of an icon collision using a touch gesture. As shown in FIG. 35A, in a state of a plurality of icons (function icons and contents icons) are displayed, a user may touch one icon (e.g., memo) for selection. When a user makes a predefined gesture, for example, draws a character S, the controller 180 may recognize that the memo icon collides with an icon (or icons) located on a path of the character S, and may then execute the corresponding operation. The gesture may include any action passing on other icons as well as characters, numbers, figures and/or the like.

Figure 35B:
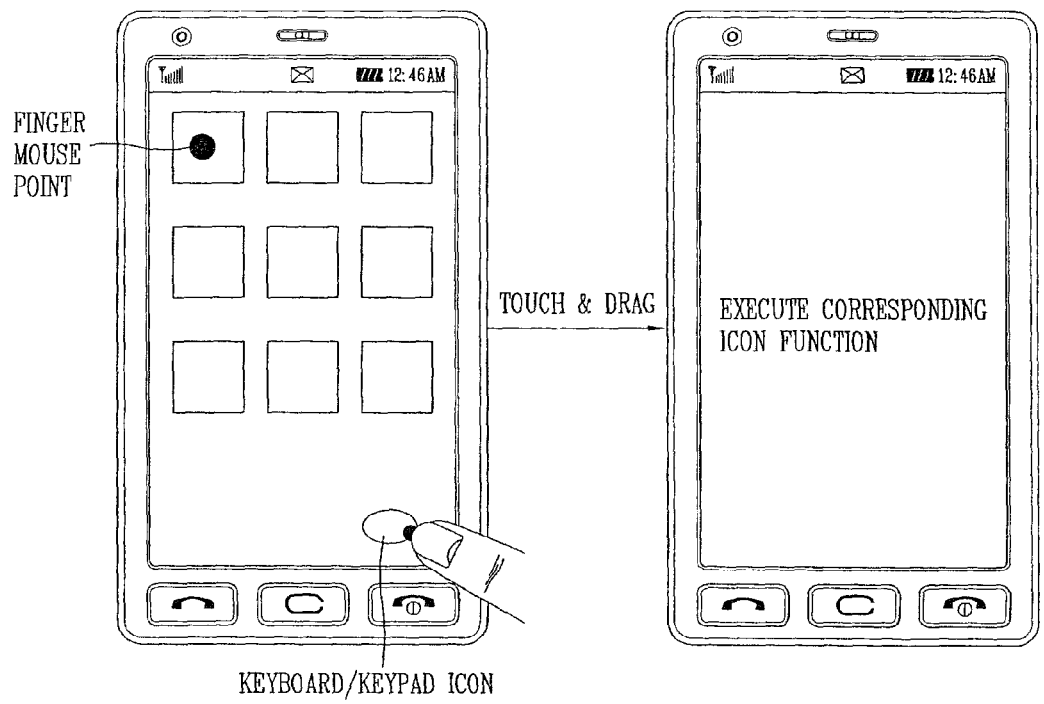

FIG. 35B illustrates an example of an icon collision using different types of input devices.

In a state where a plurality of icons (e.g., function icons and contents icons) are displayed on a screen, a user may locate a pointer of a mouse on one icon (e.g., memo). The mouse may include a finger mouse and/or joystick. In this state, when the user touches another icon (e.g., keyboard or keypad icon), the controller 180 may divide (or separate) a screen to simultaneously display a keyboard/keypad screen and a memo input screen.

Figure 35C:
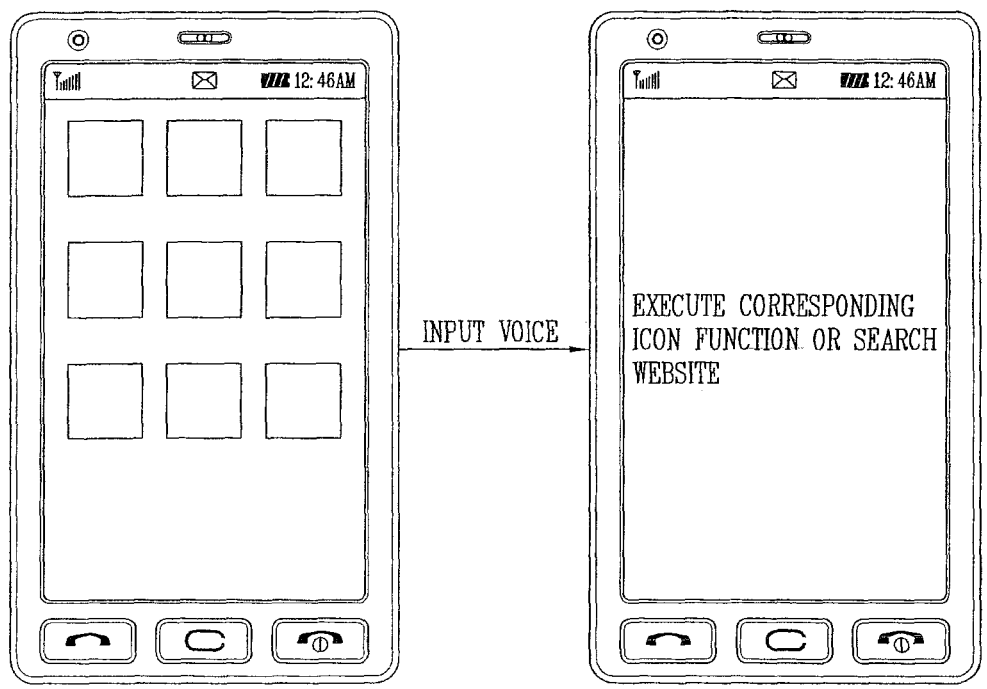

FIG. 35C illustrates an example of an icon collision using a voice recognition. As shown in FIG. 35C, in a state where a plurality of icons (function icons and contents icons) are displayed on a screen, a user may touch one icon (e.g., website) for selection. In this state, when the user inputs voice, for example, "Search" as an execution command, the controller 180 may consider it as an icon collision, and accordingly may access the corresponding website to perform a searching operation desired by the user.

Figure 35D:
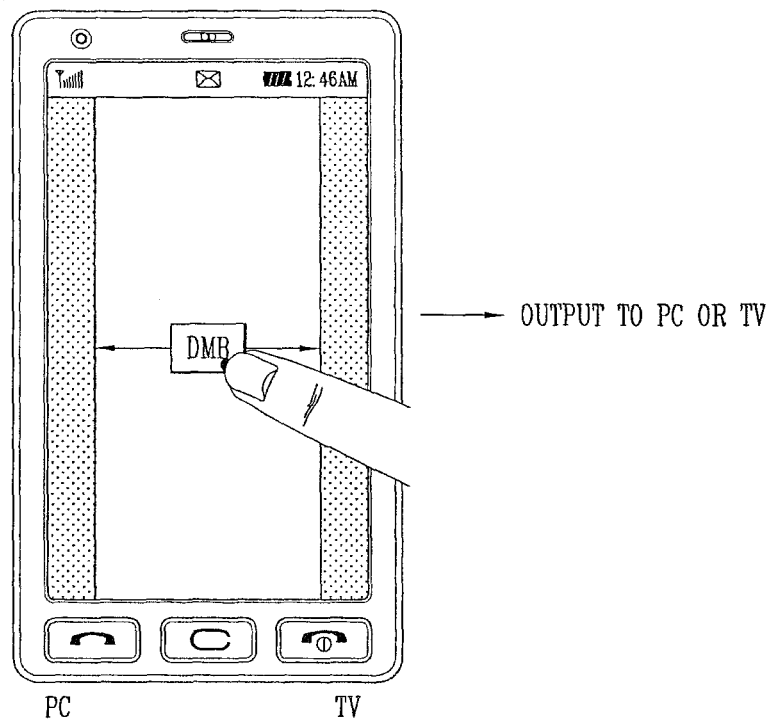

FIG. 35D illustrates an example of an icon collision by moving an icon to a specific region. This example may illustrate that after partial regions of a screen are set to regions for several operations such as output, storage, execution, and/or the like, when a specific icon moves to the corresponding region, the output, storage, execution and other operations with respect to the corresponding icon may be performed.

FIG. 35D illustrates regions for output to a PC and a TV are set to both right and left sides of the screen. When a user drags a DMB icon to each region of the screen, the controller 180 may output DMB data to the PC or the TV.

Figure 36:
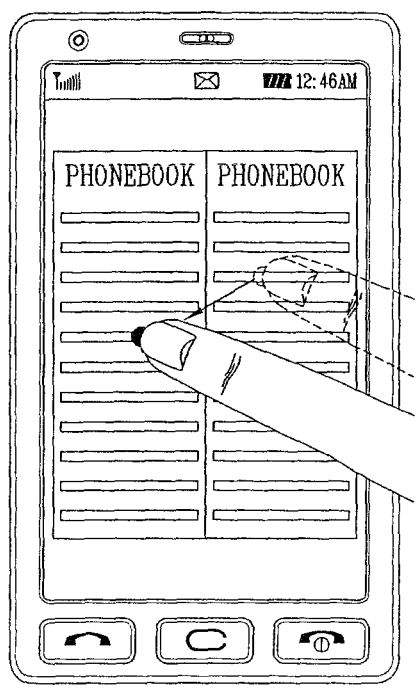
FIG. 36 illustrates implementing an icon collision on divided screens according to an embodiment.
Figure 36:
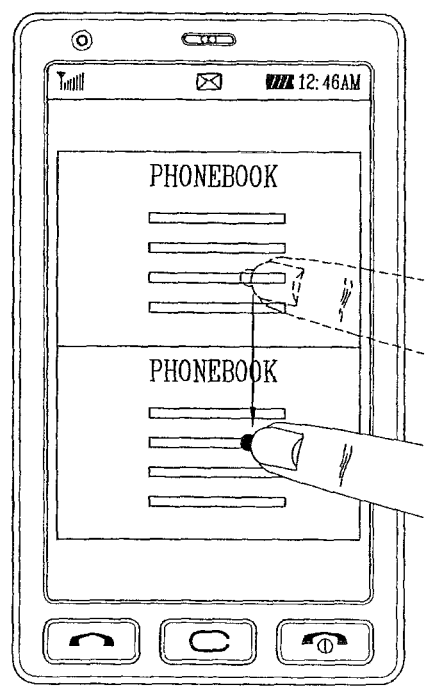

FIG. 36 illustrates implementing an icon collision on divided screens (or separated screens) according to an embodiment.

Referring to FIG. 36, a phonebook may be logically or physically divided. A user may collide (including both contact and non-contact) one phone number with another phone number on the divided phonebooks by employing the above described various touching schemes, and the controller 180 may detect collision between the two phone numbers so as to perform a voice call or convert the screen to a telephony call supportable screen.

FIG. 37 is a view illustrating a control operation upon an addition of a new icon to a specific icon list or upon an icon collision.

Icons may be displayed in a form of a list according to usages. For inserting a new icon D between the currently displayed icons B and C, the controller 180 may reduce widths of the currently displayed icons A, B and C, and thereafter display the new icon D between the icons B and C. When a particular icon collides with the icon B, the controller 180 may reduce the widths of the currently displayed icons A and C and thereafter may perform an operation corresponding to the icon B at the region between the icons A and C.

Embodiments of the present invention may have an advantage of providing users with intuitive and easy user interfaces for contents and applications by controlling operations of each content and function (application) based on type and attribute of the icon collision.

Embodiments of the present invention may have an effect of allowing users to more conveniently use functions of the mobile terminal, by allowing the users to collide particular icons displayed on a screen so as to use functions of the mobile terminal set to the corresponding icons.

In accordance with an embodiment of the present invention, the method may be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and/or the like. The computer-readable medium may also be implemented as a format of carrier wave (e.g., transmission via an Internet). The computer may include the controller 180.

Configurations and methods of the mobile terminal in the above described embodiments may not be limitedly applied, although such embodiments may be configured by a selective combination of all or part of the embodiments so as to implement many variations.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display to display icons;
a memory to store information related to the icons; and
a controller to perform, when a first icon and a second icon have an icon collision, a control operation of the mobile terminal related to the first and second icons based on a type of the icon collision,
wherein the type of the icon collision includes a collision between function icons, a collision between a function icon and a contents icon, and a collision between contents icons, and
wherein in response to detecting the icon collision between the first icon and the second icon, the controller determines layer levels of the first and second icon based upon information stored in the memory when the type of the icon collision between the first and the second icon is the collision between function icons;
wherein when the determined layer levels of the first icon is the same as the determined layer level of the second icon, the controller executes an operation corresponding to the first icon, executes an operation corresponding to the second icon and controls the display to display a divided screen having a first screen area divided from a second screen area, wherein the first screen area to display an execution screen corresponding to the executed operation of the first icon and the second screen area to display an execution screen corresponding to the executed operation of the second icon; and
wherein when the determined layer levels of the first icon and the second icon are different, the controller executes an operation corresponding to the first icon with a high level as a foreground and an operation corresponding to the second icon with a low level as a background.

2. The mobile terminal of claim 1, wherein the displayed icons comprise one of a function icon or a contents icon.

3. The mobile terminal of claim 1, wherein the icon collision between the first icon and the second icon comprises a contact collision between the first icon and the second icon or a non-contact collision between the first icon and the second icon.

4. The mobile terminal of claim 3, wherein the contact collision comprises one of a collision responsive to a consecutive key input, a consecutive touch, a touch & drag, a multi-touch, a clamping or a touch gesture all corresponding to the first and second icons.

5. The mobile terminal of claim 3, wherein the non-contact collision comprises one of a collision responsive to a touch gesture, a collision responsive to a combination of touch and voice or a collision responsive to a combination of an input device and a touch.

6. The mobile terminal of claim 1, wherein the controller performs the control operation further based on an attribute.

7. The mobile terminal of claim 1, wherein the controller displays a combination of the first and second icons when the first and second icons belong to a same attribute group.

8. The mobile terminal of claim 1, wherein when the first icon is a function icon or a contents icon and the second icon is a lock icon, the controller locks or unlocks an item corresponding to the first icon.

9. The mobile terminal of claim 1, wherein when the first icon and the second icon are function icons and the second icon has a time attribute, the controller searches for an item corresponding to the first icon based on the time attribute value of the second icon or the controller executes the item corresponding to the first icon after the time attribute value of the second icon.

10. The mobile terminal of claim 1, wherein when the first icon is a contents icon representing content and the second icon is a function icon, the controller executes a specific function of the content.

11. The mobile terminal of claim 1, wherein when the first icon is a contents icon representing content and the second icon is a function icon, the controller divides a screen to display an execution screen of the content and an input screen.

12. A control method of a mobile terminal comprising:
displaying icons on a screen of the mobile terminal;
detecting an icon collision between a first icon and a second icon;
performing a control operation of the mobile terminal related to the first and second icons based on a type of the icon collision,
wherein the type of the icon collision includes a collision between function icons, a collision between a function icon and a contents icon, and a collision between contents icons, and
in response to detecting the icon collision between the first icon and the second icon, determining layer levels of the first and second icon based upon information stored in a memory when the type of the icon collision between the first and the second icon is the collision between function icons;
wherein when the determined layer levels of the first icon is the same as the determined layer level of the second icon, executing an operation corresponding to the first icon, executing an operation corresponding to the second icon and displaying a divided screen having a first screen area divided from a second screen area, wherein the first screen area displays an execution screen corresponding to the executed operation of the first icon and the second screen area displays an execution screen corresponding to the executed operation of the second icon; and
wherein when the determined layer levels of the first icon and the second icon are different, the controller executes an operation corresponding to the first icon with a high level as a foreground and an operation corresponding to the second icon with a low level as a background.

13. The method of claim 12, wherein the icons comprise one of a function icon and a contents icon.

14. The method of claim 12, wherein the icon collision between the first icon and the second icon comprise one of a contact collision between the first and second icons or a non-contact collision between the first and second icons.

15. The method of claim 12, wherein when the icon collision between the first icon and the second icon is a collision between function icons, performing an item corresponding to the second icon based upon the first icon.

16. The method of claim 12, wherein when the first and second icons are function icons and the second icon has a time attribute, a first icon item is displayed according to a value of the time attribute of the second icon or the first icon item is executed after the value of the time attribute of the second icon.

17. The method of claim 12, wherein when the first and second icons are function icons and belong to a same attribute group, the function icons are combined for displaying, and when the first icon is a contents icon representing content and the second icon is a function icon, a specific function of the content is executed.

18. The method of claim 12, further comprising:
displaying two contents icon items representing corresponding content on divided screens, respectively; and
performing a function combined with the corresponding contents and displaying divided information when the first and second icons are different types of contents.

19. The method of claim 12, wherein when the first icon collides with a specific surface of a cubic icon, the first icon is executed on the surface of the cubic icon.

20. A mobile terminal comprising:
a display to display a plurality of icons;
a user input unit to receive inputs from a user regarding at least one of the displayed icons; and
a controller to determine an icon collision between a first displayed icon and a second displayed icon based on an input from the user input unit,
the controller to perform a control operation of the mobile terminal related to the first and second icons based on a type of the icon collision,
wherein the type of the icon collision includes a collision between function icons, a collision between a function icon and a contents icon, and a collision between contents icons, and
wherein in response to determining the icon collision between the first icon and the second icon, the controller determines layer levels of the first and second icon based upon information stored in a memory when the type of the icon collision between the first and the second icon is the collision between function icons;
wherein when the determined layer levels of the first icon is the same as the determined layer level of the second icon, the controller executes an operation corresponding to the first icon, executes an operation corresponding to the second icon and controls the display to display a divided screen having a first screen area displaying an execution screen corresponding to the executed operation of the first icon and a second screen area displaying an execution screen corresponding to the executed operation of the second icon; and
wherein when the determined layer levels of the first icon and the second icon are different, the controller executes an operation corresponding to the first icon with a high level as a foreground and an operation corresponding to the second icon with a low level as a background.

21. The mobile terminal of claim 20, wherein the displayed icons comprise one of a function icon or a contents icon.

22. The mobile terminal of claim 20, wherein the icon collision between the first icon and the second icon comprises a contact collision between the first displayed icon and the second displayed icon or a non-contact collision between the first displayed icon and the second displayed icon.

23. The mobile terminal of claim 20, wherein the controller performs an item of the second icon based upon the first displayed icon when the first and second displayed icons are both function icons.

* * * * *